US011568603B1

(12) United States Patent
Muskin

(10) Patent No.: US 11,568,603 B1
(45) Date of Patent: Jan. 31, 2023

(54) COLLISION AVOIDANCE SYSTEM FOR HEAD MOUNTED DISPLAY UTILIZED IN ROOM SCALE VIRTUAL REALITY SYSTEM

(71) Applicant: Out of Sight Vision Systems LLC, Las Vegas, NV (US)

(72) Inventor: Jon Muskin, Huntingon Valley, PA (US)

(73) Assignee: Out of Sight Vision Systems LLC, Las Vegas, NV (US)

( * ) Notice: Subject to any disclaimer, the term of this patent is extended or adjusted under 35 U.S.C. 154(b) by 0 days.

(21) Appl. No.: 16/872,361

(22) Filed: May 11, 2020

Related U.S. Application Data

(63) Continuation of application No. 15/818,690, filed on Nov. 20, 2017, now Pat. No. 10,650,591, which is a continuation-in-part of application No. 15/627,198, filed on Jun. 19, 2017, now abandoned, which is a continuation-in-part of application No. 15/604,632, filed on May 24, 2017, now Pat. No. 10,981,060.
(Continued)

(51) Int. Cl.
*A63F 13/53* (2014.01)
*G06T 19/00* (2011.01)
*A63F 13/25* (2014.01)
*G06T 15/00* (2011.01)
*A63F 13/40* (2014.01)

(52) U.S. Cl.
CPC ............ *G06T 19/003* (2013.01); *A63F 13/25* (2014.09); *A63F 13/40* (2014.09); *G06T 15/005* (2013.01); *A63F 2300/8082* (2013.01)

(58) Field of Classification Search
CPC ............ A63F 13/53; A63F 2300/8082; A61B 2090/365; G05B 2219/23148; A61M 2205/507
See application file for complete search history.

(56) References Cited

U.S. PATENT DOCUMENTS

2005/0231532 A1   10/2005   Suzuki
2006/0028400 A1   2/2006    Lapstun
(Continued)

OTHER PUBLICATIONS

Qin Huang et al.. Object Boundary Guided Semantic Segmentation, arXiv:1603.09742v4 [cs.CV] Jul. 6, 2016, published Jul. 2016.
(Continued)

*Primary Examiner* — Omkar A Deodhar
(74) *Attorney, Agent, or Firm* — Muskin and Farmer LLC

(57) ABSTRACT

A method, apparatus, and computer readable storage medium directed to implementing a room scale virtual reality system which enables players to walk through a large virtual playing area in a physically limited size room. Physical tracking of a virtual reality headset is used so that the position and orientation of the virtual reality headset is identified to translate the physical player's motion into the virtual world which is displayed on the virtual reality headset. Relocation objects are placed in the virtual world so they correspond to physical location against physical walls. Relocation objects in the virtual world rotate and/or relocate the player in the virtual world which would typically cause the player in the physical world to turn around and thus walk away from the physical wall. Placement of relocation objects throughout the virtual world enable a large virtual world to be implemented using a small finite sized physical room.

10 Claims, 46 Drawing Sheets

Related U.S. Application Data application No. 16/872,361, which is a continuation-in-part of application No. 15/604,632, filed on May 24, 2017, now Pat. No. 10,981,060.

(60) Provisional application No. 62/351,295, filed on Jun. 17, 2016, provisional application No. 62/341,056, filed on May 24, 2016.

(56) References Cited

U.S. PATENT DOCUMENTS

| | | | |
|---|---|---|---|
| 2007/0173265 A1* | 7/2007 | Gum | A63F 13/332 455/456.1 |
| 2008/0219502 A1 | 9/2008 | Shamaie | |
| 2008/0240496 A1 | 10/2008 | Senior | |
| 2012/0062594 A1 | 3/2012 | Campbell | |
| 2012/0075285 A1 | 3/2012 | Oyagi | |
| 2012/0206452 A1 | 8/2012 | Geisner | |
| 2012/0249741 A1 | 10/2012 | Maciocci | |
| 2013/0120449 A1 | 5/2013 | Ihara | |
| 2013/0278635 A1 | 10/2013 | Maggiore | |
| 2013/0335405 A1 | 12/2013 | Scavezze | |
| 2014/0015929 A1 | 1/2014 | Hong | |
| 2014/0078176 A1 | 3/2014 | Kim | |
| 2014/0160117 A1 | 6/2014 | Nehmadi | |
| 2014/0210838 A1 | 7/2014 | Kim | |
| 2014/0267012 A1 | 9/2014 | Mullins | |
| 2014/0270477 A1 | 9/2014 | Coon | |
| 2014/0287806 A1* | 9/2014 | Balachandreswaran | A63F 13/212 463/7 |
| 2015/0009206 A1 | 1/2015 | Arendash | |
| 2015/0016777 A1 | 1/2015 | Abovitz | |
| 2015/0062120 A1 | 3/2015 | Reisner | |
| 2015/0170416 A1 | 6/2015 | McGregor | |
| 2015/0228122 A1 | 8/2015 | Sadasue | |
| 2016/0217616 A1 | 7/2016 | Kraver | |
| 2016/0239952 A1 | 8/2016 | Tanaka | |
| 2016/0288236 A1 | 10/2016 | Becker | |
| 2016/0321530 A1 | 11/2016 | Troy | |
| 2017/0011553 A1 | 1/2017 | Chen | |
| 2017/0011556 A1 | 1/2017 | Hayashi | |
| 2017/0262247 A1 | 9/2017 | Yoganandan | |
| 2017/0287166 A1 | 10/2017 | Claveau | |
| 2017/0351336 A1 | 12/2017 | Yang | |
| 2018/0182171 A1 | 6/2018 | Lipner | |

OTHER PUBLICATIONS

Luca Bertinetto et al., Fully-Convolutional Siamese Networks for Object Tracking, arXiiv:1606.09549v2 [cs.CV] Sep. 14, 2016, published Sep. 2016.

Alex Anpilogov, Real-time Mixed Reality—Proof of concept: Kinect v2 + VR (HTC Vive) + Unity, www.youtube.com, https://www.youtube.com/watch?v=0h3cUp_YQPY, published Aug. 22, 2016.

Ben Gilbert, Facebook Just Showed Off the Next Version of the Oculus Rift, https://www.businessinsider.com/oculus-rift-2-2016-10, published Oct. 2016.

D Lumb, Logitch and HTC Vive bring Keyboards into VR, https://www.engadget.com/2017-11-03-logitech-and-htc-vive-bring-keyboards-into-vr.html, published Nov. 3, 2017.

Jared Newman, Leap Motion Reveals Bid to Become Oculus Rift's head-mounted VR controller, https://www.pcworld.com/article/2600203/leap-motion-reveals-bid-to-become-oculus-rifts-headmounted-vr-controller.html , published Aug. 28, 2014.

Kyle Russell, Leap Motion Launches VR Headset Mount for its Hand-Tracking Controller, https://techcrunch.com/2014/08/28/leap-motion-launches-vr-headset-mount-for-its-motion-controller/, published Aug. 28, 2014.

Jamie Feltham, Exclusive: HTC Vive Goes Wireless With $220 Add-On, Pre-Orders Start Friday, https://uploadvr.com/htc-vive-wireless-kit/, published Nov. 10, 2016.

Yannick Morvan, "Multi-View Depth Estimation", http://epixea.com/research/multi-view-coding-thesisch3.html, published before earliest priority date of this application.

Ben Lang, "Hands-On: Intel's Project Alloy 'Merged Reality' Roomscale Multiplayer Demo", https://www.roadtovr.com/intel-project-alloy-merged-reality-multiplayer-hands-on-ces-2017/, published Jan. 17, 2017.

* cited by examiner

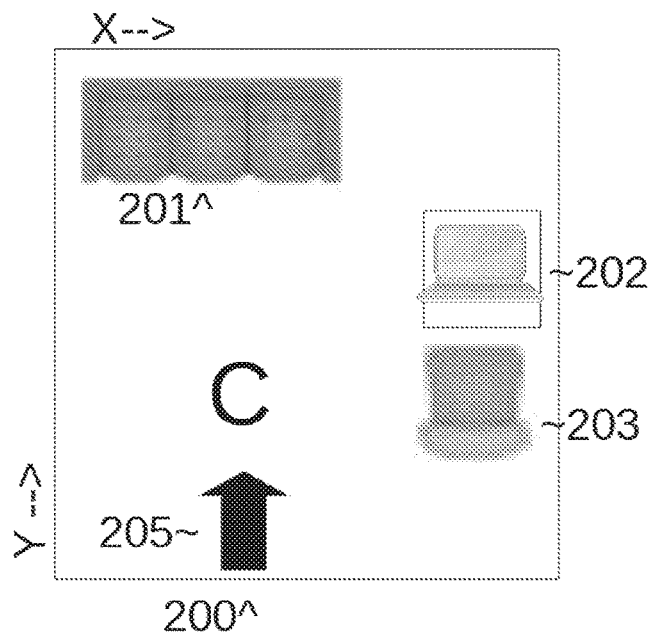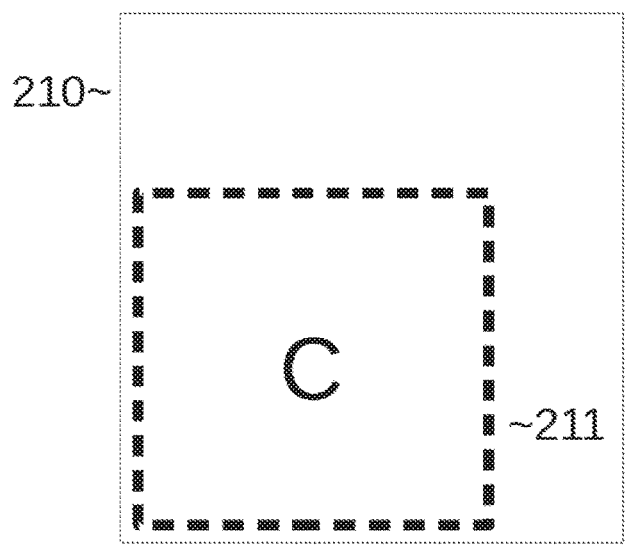
FIG. 2

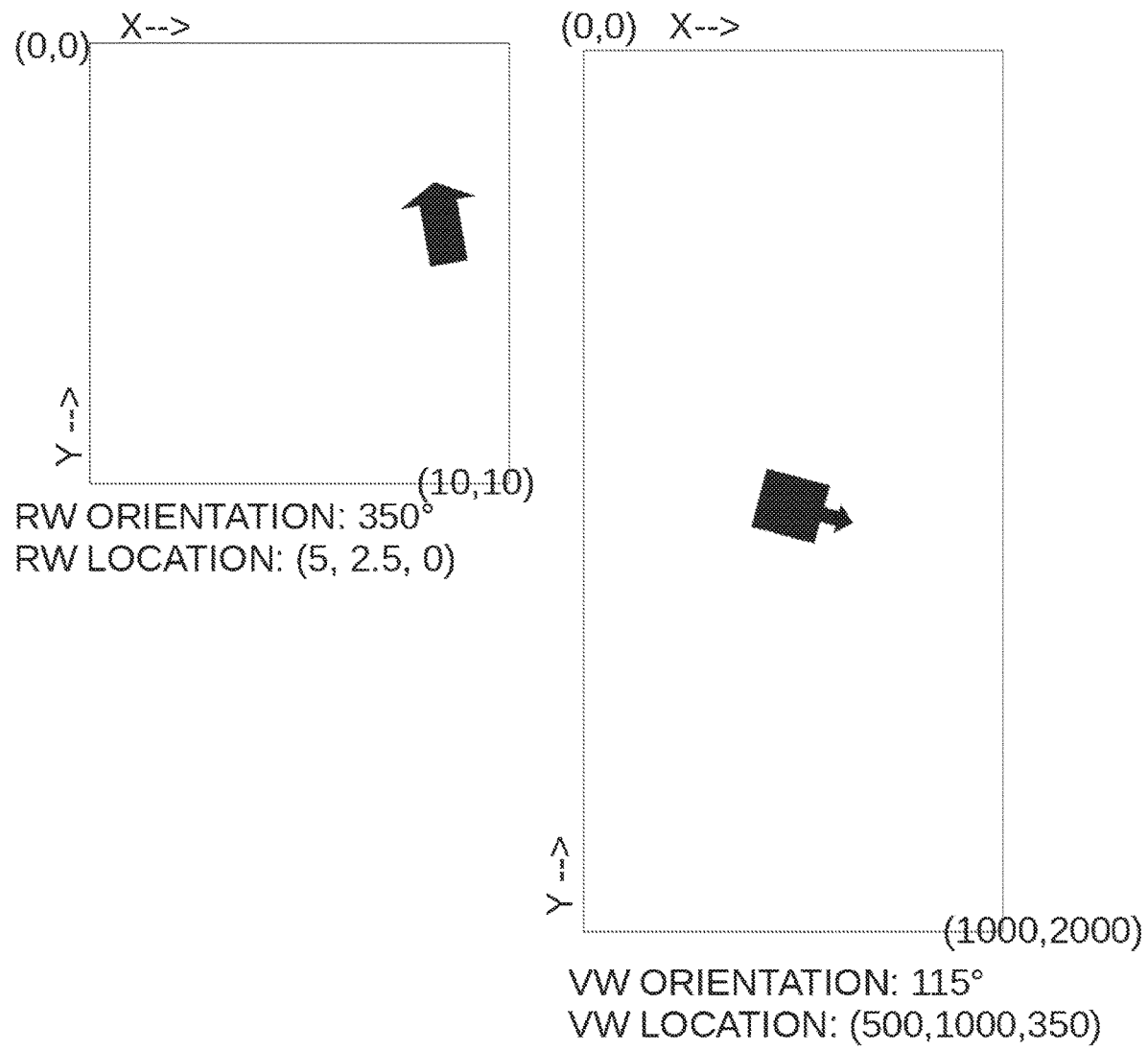
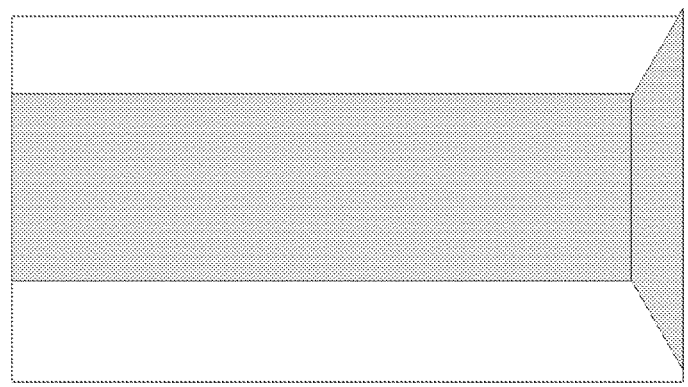
FIG. 3

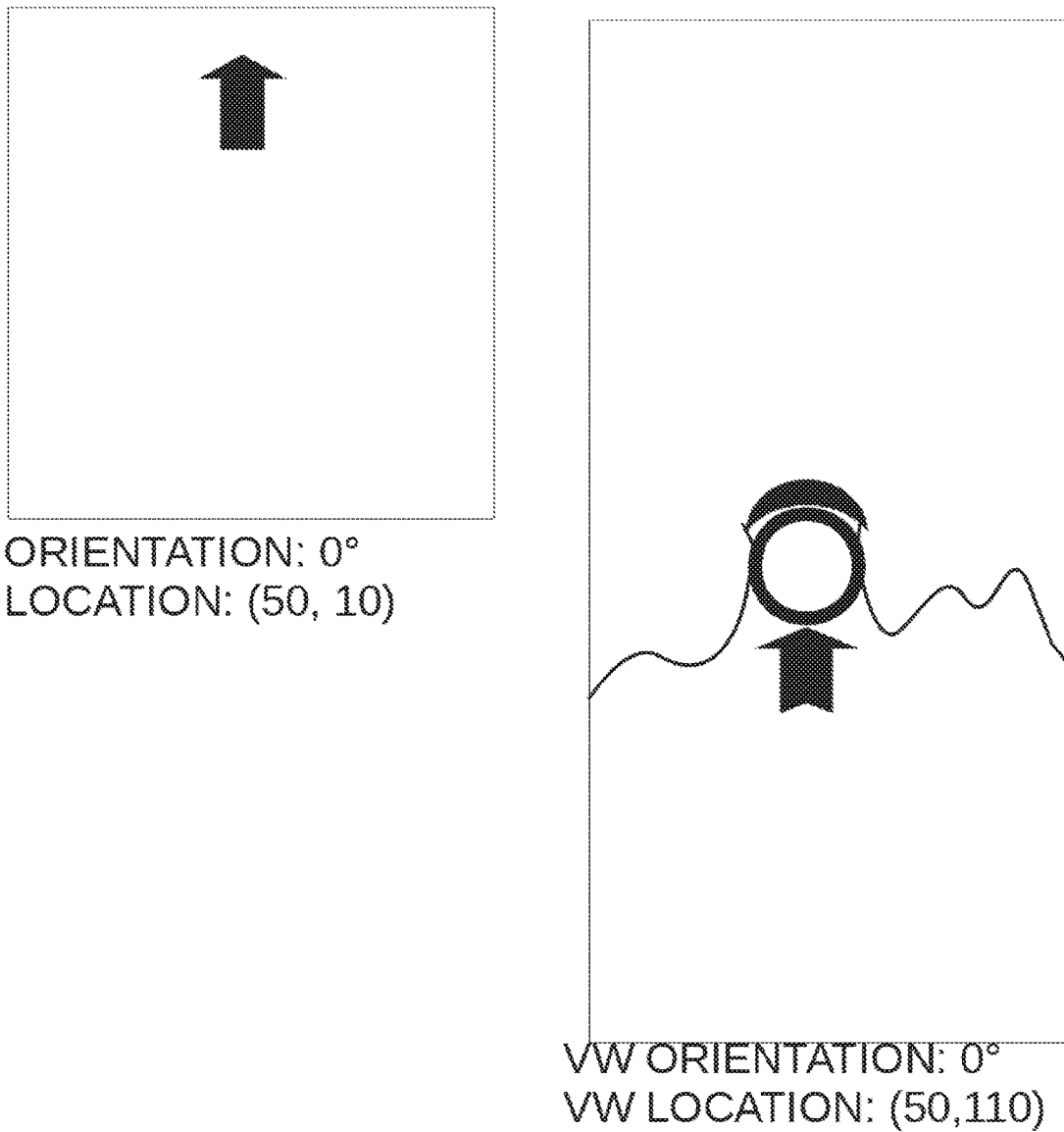
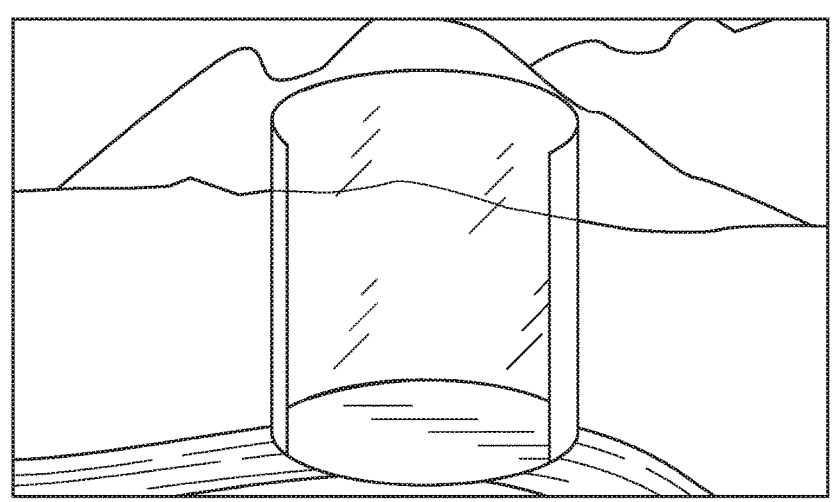
FIG. 5

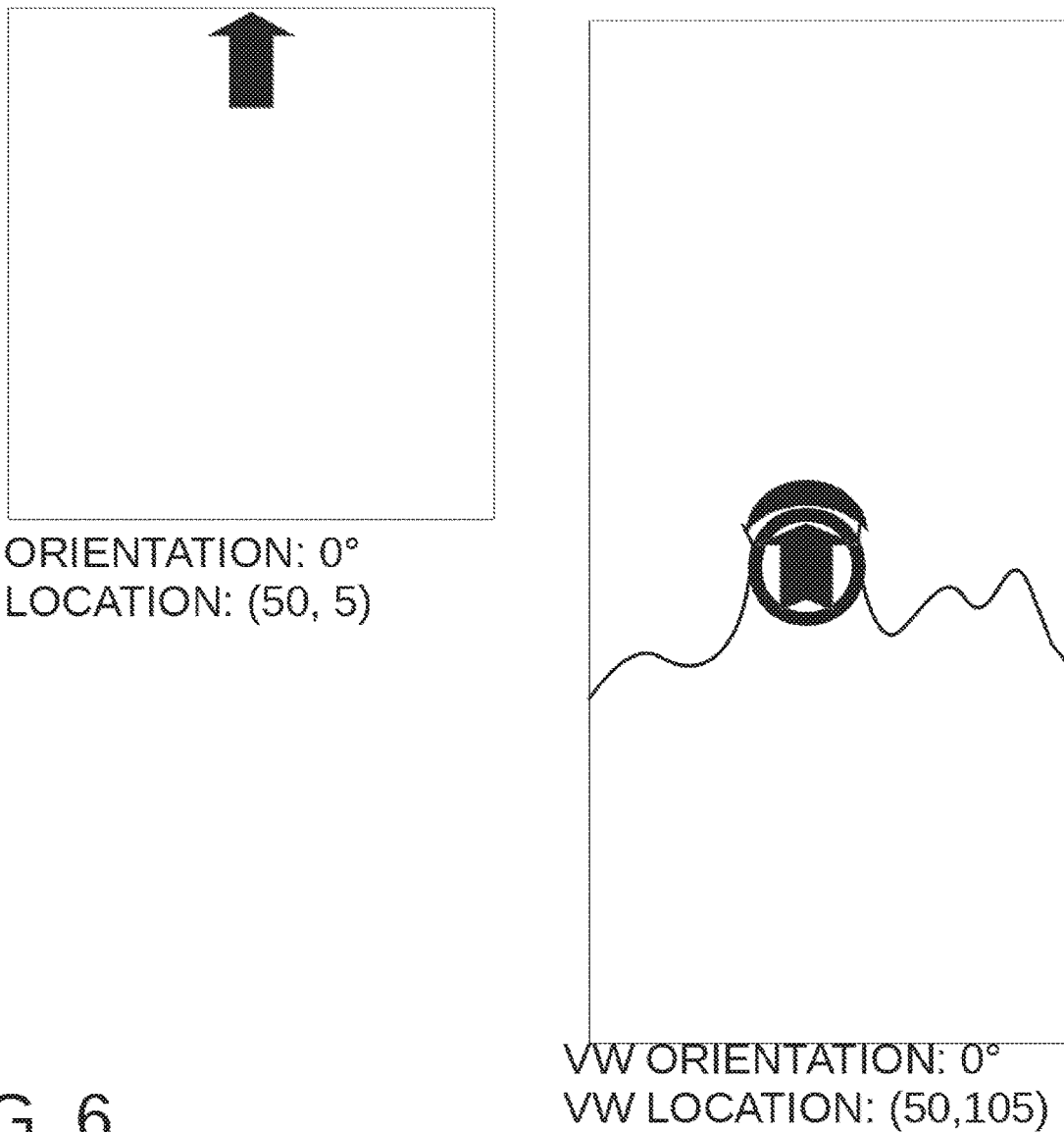
RW ORIENTATION: 0°
RW LOCATION: (50, 5)
VW ORIENTATION: 0°
VW LOCATION: (50,105)
FIG. 6
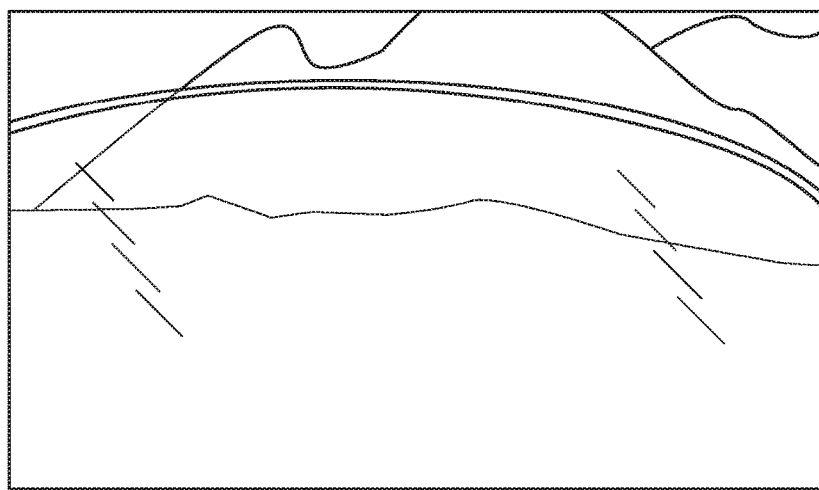

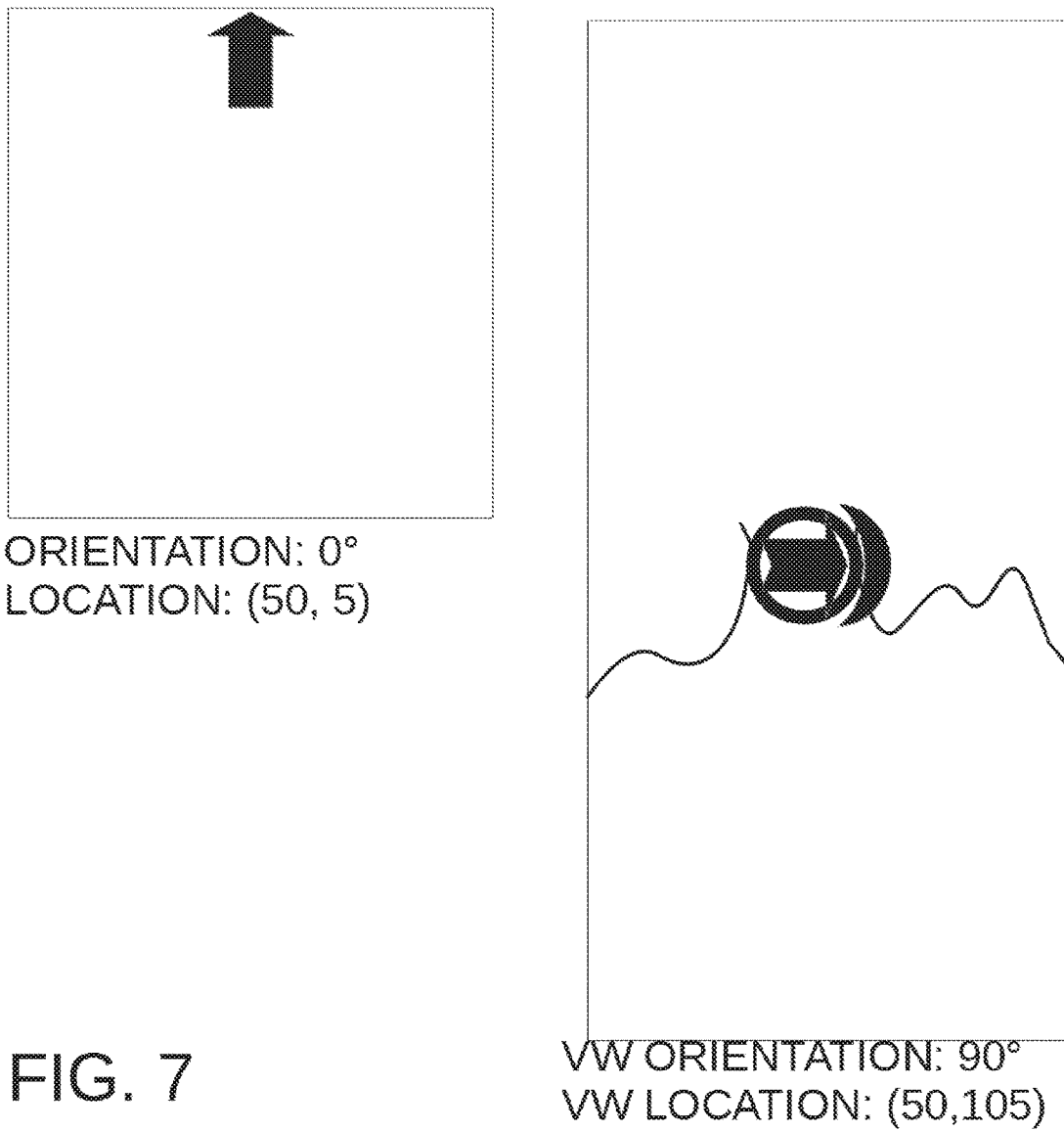
FIG. 7
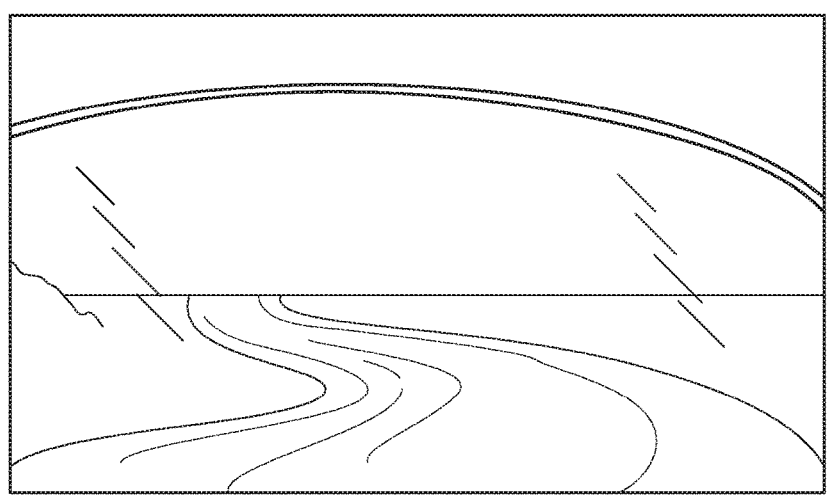

RW ORIENTATION: 0°
RW LOCATION: (50, 5)
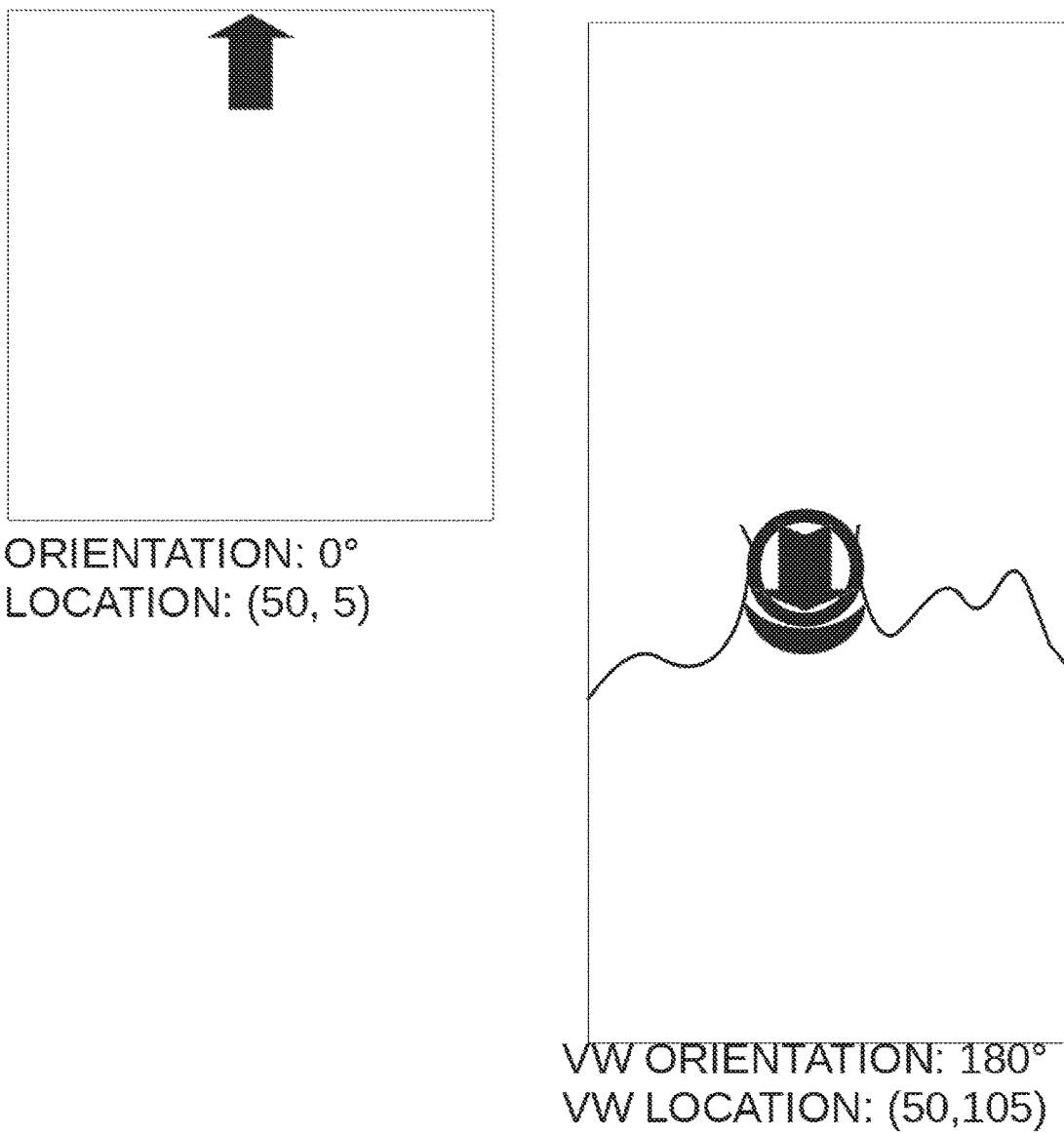
VW ORIENTATION: 180°
VW LOCATION: (50,105)
FIG. 8
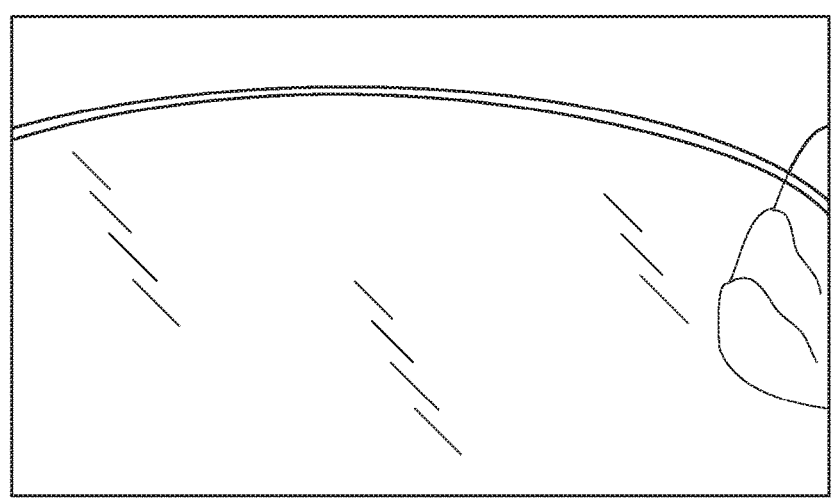

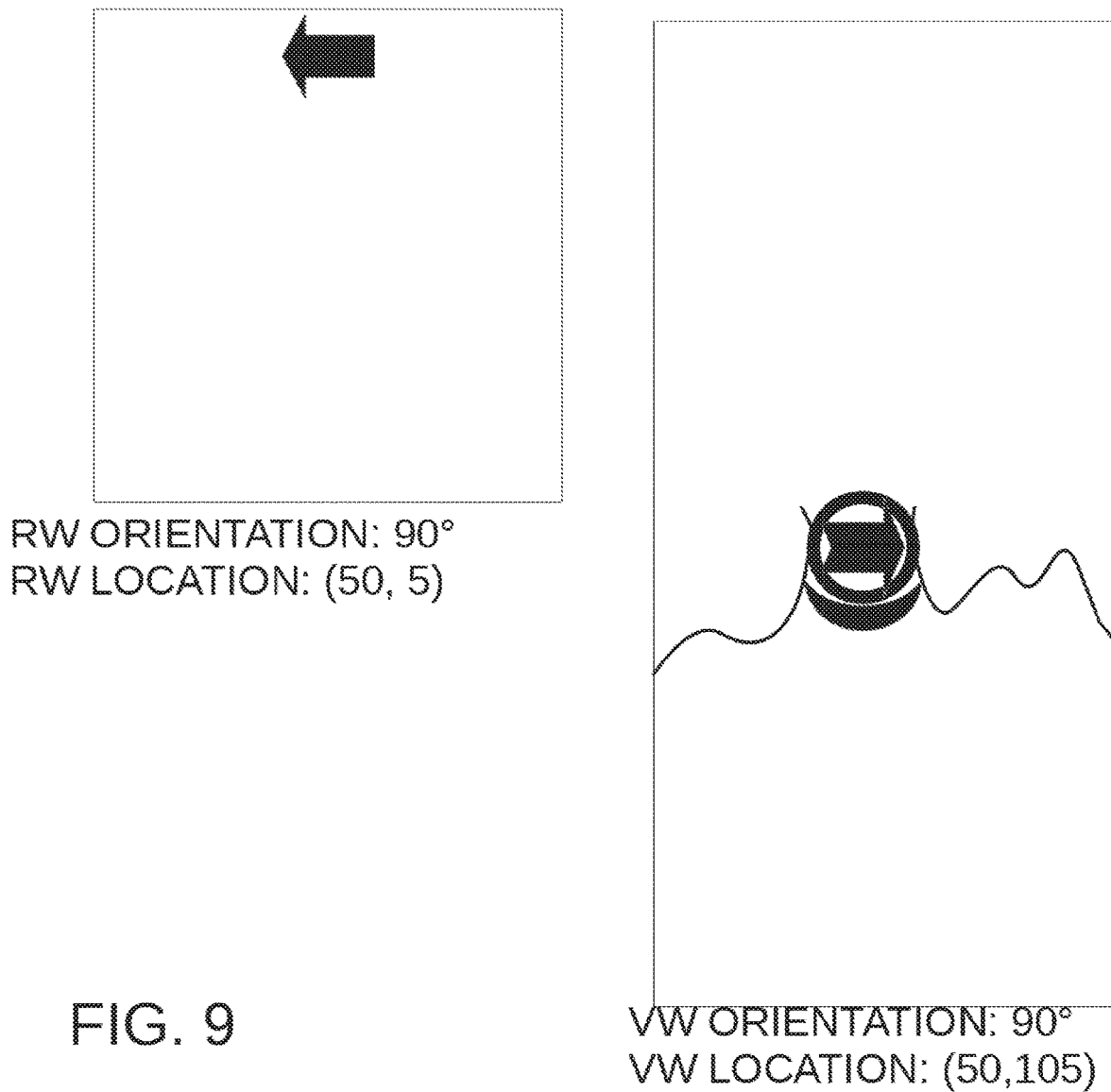
RW ORIENTATION: 90°
RW LOCATION: (50, 5)
VW ORIENTATION: 90°
VW LOCATION: (50,105)
FIG. 9
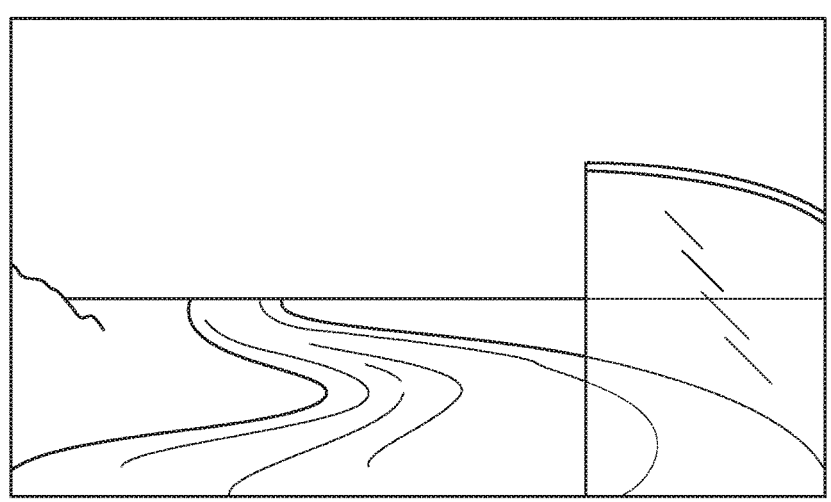

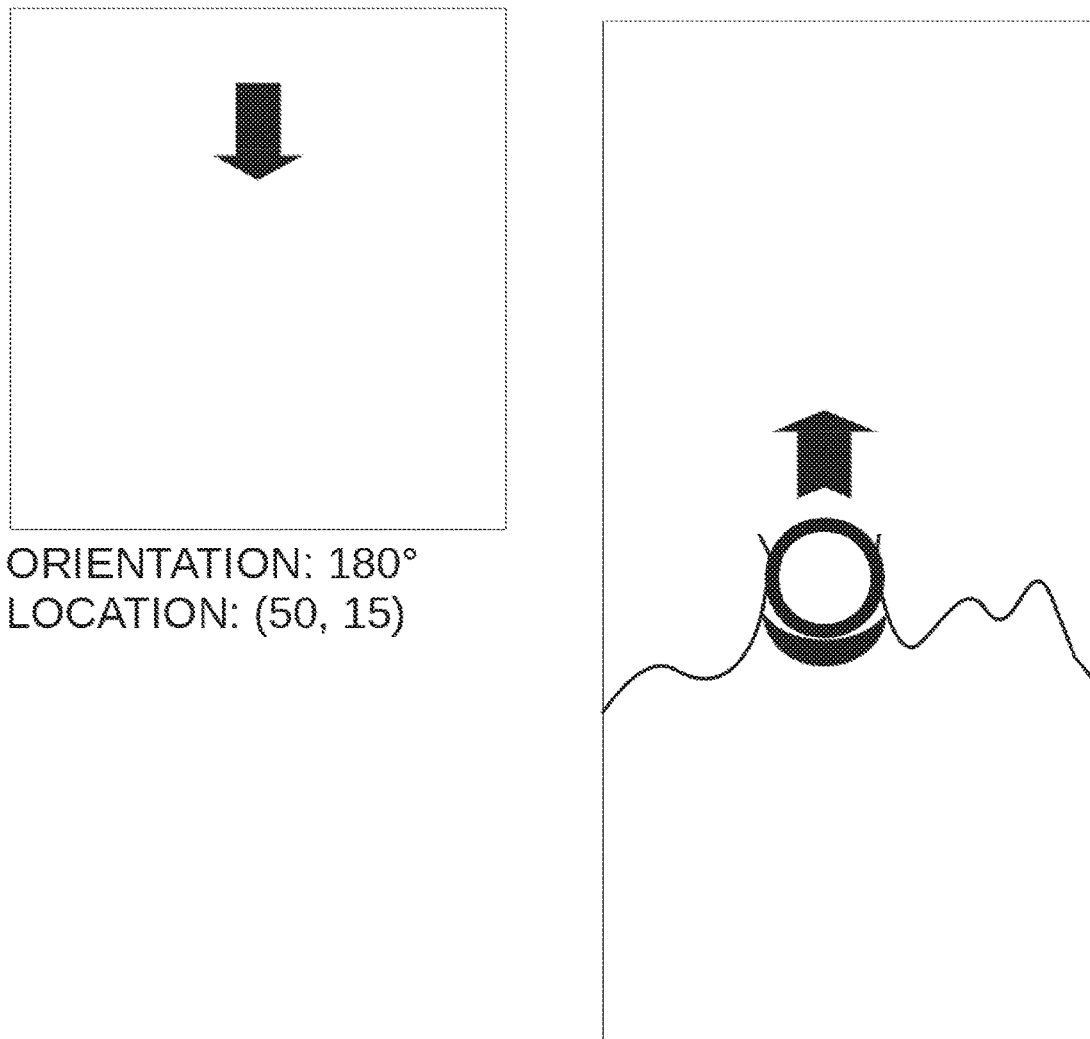
FIG. 11
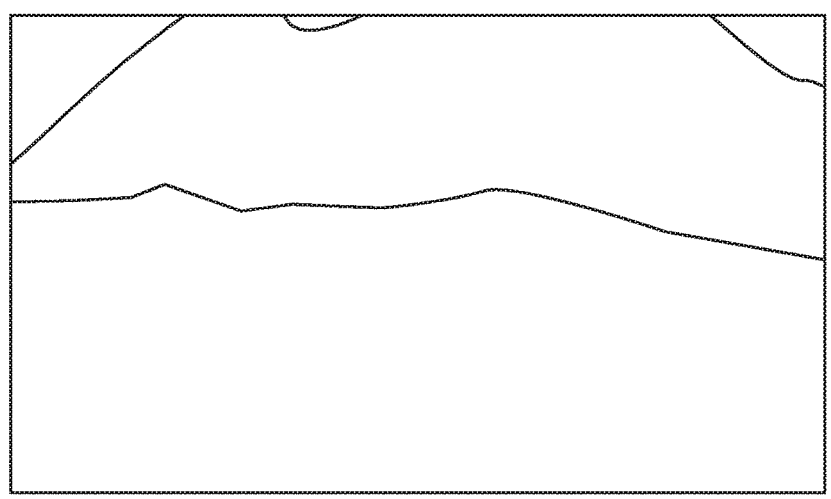

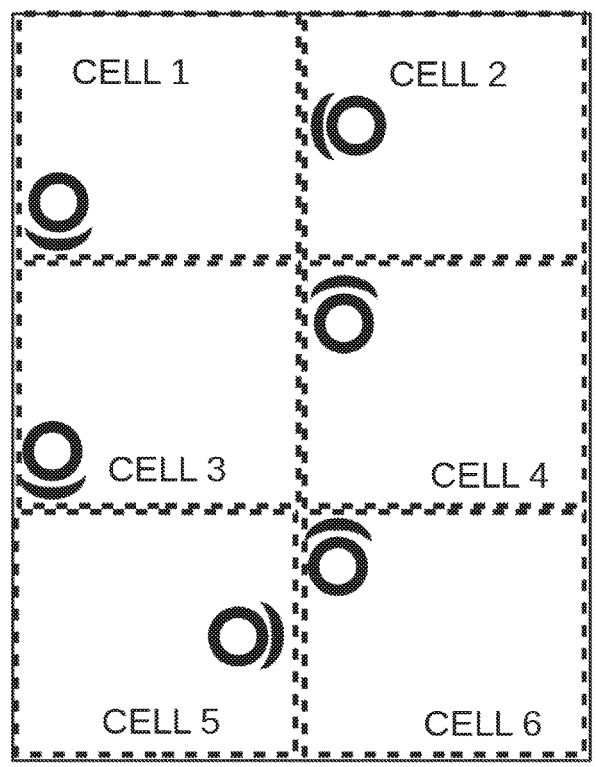
FIG 14A
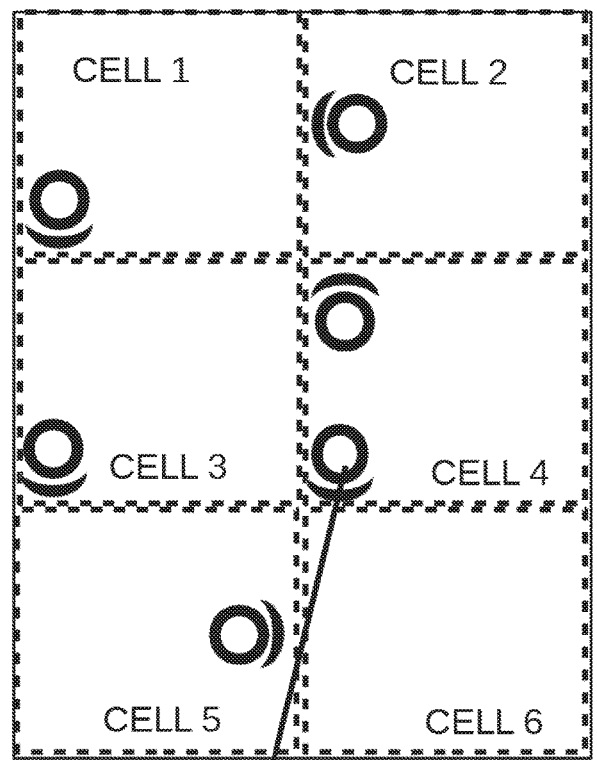
N
In this embodiment, the rotator physically moved north in the virtual world in addition to rotating
FIG 14B Each cell in this embodiment is an equally sized square. Cell 9 is the equally sized square in the middle

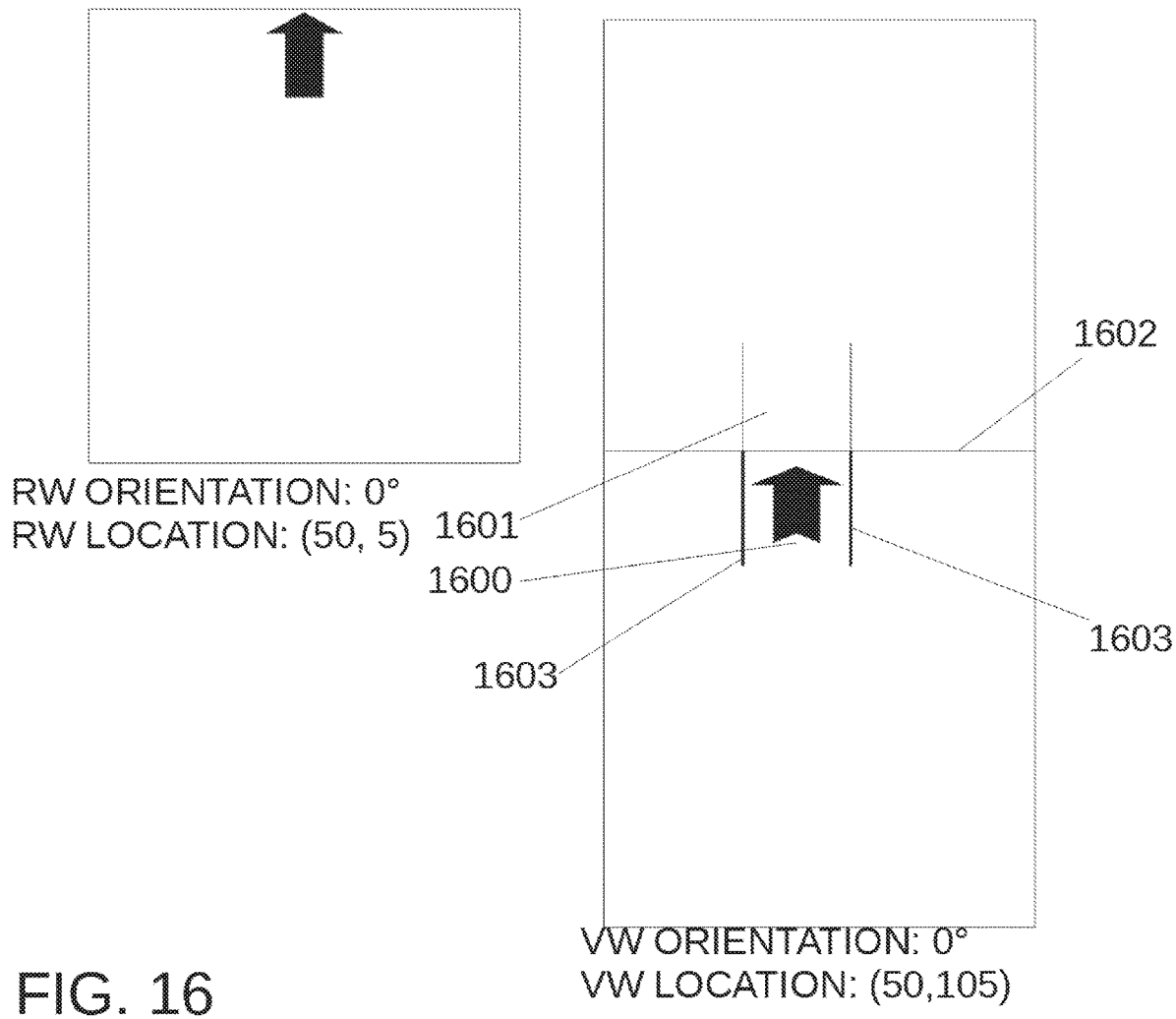
FIG. 16
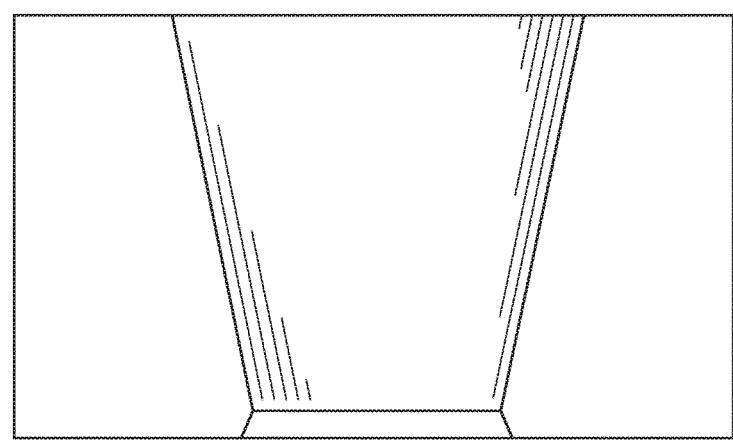

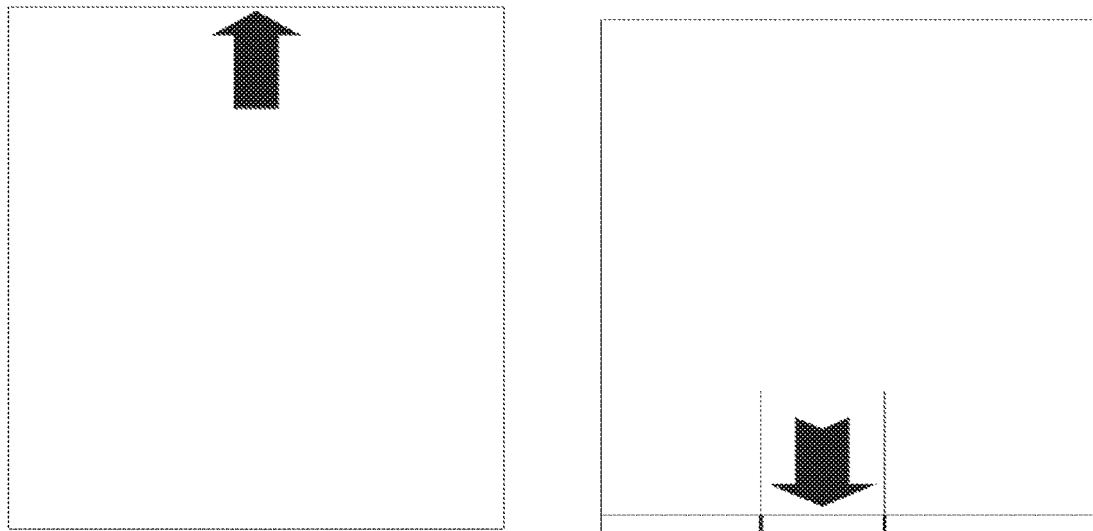
RW ORIENTATION: 0°
RW LOCATION: (50, 5)
VW ORIENTATION: 180°
VW LOCATION: (50,95)
FIG. 17
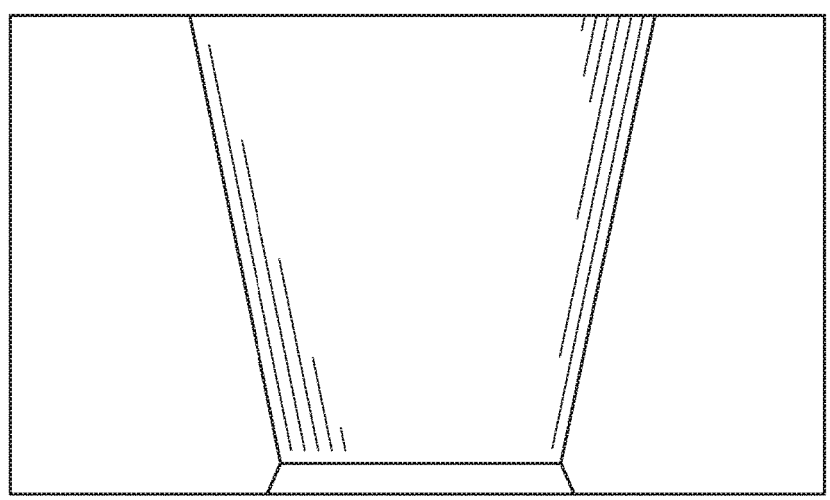

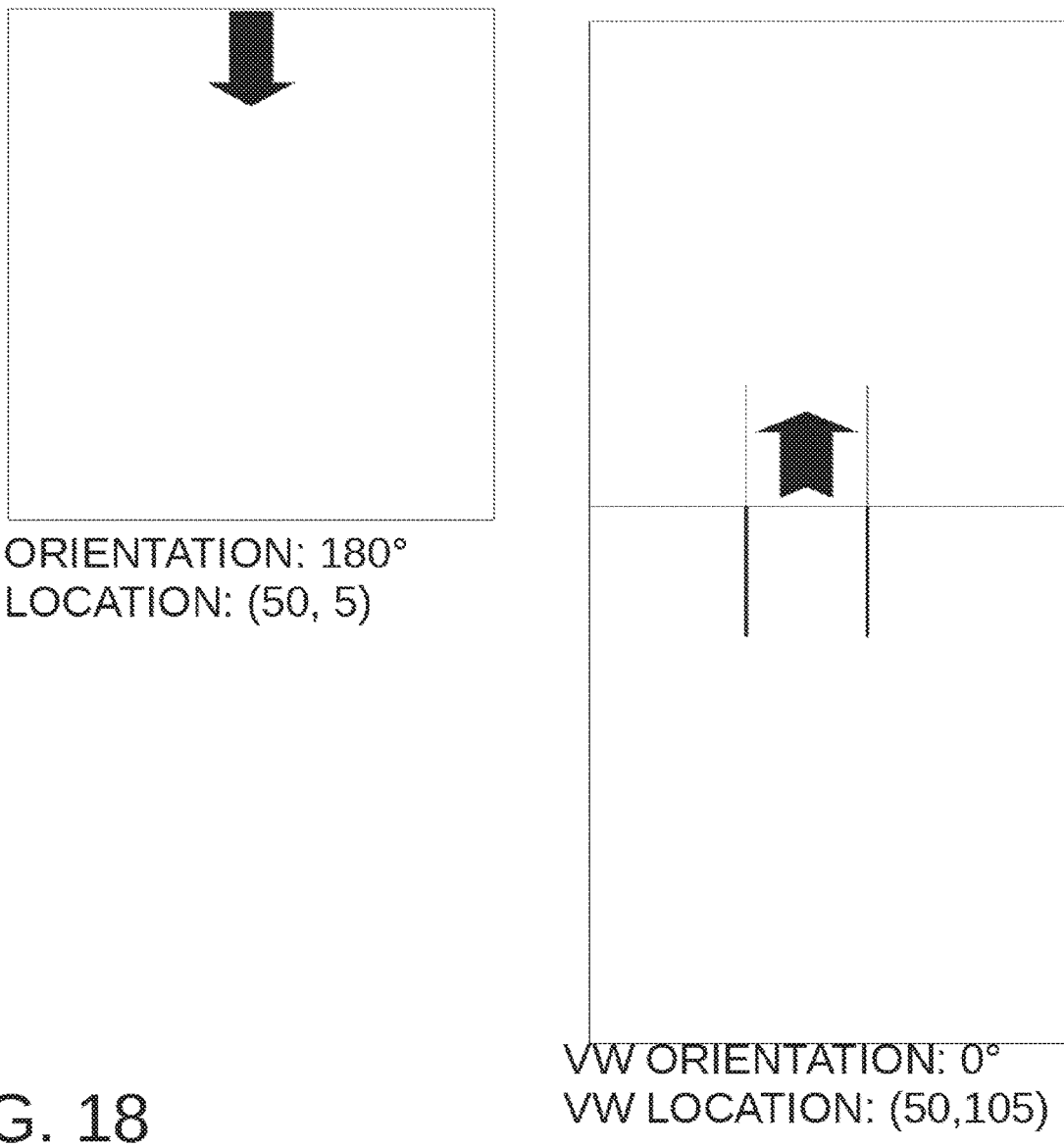
RW ORIENTATION: 180°
RW LOCATION: (50, 5)
VW ORIENTATION: 0°
VW LOCATION: (50,105)
FIG. 18
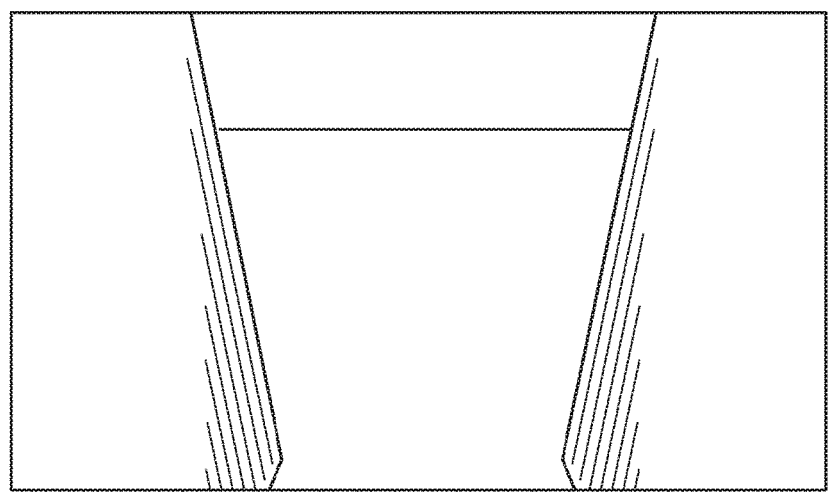

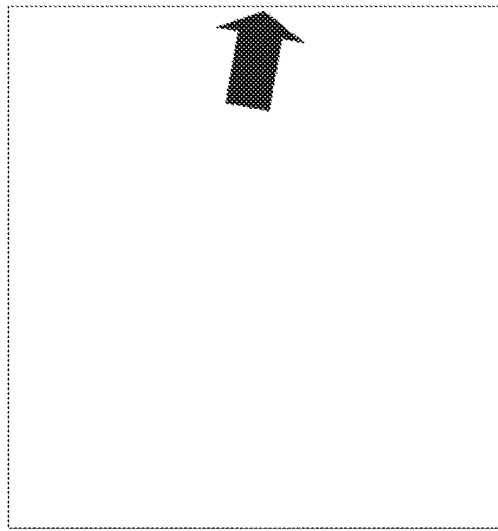
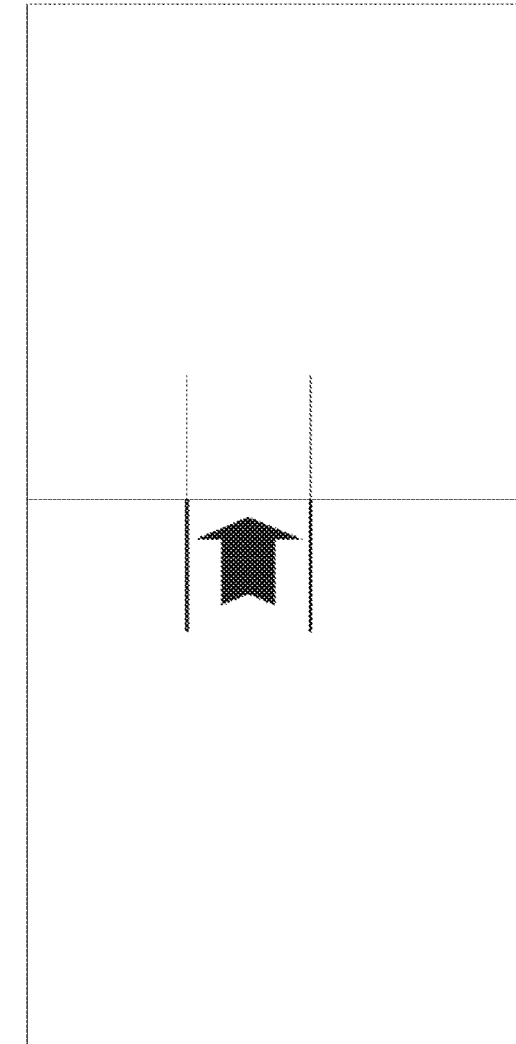
RW ORIENTATION: 10°
RW LOCATION: (50, 5)
VW ORIENTATION: 0°
VW LOCATION: (50, 105)
FIG. 19
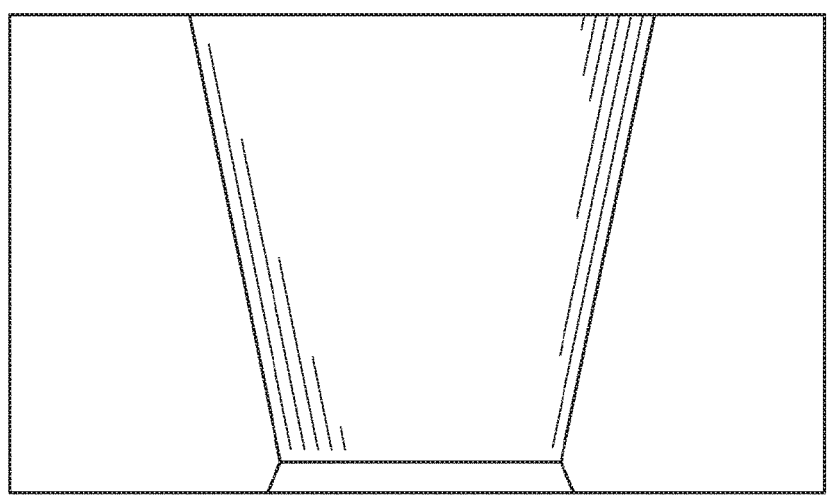

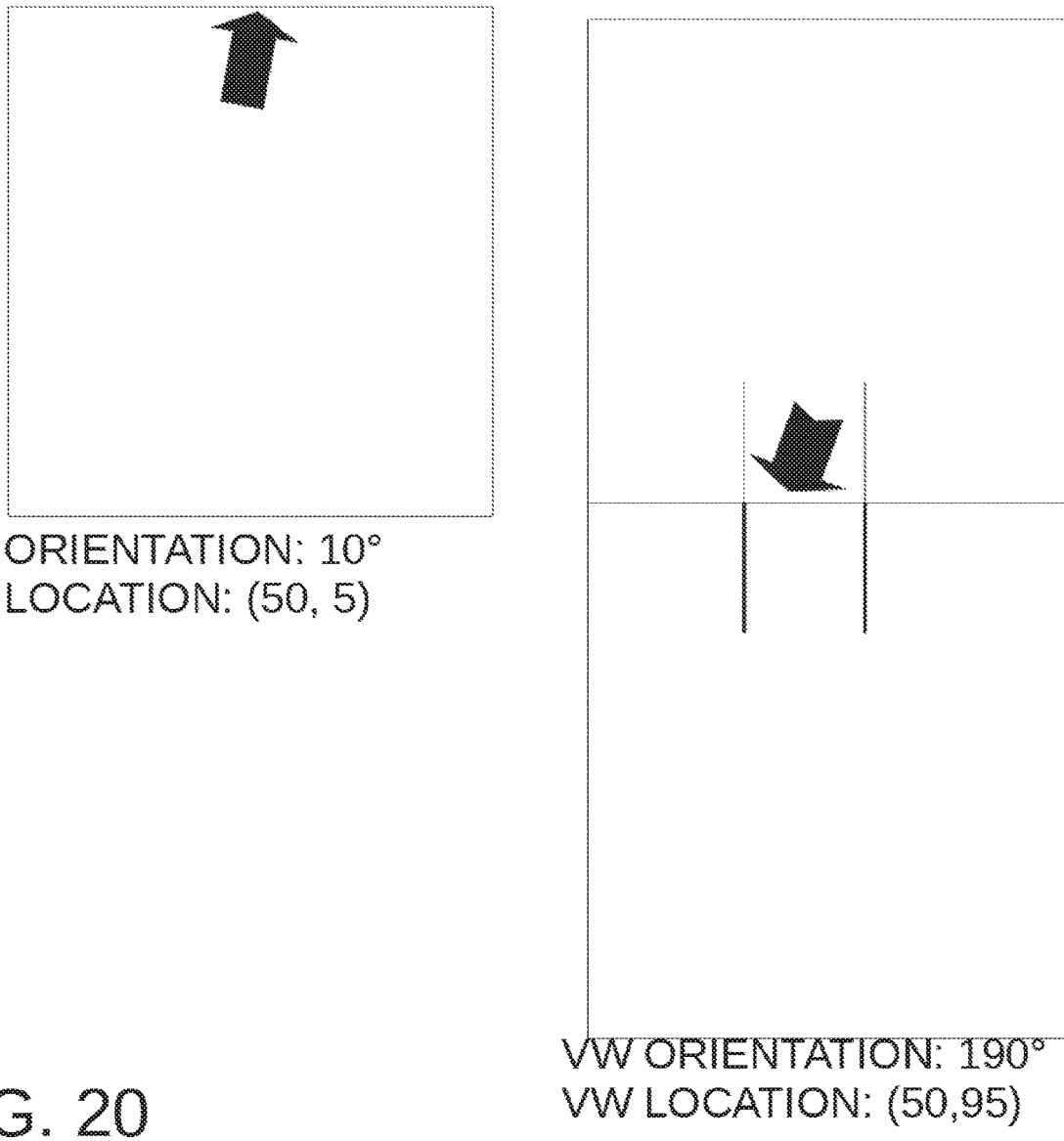
FIG. 20
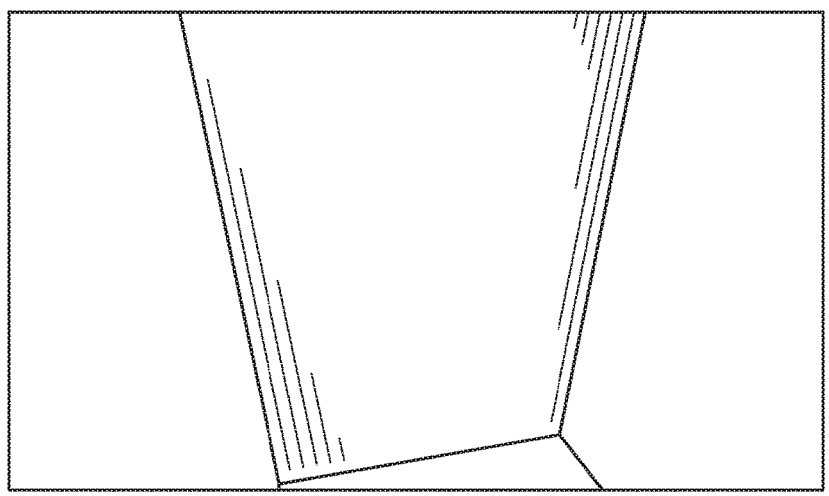

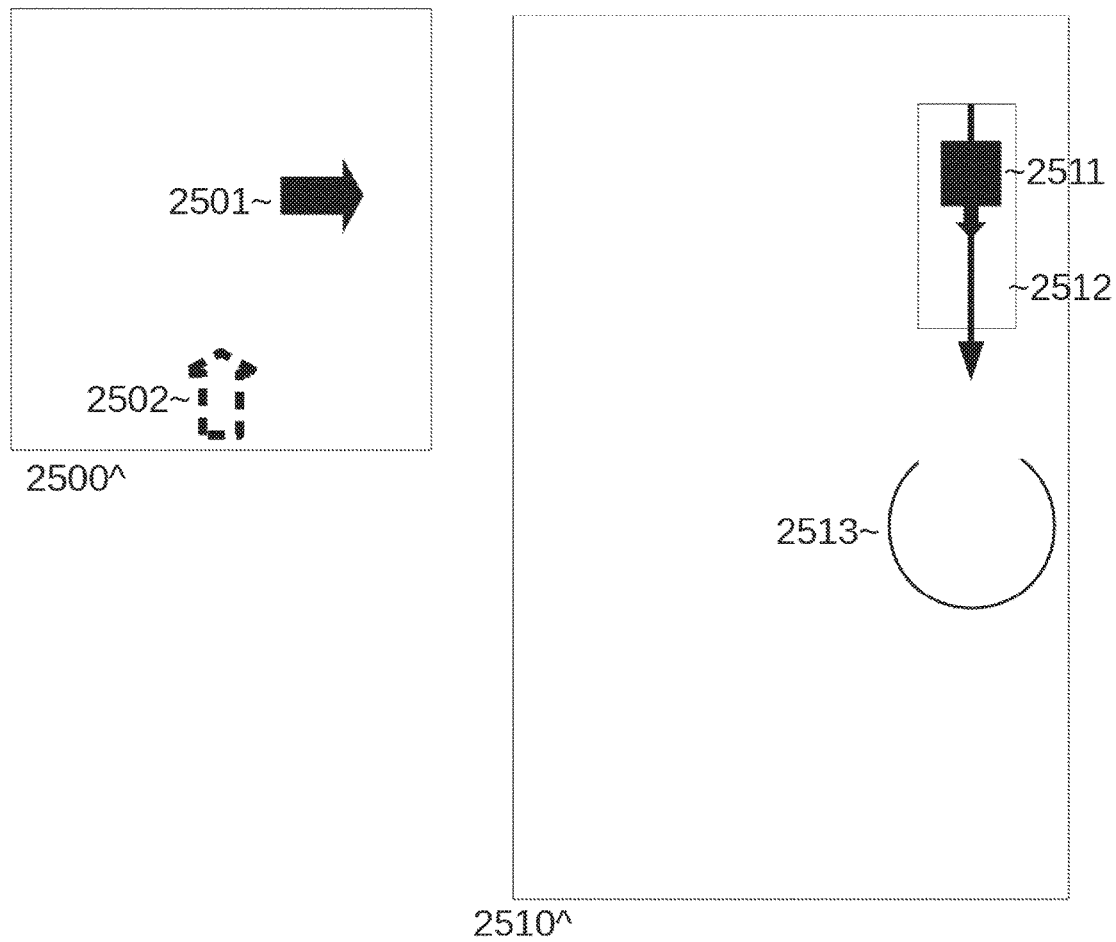
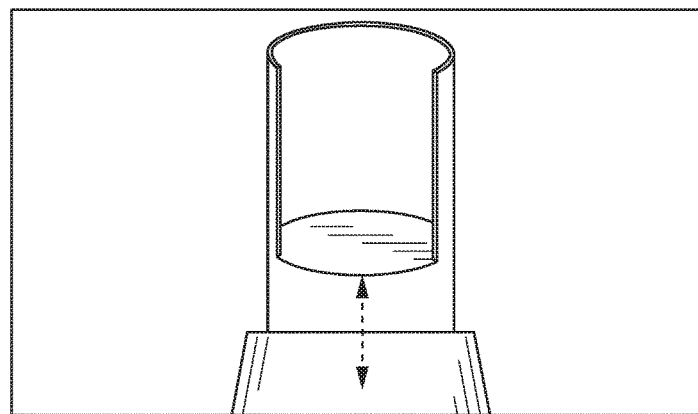
FIG. 25

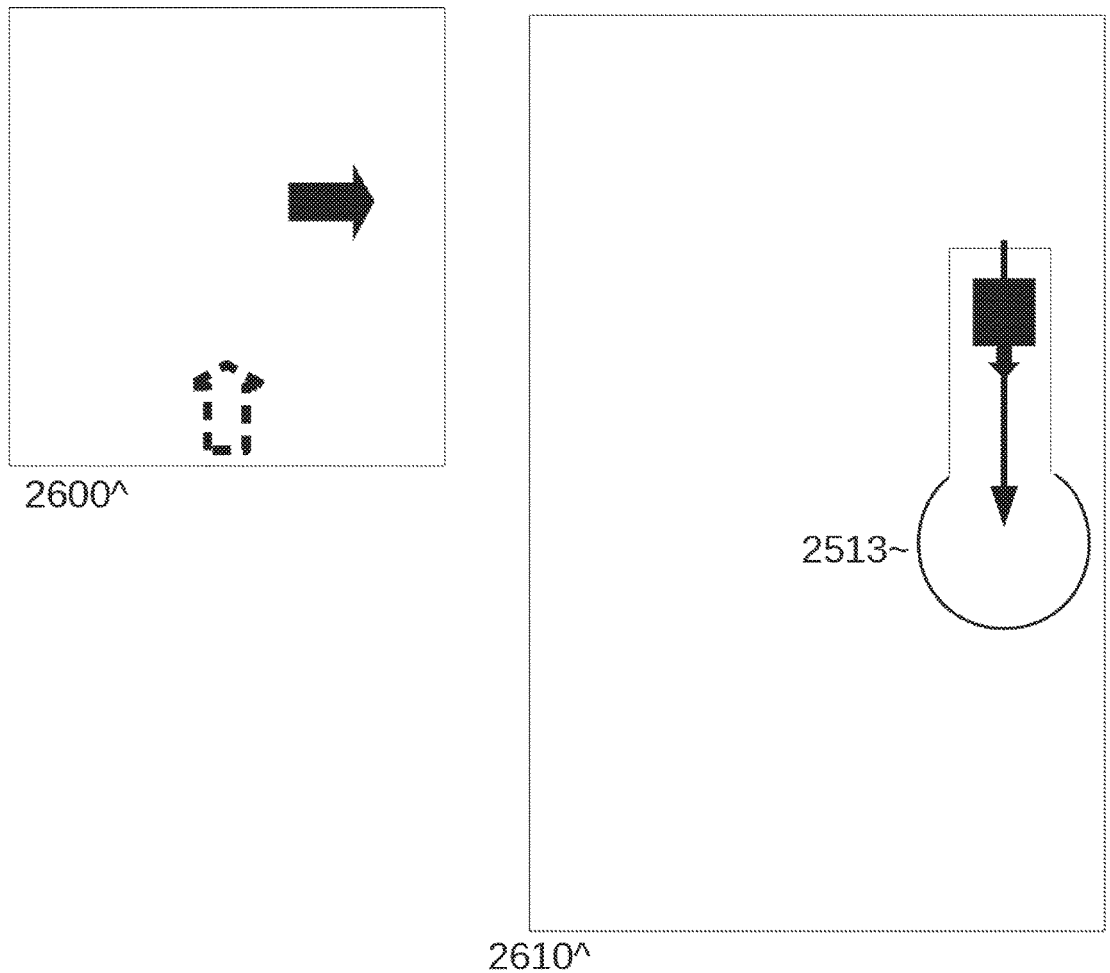
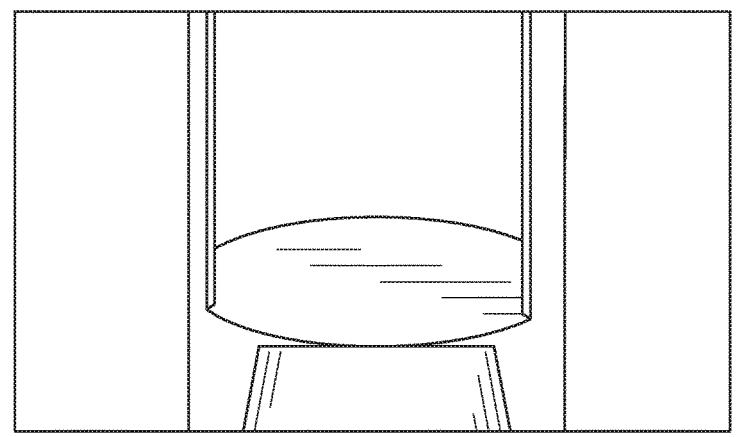
FIG. 26

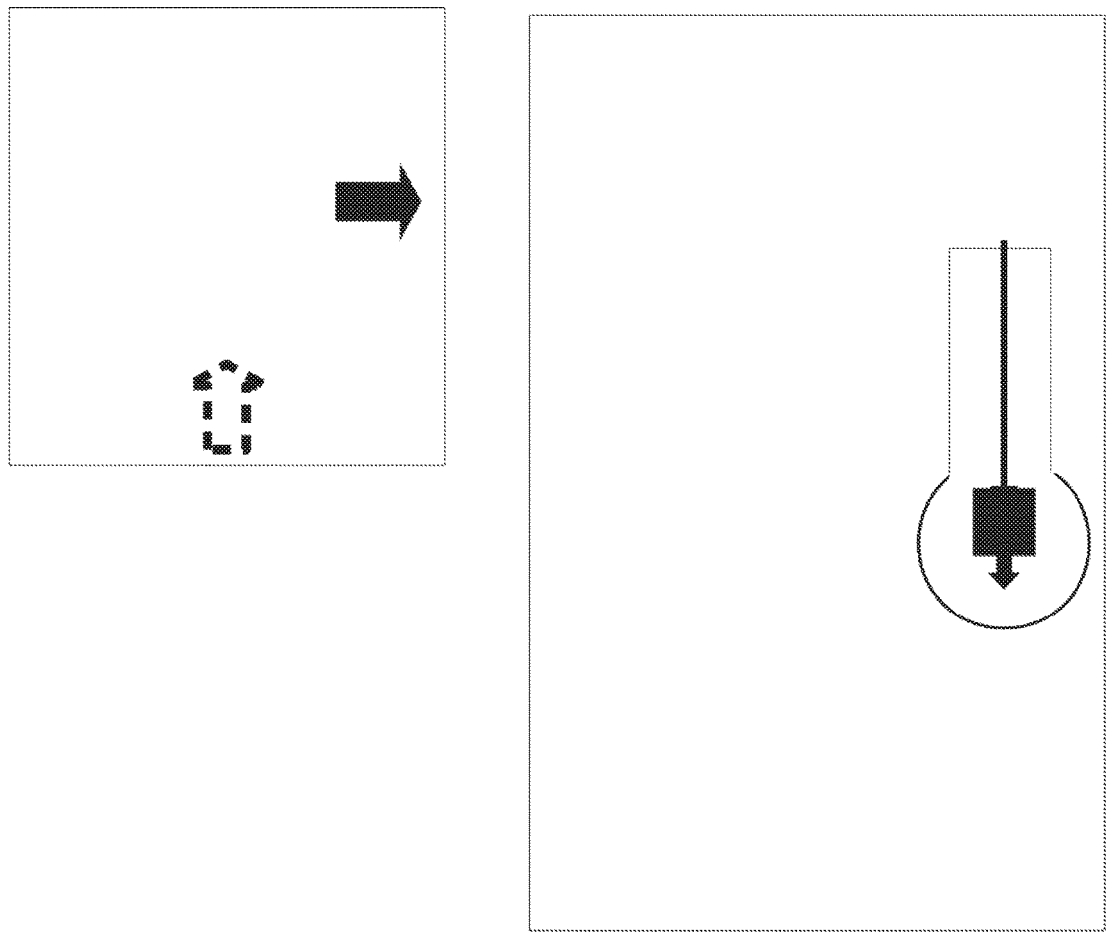
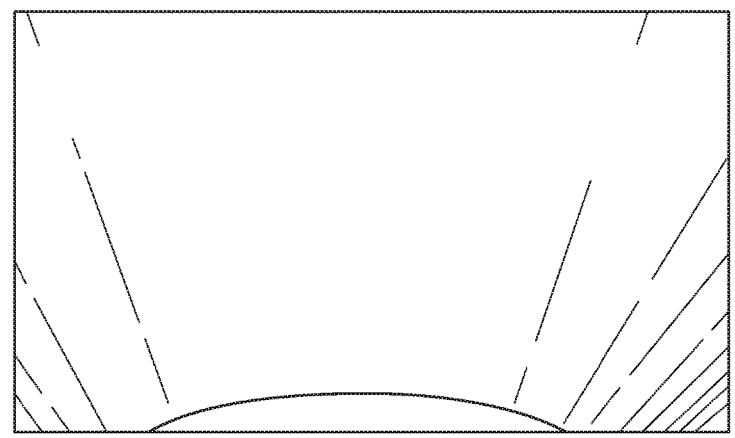
FIG. 27

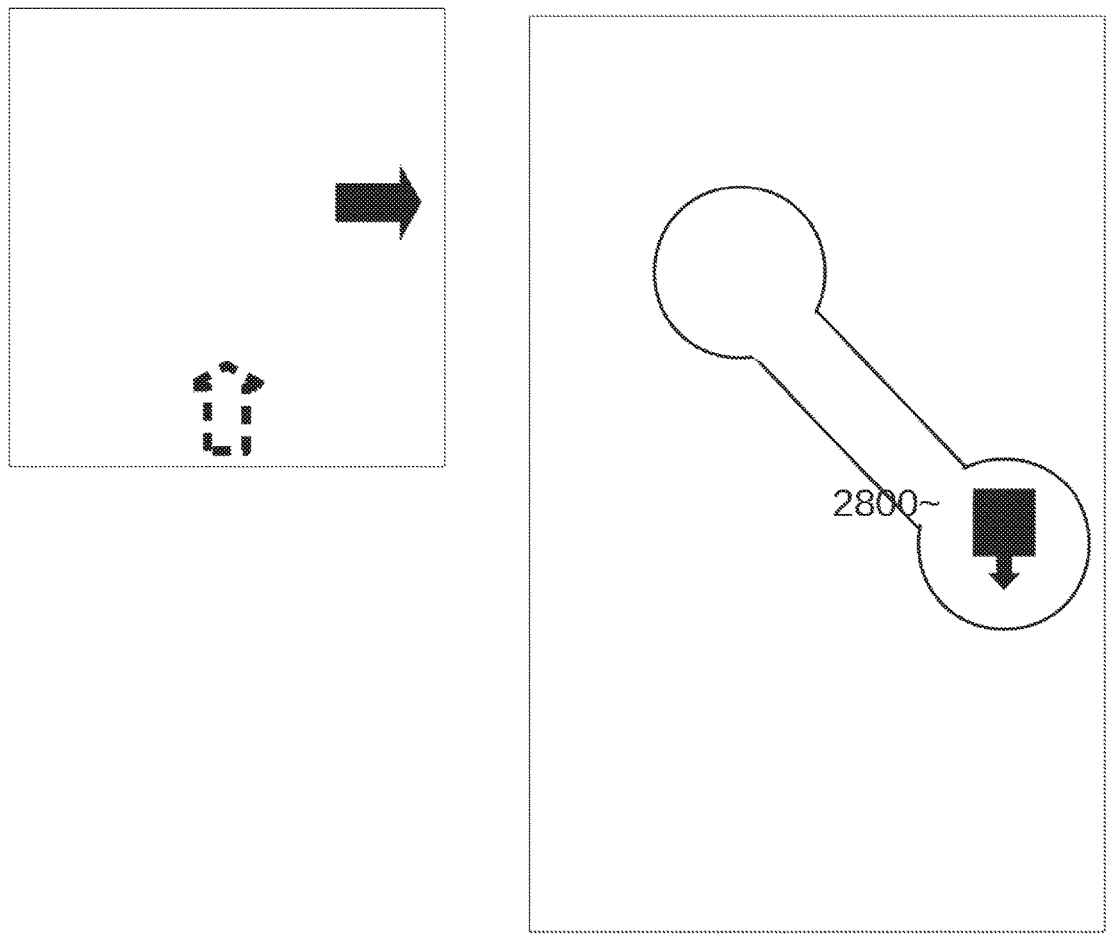
FIG. 28
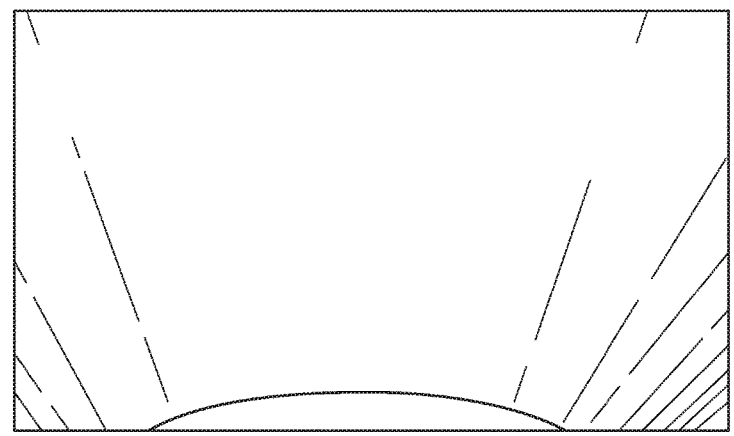

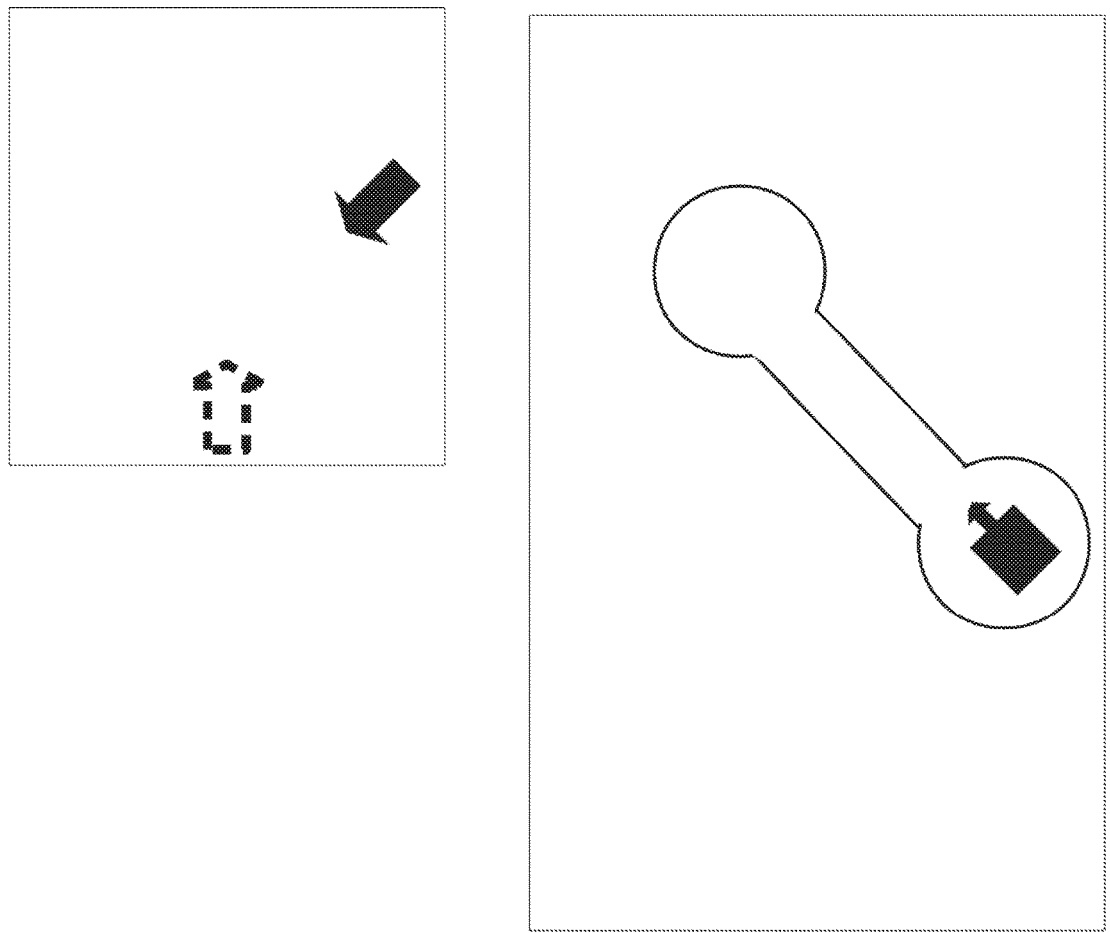
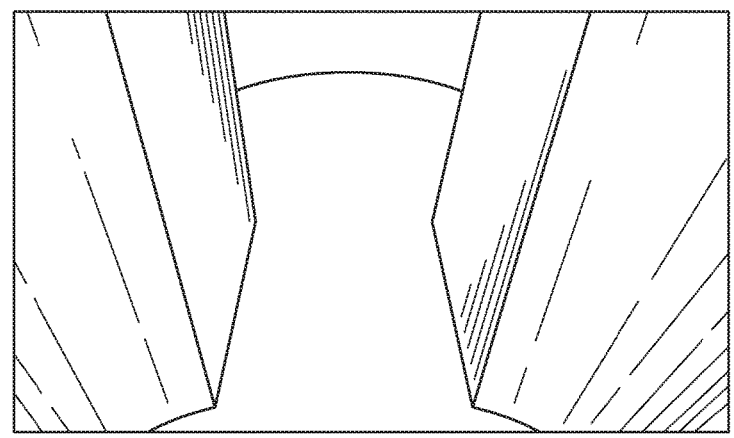
FIG. 29

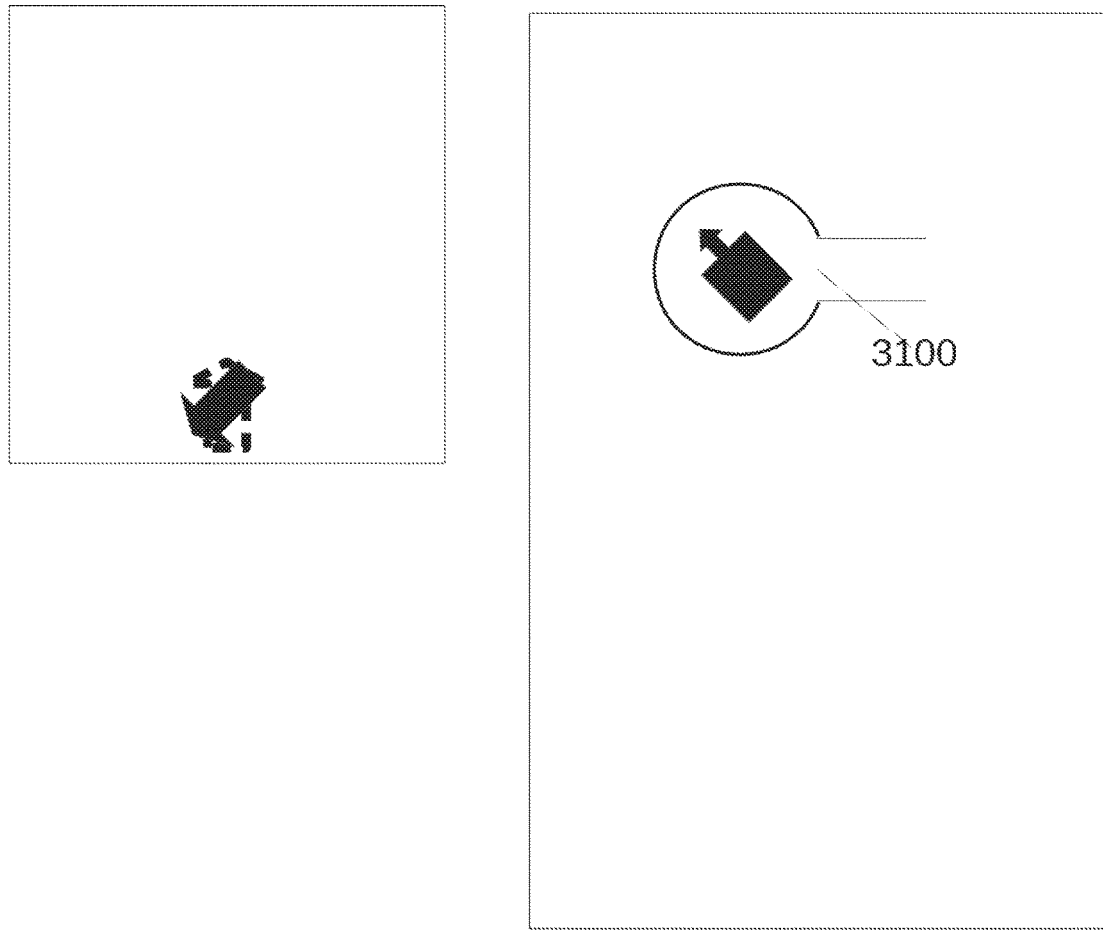
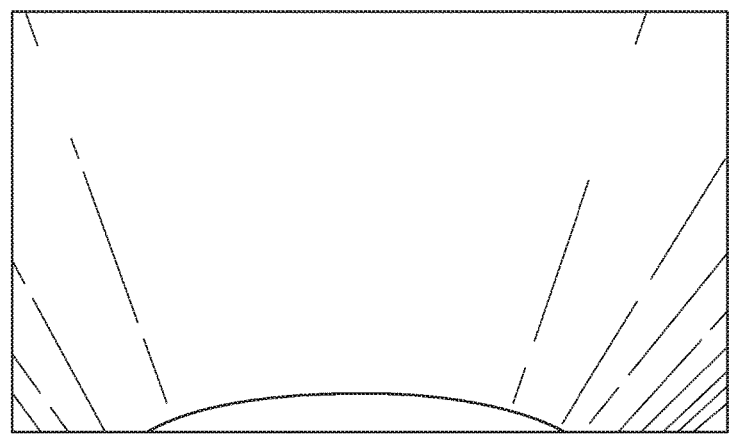
FIG. 31

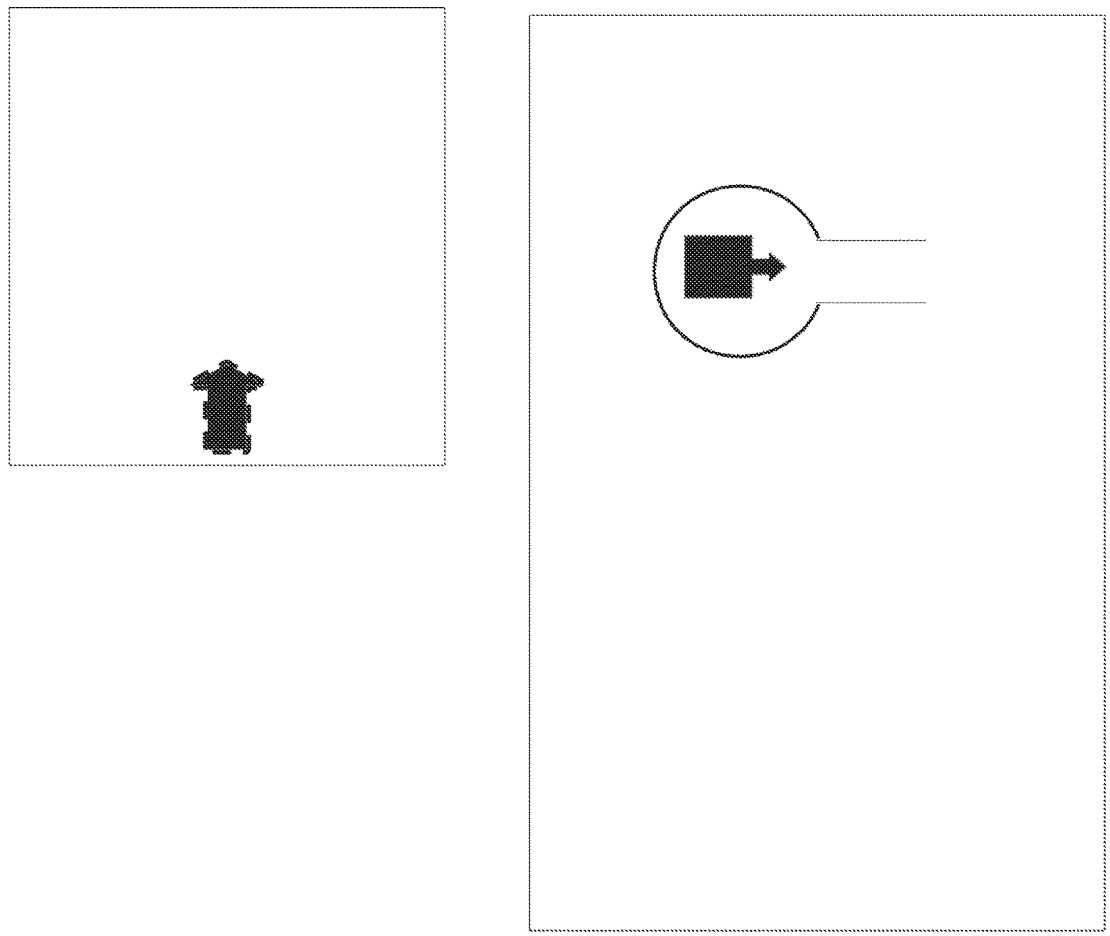
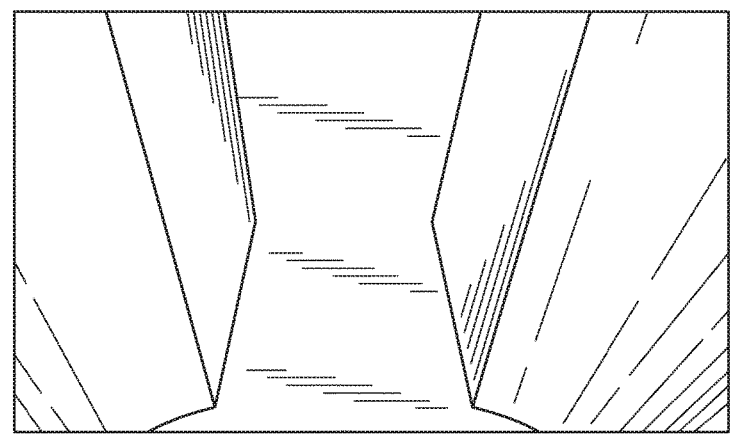
FIG. 32

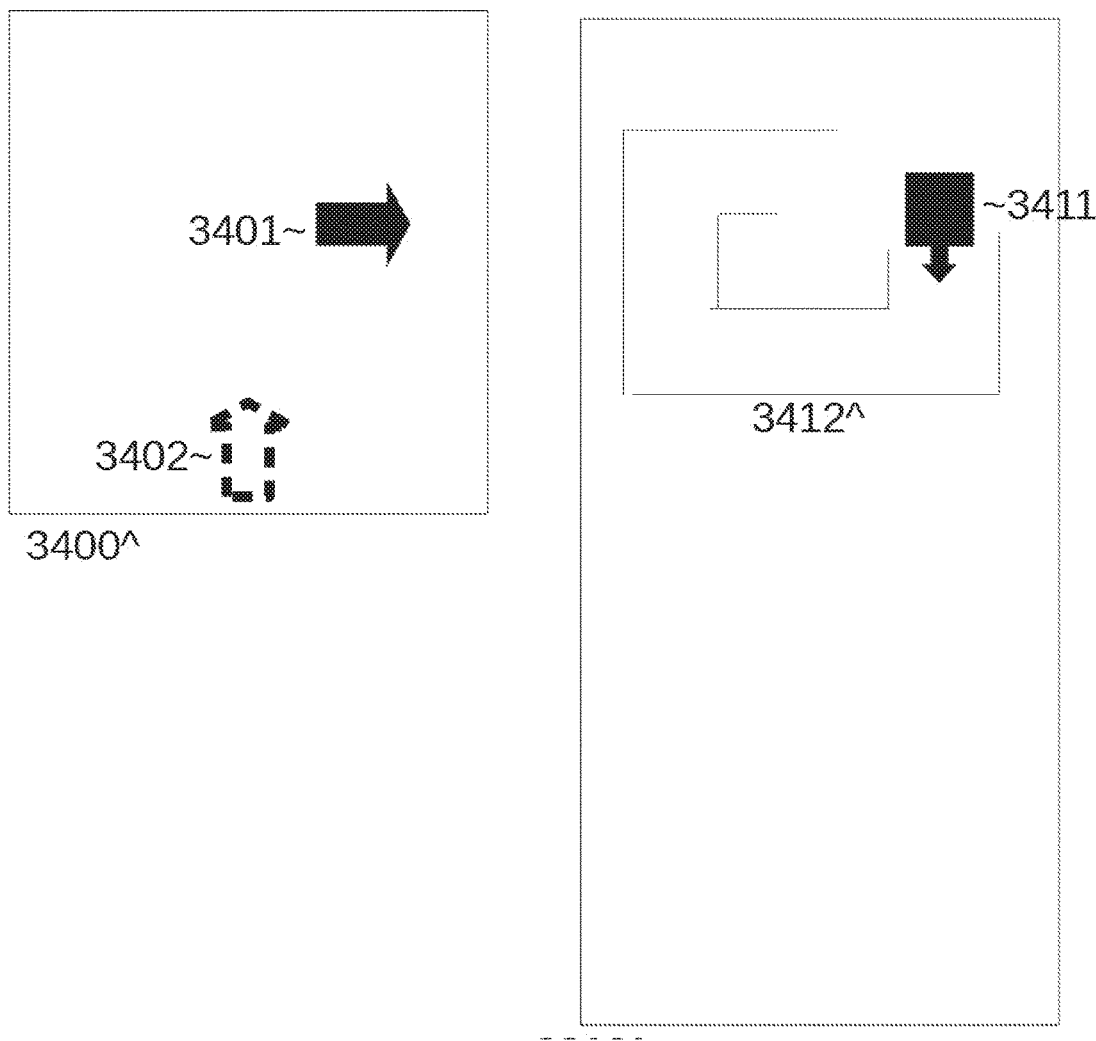
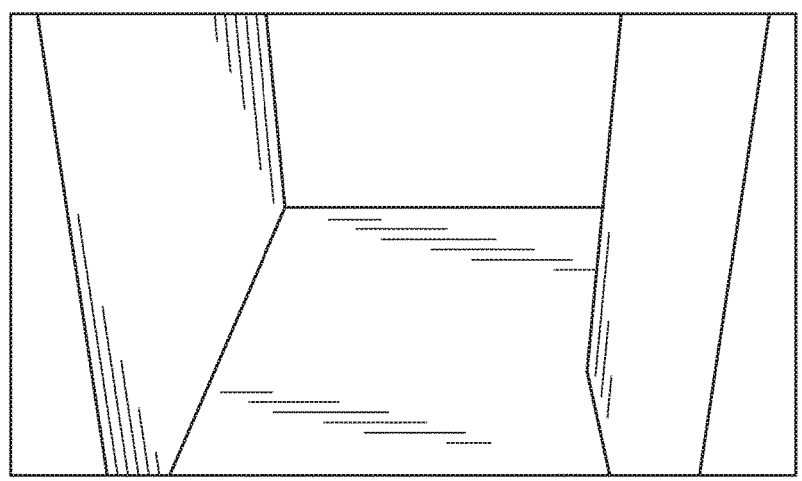
FIG. 34

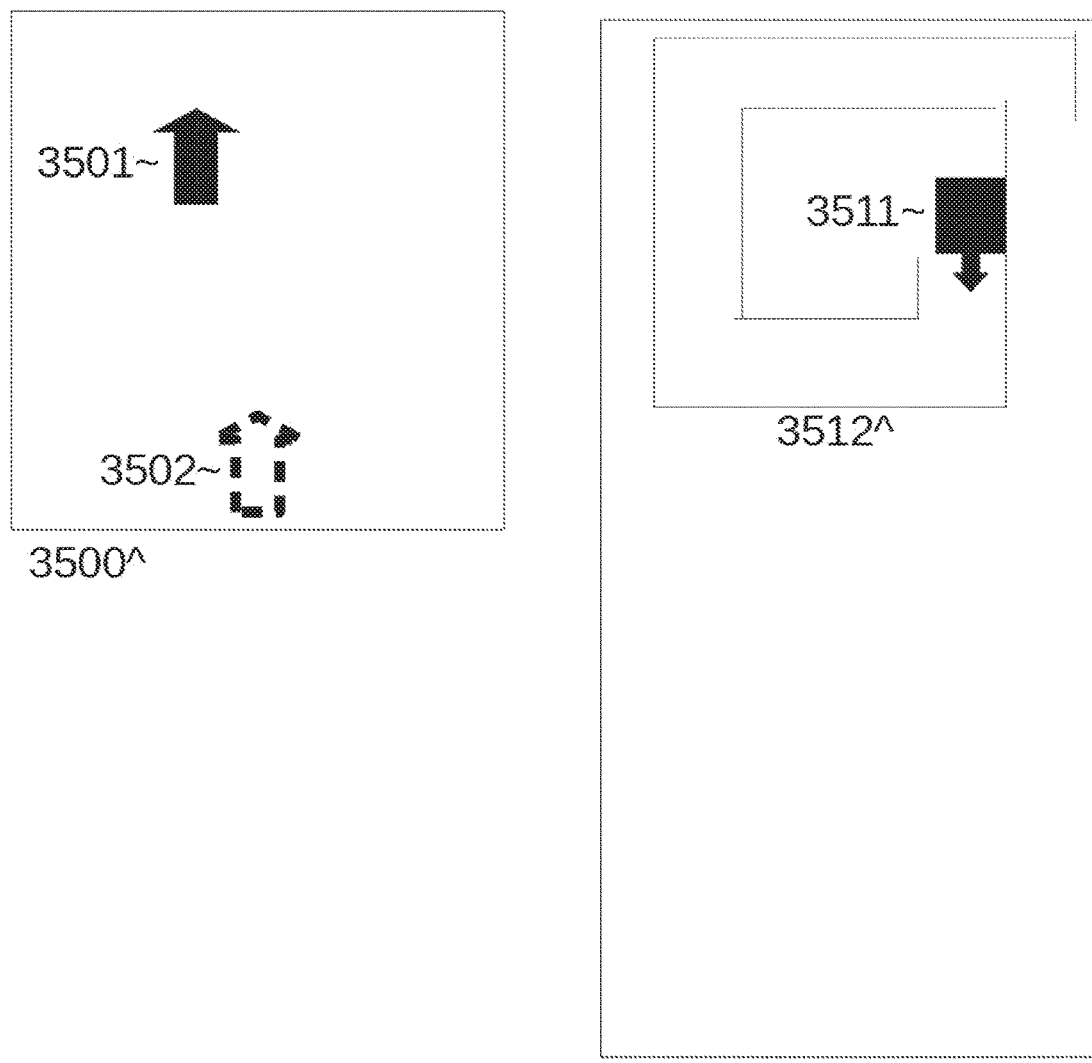
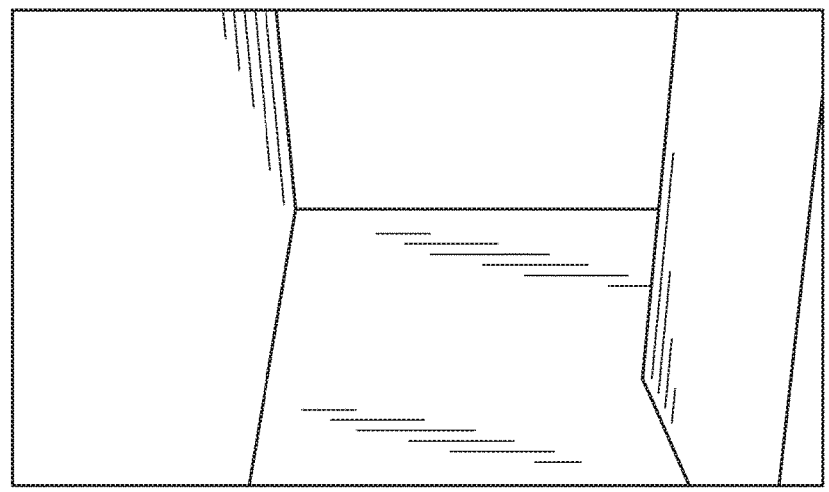
FIG. 35

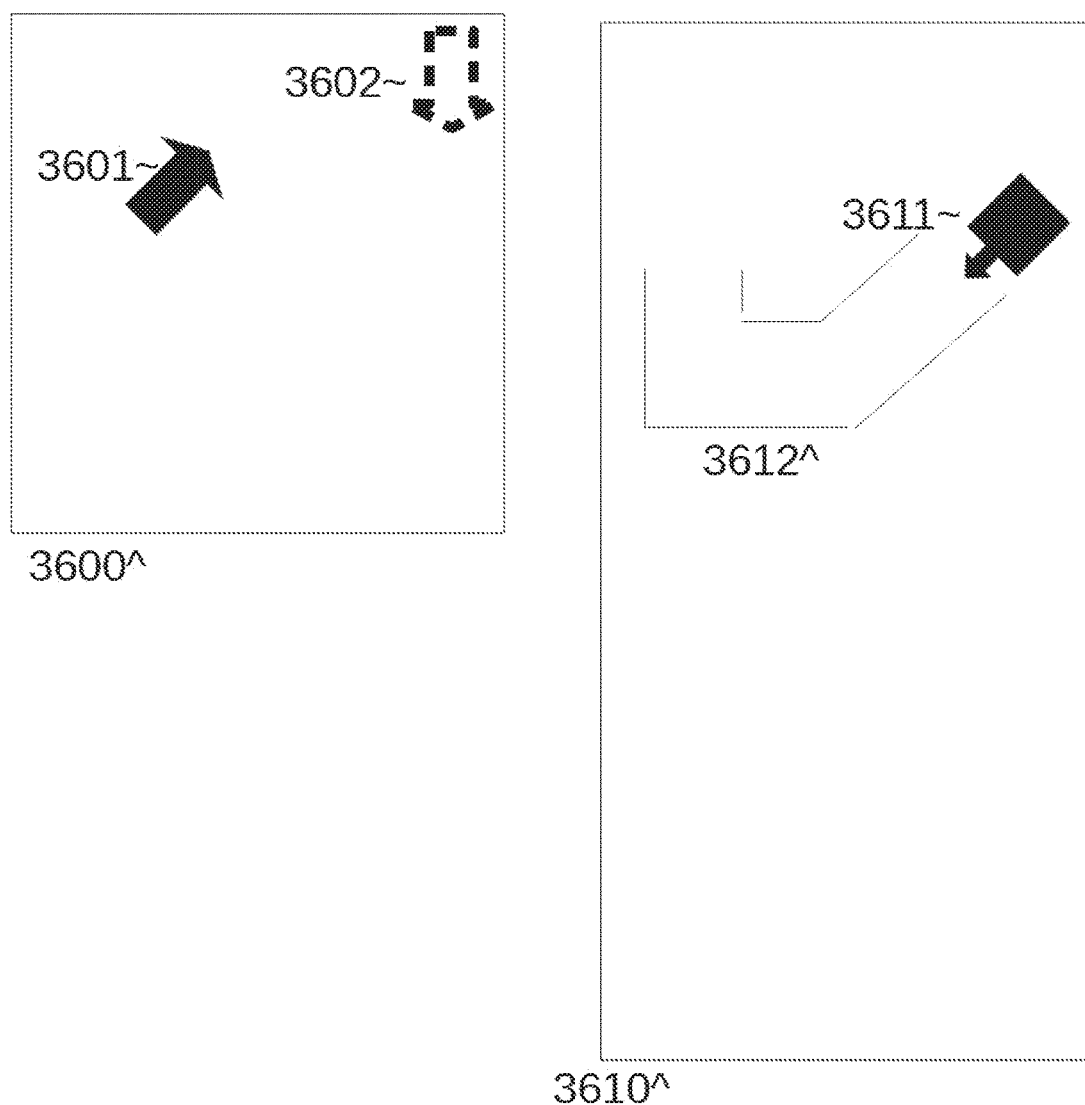
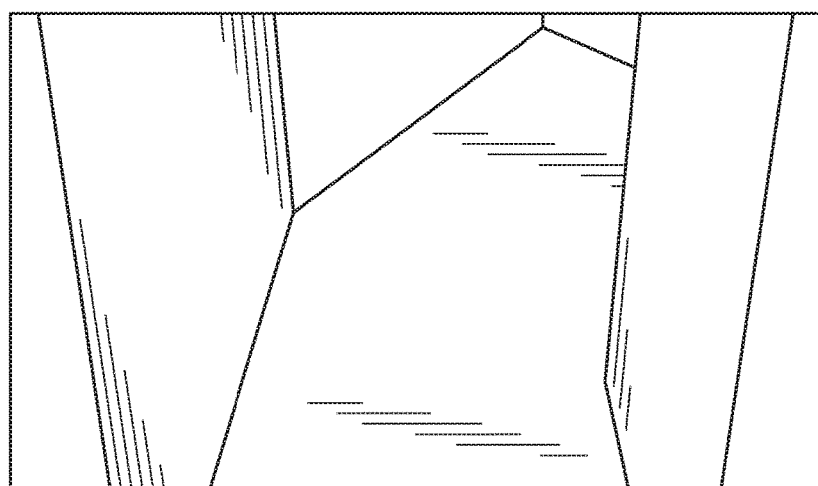
FIG. 36

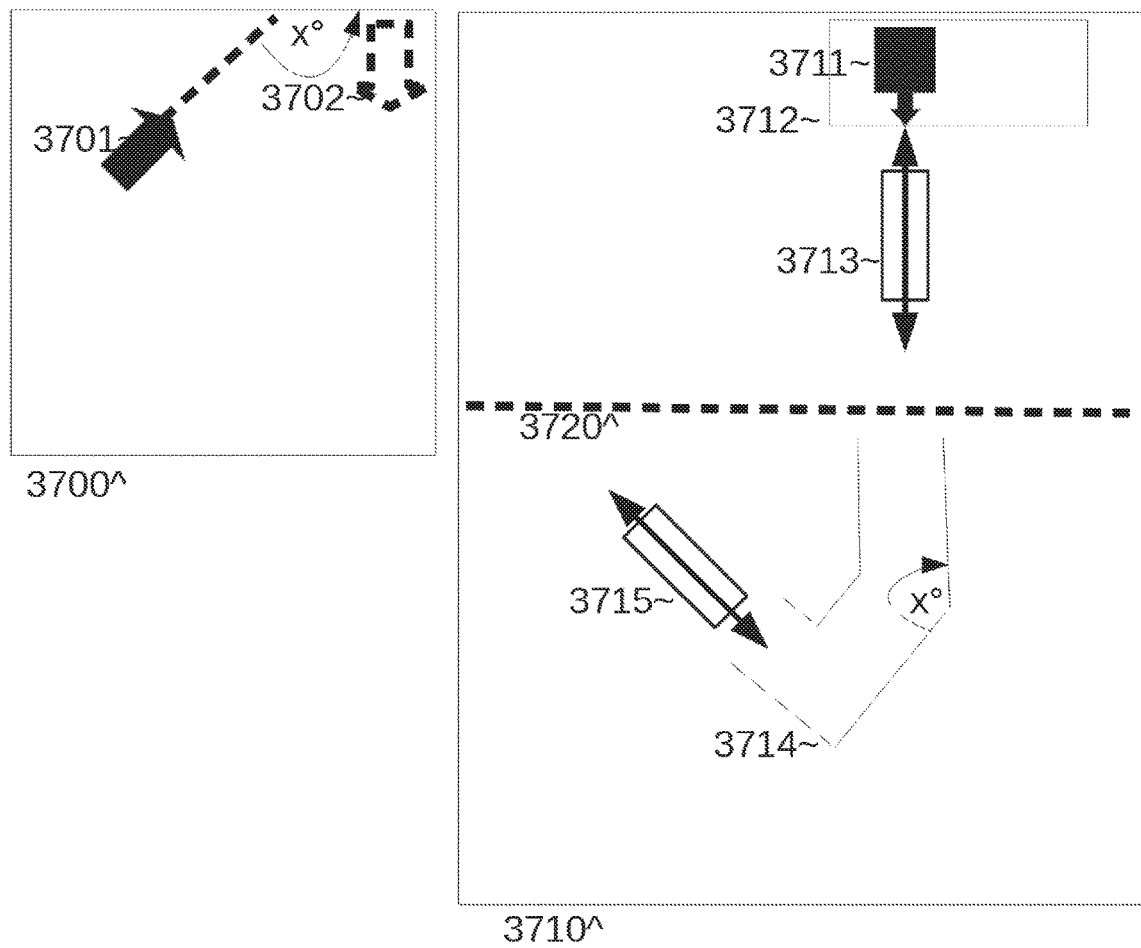
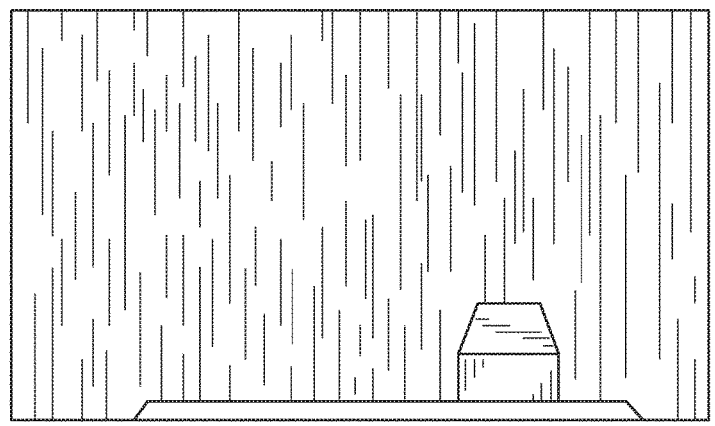
FIG. 37

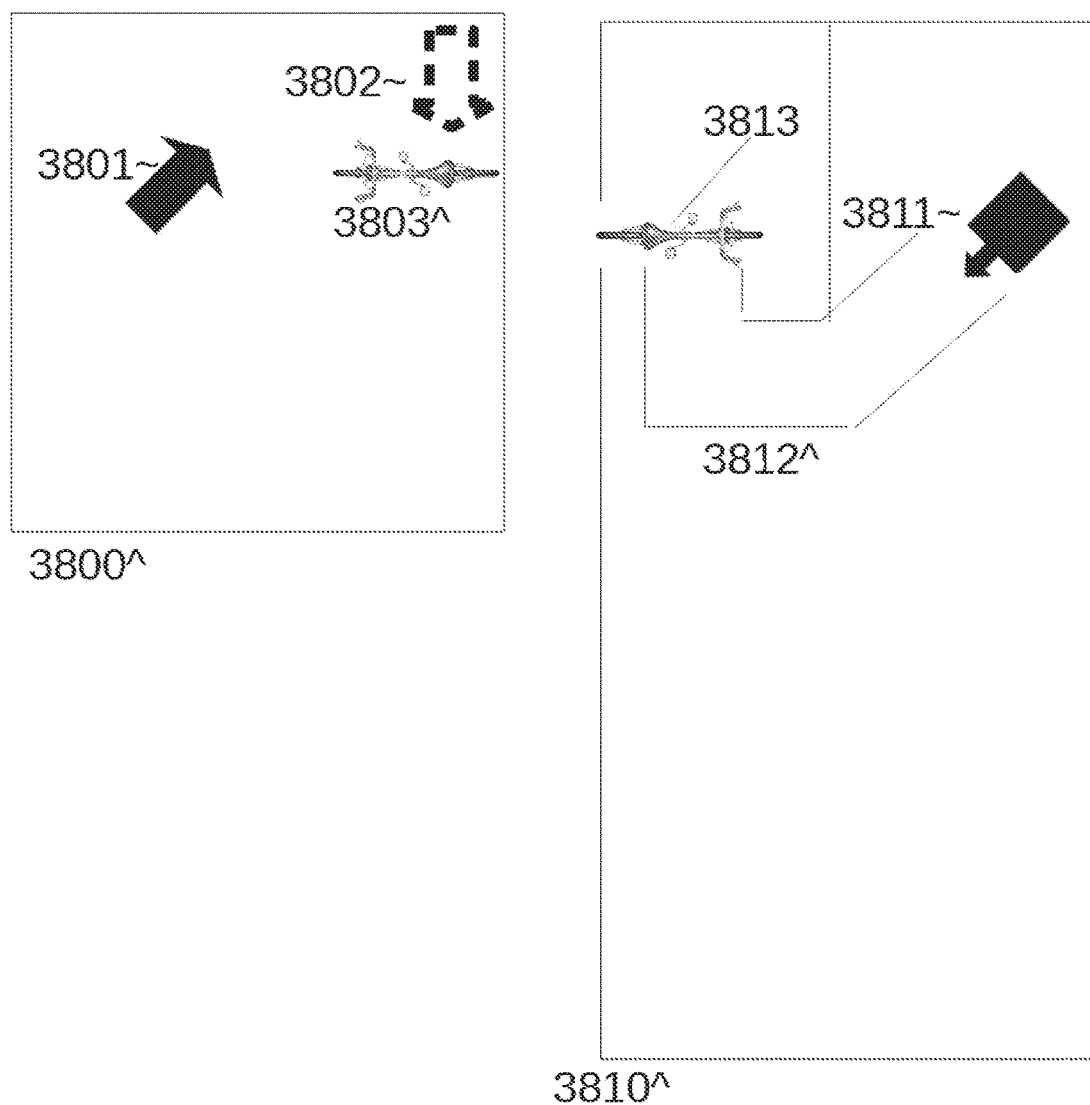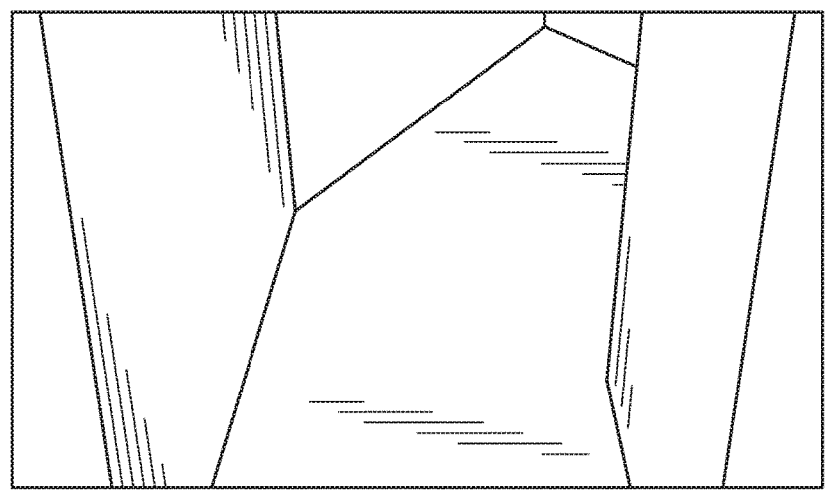
FIG. 38

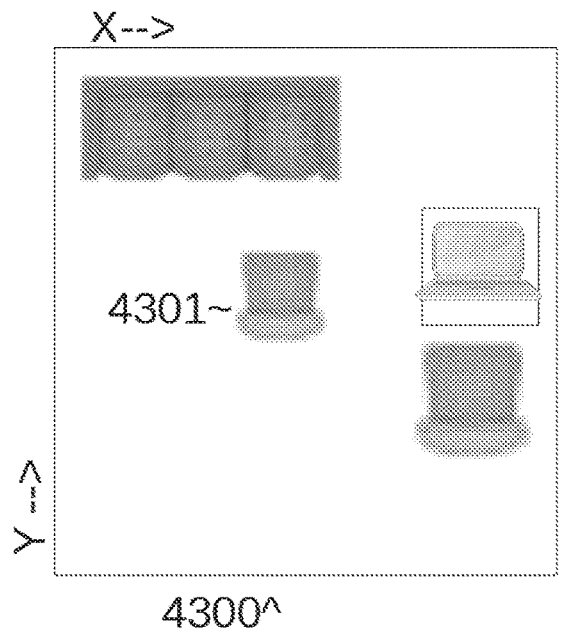
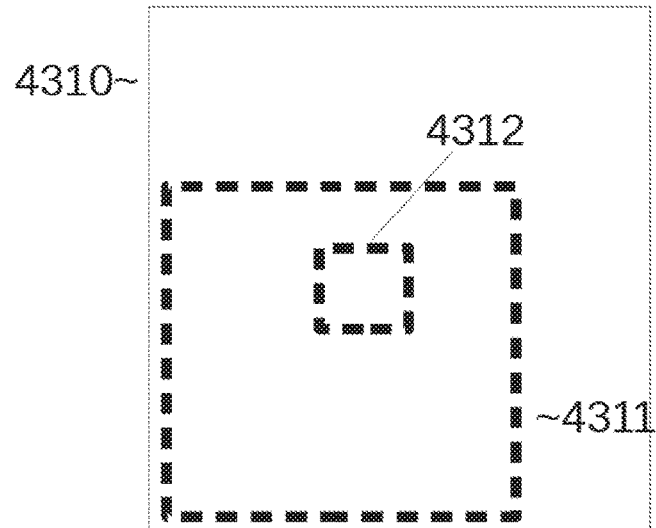
FIG. 43

COLLISION AVOIDANCE SYSTEM FOR HEAD MOUNTED DISPLAY UTILIZED IN ROOM SCALE VIRTUAL REALITY SYSTEM

BACKGROUND OF THE INVENTION

Field of the Invention

The present general inventive concept is directed to a method, apparatus, and computer readable storage medium directed to implementing a room scale virtual reality system which enables players to walk through a large virtual playing area in a physically limited size room. U.S. application Ser. No. 15/818,690 is incorporated by reference herein in its entirety.

Description of the Related Art

Virtual reality systems exist in which the player can play "room scale" virtual reality. This is where the player physically walks around a room while seeing corresponding motion in the virtual world using his/her virtual reality headset.

SUMMARY OF THE INVENTION

It is an aspect of the present invention to provide an improved virtual reality system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2 is a drawing illustrating a physical room used by the player and a virtual representation of the room which can be displayed on the player's computer screen, according to an embodiment;

FIG. 3 is drawing illustrating a representation of the physical room in the upper left, a representation of the player in the virtual world in the upper right, and a virtual view from the virtual player's perspective on the bottom, according to an embodiment;

FIG. 5 is a drawing illustrating the player starting to enter the rotator, according to an embodiment;

FIG. 6 is a drawing illustrating the player actually inside the rotator, according to an embodiment;

FIG. 7 is a drawing illustrating the rotator in an intermediate rotated state, according to an embodiment;

FIG. 8 is a drawing illustrating the completed rotational sequence wherein the rotator has (in the virtual world) rotated 180 degrees, according to an embodiment;

FIG. 9 is a drawing illustrating the player in the process of turning himself/herself around, according to an embodiment.

FIG. 11 is a drawing illustrating the player continuing walking in the original direction in the virtual world (0 degrees), while the player now walks 180 degrees in the physical world, according to an embodiment;

FIGS. 14A and 14B are drawings showing a six cell virtual world and how a rotator can also move in the virtual world in addition to spinning, wherein FIG. 14A comes first and then FIG. 14B would occur in time sequence after 14A, according to an embodiment;

FIG. 16 is a drawing illustrating a teleporter 1600 in the virtual world, according to an embodiment;

FIG. 17 is a drawing illustrating a point after the player steps into the teleporter 1600 and the teleporter is activated, then the player teleports (relocates in the virtual world), according to an embodiment;

FIG. 18 is a drawing illustrating how the player is (or should be) facing 180 degrees in the physical world and 0 degrees in the virtual world, according to an embodiment;

FIG. 19 is a drawing illustrating the player's physical orientation in the physical room against is 10 degrees, according to an embodiment;

FIG. 20 is a drawing illustrating the player coming out of the second teleporter after FIG. 19, according to an embodiment;

FIG. 25 is a drawing illustrating a directional change structure, according to an embodiment;

FIG. 26 is a drawing illustrating that the moving walkway (or moving platform) has moved, according to an embodiment;

FIG. 27 is a drawing illustrating that player has physically stepped into the directional structure in the virtual world and hence has moved in the physical world, according to an embodiment;

FIG. 28 is a drawing illustrating that the opening to the walkway has now closed and a new opening in the directional change structure has opened, according to an embodiment;

FIG. 29 is a drawing illustrating how the player has now physically turned himself/herself towards the new opening in the directional structure, according to an embodiment;

FIG. 31 is a drawing illustrating that a new opening in the second directional change structure has opened, according to an embodiment;

FIG. 32 is a drawing illustrating that the player has now turned himself/herself to face the new opening in the second directional change structure, according to an embodiment;

FIG. 34 is a drawing illustrating how the player in the physical room has a desired position, according to an embodiment;

FIG. 35 is a drawing illustrating a walkway, according to an embodiment;

FIG. 36 is a drawing illustrating another example of a dynamically generated walkway, according to an embodiment;

FIG. 37 is a drawing illustrating a dynamically generated walkway and moving walkways, according to an embodiment;

FIG. 38 is a drawing illustrating a physical room which has a player and the desired position, according to an embodiment;

FIG. 43 shows a physical room and a virtual representation of the physical room, according to an embodiment;

DESCRIPTION OF THE PREFERRED EMBODIMENTS

Figure 1:
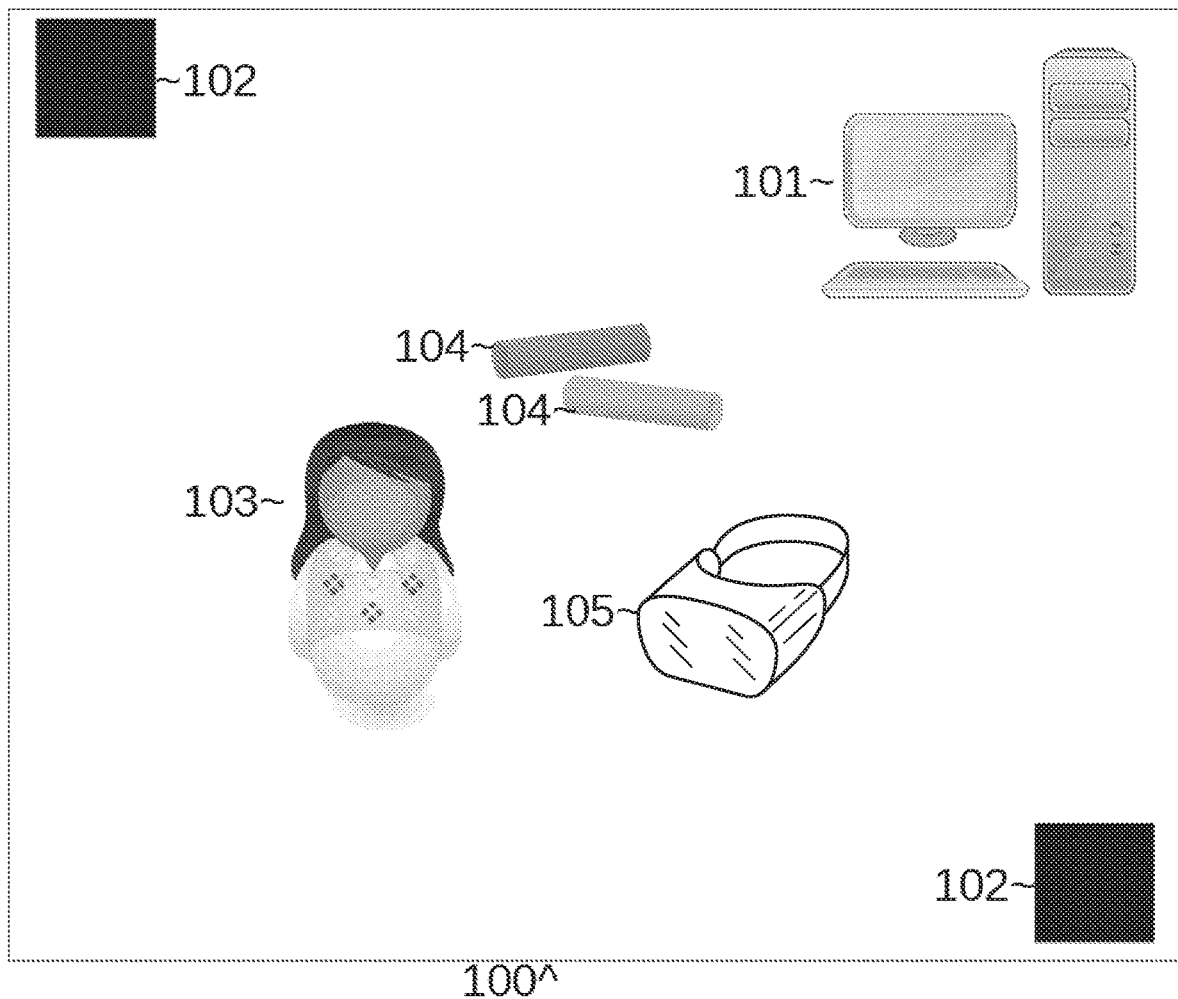
FIG. 1 is a drawing illustrating a virtual reality room with virtual reality equipment, according to an embodiment.

Reference will now be made in detail to the presently preferred embodiments of the invention, examples of which are illustrated in the accompanying drawings, wherein like reference numerals refer to like elements throughout.

The present inventive concept relates to a room scale virtual reality system which enables a player to walk through a large (in theory infinite) virtual world (VW) while confined to a single physical real world (RW) room (also referred to as physical room). In a virtual world (virtual reality), the player is wearing a headset which entirely (or predominantly) covers the players field of view in the real world and is presented with an entirely artificial (computer generated) 3-D world which replaces the real world (so the player cannot typically see anything from the real world in front of him unless these are generated into the virtual world). In addition to virtual reality, the methods described herein can also be applied to augmented reality, in which the player can see the real world (either through an electronic output device in a headset captured by a camera) or by enabling the player to view the real world through a lens which can generate computer generated images on top of this lens (thus the player's view of the real world is "augmented"). Virtual reality systems are described in US patent publications 2016/0140930 and 2015/0116316, both of which are incorporated by reference herein in their entireties.

FIG. 1 shows a basic physical virtual reality room 100, with a human player 103, two controllers 104 (which can be tracked both by position and orientation), a virtual reality headset 105 which the player wears over his/her head and eyes and is also tracked by position and orientation. The position and orientation of the headset 105 and controllers 104 is computed (as described herein) and transmitted (using cables or wirelessly) to the computer 101 (and more specifically a game software running on the computer). The game software has an interface with positional detectors 102 (see also 3808), which detect the headset 105 (and hence the player) and the controllers 104 thus allowing the game software (or other module in communication with the game software) to computer the physical location and orientation of the headset 105 (and hence the player) and the controllers anywhere in the room 100. The physical location means in 3-D space (x,y,z) coordinates (although detecting the height can be optional) and orientation means the exact way the object is facing (with no degrees of freedom so we know where each face of the object is facing).

In the physical room, the game system can identify walls. This can be done using detectors (e.g., positional detectors 3808 or other equipment such as cameras) to identify where the walls are in order to implement methods described herein to prevent the player from hitting the wall and interrupting the virtual reality experience.

In another embodiment, the player can initialize the game system by identifying to the game system where the boundaries of the area the player wishes to be confined to ("play area") when playing a room scale virtual reality experience (game). "Wall" as used herein to describe a wall in the physical room can also include the player defined boundaries which will basically serve as "walls" inasmuch as the player should be confined to within these boundaries. FIG. 2 illustrates a physical room 200 used by the player and a virtual representation 210 of the room which can be displayed on the player's computer screen 202. In the physical room 200 there is a couch 201, chair 203, and table with a computer on it 202. Of course, when the player is playing the room scale virtual reality experience, the player does not want to run into these physical objects and thus can draw the boundary 211 to avoid any physical objects therein. The player should typically move any physical objects (e.g., furniture) located inside the boundary 211 to outside of the boundary 211 so that the player can walk freely inside the boundary without fear of walking into anything (e.g., the area inside the boundary should be obstruction free). The player can set the boundary in numerous ways, for example the player can use controller (the location of which is tracked by the virtual reality system) and walk around the boundary so that the game system records the boundary. Note that while the boundary in FIG. 2 is drawn to be square, the boundary 211 is not required to be a square and can be any shape. Thus, the boundary 211 can also be considered "walls" as used herein and the methods described herein can be applied such that the boundary can serve as walls. Note that two real physical walls (the bottom and the left) are adjacent (or can be coincident) to the boundary while the other two sides of the boundary do not border a wall.

The area of the physical room in which the player can walk around in is important because while the player is limited to ambulating in this area, embodiments of the present invention describe how given this finite area the player can nevertheless experience a seemingly infinite virtual world.

In an embodiment, when the player walks and approaches a wall in the physical room, the player will see in the VW a rotator. A rotator is a device that the player steps into (typically round although it can be other shapes) with a barrier in front of it so that the player cannot continue walking through it. In the virtual world, the barrier can have the appearance of any material (e.g., metal) or it can be transparent (e.g., glass) so the player can see, but not pass, through the barrier. The rotator can then be initiated (automatically by virtue of the player walking inside) or a button can be present on the rotator that the player pushes to initiate the rotate. When the rotator is initiated, the rotator will rotate in the VW (typically 180 degrees although other rotational degrees can be used as well). Now the player in the VW is facing the opposite direction than which he/she originally was walking when he/she stepped into the rotator. However, the barrier is now still in front of the player (since the barrier rotates along with the rotator) and so the player would physically turn himself around in the real world to continue walking. As the player turns himself around, he is also turning himself around in the virtual world since in room scale VR, all of the players physical motions are translated into the virtual world as well. Now the player can continue walking out of the rotator. In the physical world, the player has now physically turned himself around and now has space to walk forward in the physical room. In the virtual world, the player has now turned so that he can continue walking in the original direction he started in when he entered the rotator. The player can be presented with a series of rotators in the virtual world which enable the player to access other parts of the virtual world and force the player to physically turn himself around. In this manner, the player can play a room scale virtual reality game but traverse larger virtual world without any unnatural interruptions (e.g., bumping into a wall).

Note that the 'C' in the center of the boundary represents the center of the boundary. Identifying the center can be useful in many embodiments described herein. For example, in the embodiments below where a desired position is determined (a position that player is coaxed into assuming which includes the physical location in the boundary as well as the orientation of the player (the direction the player is facing)), the orientation of the desired position can be pointing towards the center of the boundary. Thus in any embodiment herein utilizing a desired position, the orientation which is part of the desired position used therein can either be predetermined, can be determined to be pointing to the center of the boundary, or determined using any other method. Having the player oriented towards the center of the boundary is advantageous in that the player would now typically have plenty of room in front of the player to walk and play. In addition, the desired position (location of the player inside the boundary) can be predetermined to be a fixed location (e.g., a location on or closest to the boundary near the player's computer or other object) with (optionally) the orientation towards the center of the boundary (or the desired position (location inside the boundary) can be determined using other methods such as predetermining it based on the boundary or content of the virtual world the player is about to play inside of. For example, the desired position 205 can be at a particular predetermined location (which can be determined by the game or specified by the player) in the room facing the center. More on desired positions will be discussed below.

FIG. 3 shows a representation of the physical room in the upper left. In this example, the physical room is a square but in other embodiment, the physical room can be other shapes as well (such as rectangles, arbitrary polygons, etc.) The physical player is represented by the arrow. The direction of the arrow shows the orientation (where the player is facing) and location of the player.

The right area shows a representation of the player (shown by the cutoff arrow) in the virtual world. In the virtual world, the player has a virtual orientation and a virtual location in the virtual world. The virtual location can be expressed as a series of coordinates (x, y, and z), wherein in this example the x-axis is horizontal, the y-axis is vertical, and the z axis is orthogonal to the x-y plane. The virtual orientation can be an angle (such as looking from the top (over the player) down) and can be which direction the headset if facing (the player is looking). The virtual orientation can also be a vector in which the headset if facing (the headset orientation can be tracked combining two full degrees of freedom thereby allowing the player to look (and be tracked) in any possible direction the player is looking in). This vector can be expressed numerous ways, such as in vector form, or using two angles (e.g., the angle the player is looking from the reference of looking down on the player, and the angle the player is looking relative from the floor to the ceiling (e.g., looking straight up can be 90 degrees, looking straight down can be 180 degrees, etc.) Note the physical room has coordinates (in this example, the room is 100 square feet, so the dimensions of the room are 10 by 10. The coordinates of the player are (5, 2.5, 0) meaning the player's x location is 5, the player's y location is 2.5, and the player's height is 0. In some systems, the player can physically climb in the physical room thereby giving the player a height (z-axis) greater than 0.

The right part of FIG. 3 shows the player in the virtual world looking at an orientation of 115 degrees (the second angle/degree of freedom is not specified). Note that the angle the player is looking in the virtual world is different from the angle the player is looking in the real world, as these do not have to be identical (and typically are different although they can possibly be the same as well). Note the physical location (coordinates) in the physical room is different than the location (coordinates) in the virtual world, as these will typically be different. Note that the size of the virtual world in this example is (1000, 2000) although of course any size can be used. The virtual world can also have a height dimension (z-axis) as well (e.g., 1000 height).

Also shown on the bottom of FIG. 3 is a simple view of what the player might see in the virtual world (through his/her headset). He will see the wall (in gray), the floor, the ceiling, and any other objects (not shown). Of course, animated objects and characters (e.g., virtual people, monsters, etc.) can be shown in the virtual world as well. Note that a lot of the other Figures use this same format (i.e., physical room in upper left, corresponding virtual world in upper right, bottom shows the corresponding view from the player's perspective (can be considered the physical player's view through the headset or the virtual player's view looking in the virtual world).

Figure 4:
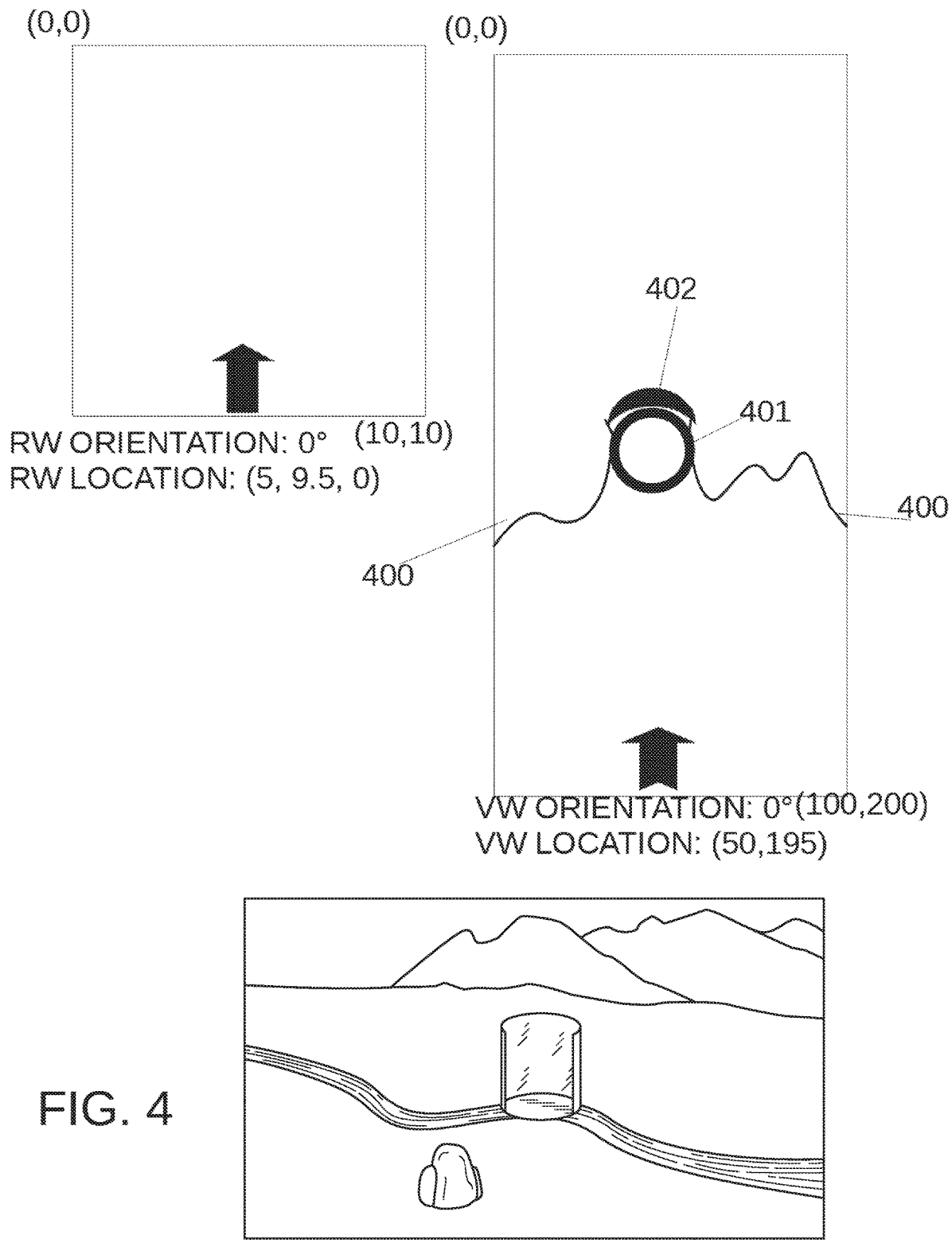
FIG. 4 is a drawing illustrating the player starting to approach the rotator, according to an embodiment.

In FIG. 4, the player has a location of 5, 9.5 and is looking forward (0 degrees). In the virtual world, the player is also looking forward at 0 degrees in a position of 50, 195. Note there is an obstacle 400 that the player cannot physically walk past in the virtual world. The obstacle can, for example, be water, a fire, a wall, a steep drop, etc. If the player does physically walk so that the player collides with the obstacle in the virtual world, the player could face adverse consequences (e.g., burns in fire and dies, drowns in water, falls off ledge, etc.). Thus, the player typically will not be able to cross the obstacle by simply walking across it.

A rotator 401 has a barrier 402 that the player is prevented from passing through. In an embodiment, the barrier can also translate to a real wall in the physical world and so the player really cannot continue walking through the barrier. In any case, in the virtual world, if the player attempts to walk through the barrier the player can face an adverse consequence, such as not being allowed to proceed (e.g., the player physically walks but does not move forward in the virtual world), gets a shock, etc. Thus, the player must walk into the rotator and stand on it. The obstacle is continuous and connects to the barrier so that the player cannot circumvent the obstacle and the barrier and continue walking forward (e.g., the north (0 degree) direction in FIG. 4).

The player continues to walk towards the rotator, and FIG. 5 shows the player starting to enter the rotator.

FIG. 6 shows the player actually inside the rotator. As illustrated, the player cannot proceed in the forward (0 degree) direction any further due to the obstacle and the barrier.

When the player steps into the rotator (the rotator can comprise a disc/circle on the ground), the rotator can be initiated. The initiation can be automatic (e.g., once the player steps onto the rotator) or can be initiated by the player (e.g., by the player pressing a button on the rotator (or a barrier), or pressing/triggering a button on a remote control, or speaking a command). A virtual button to initiate the rotator can be present in the barrier (which translates to a wall in the physical room). The virtual button can appear in the virtual world on the barrier and the player can physically press the virtual button in which the player would actually feel the physical wall. The virtual reality system has sensors which can detect the player's hand motion of pressing the virtual button (the player is physically touching/pressing a particular location on the wall) and when this is detected this initiates the rotator. In this way, the player actually feels physical feedback (the wall) when pressing the button, adding to the virtual experience.

When the rotator is initiated, the rotator in the virtual world will rotate (in one embodiment 180 degrees). Note that the rotator can be a rotating disc on the ground which rotates and thus takes the player around with it (in the virtual world, in the real world the player of course is not being rotated).

FIG. 7 shows the rotator in an intermediate rotated state. FIG. 8 shows the completed rotational sequence wherein the rotator has (in the virtual world) rotated 180 degrees. Note that the rotational sequence will rotate the player 180 (or other) amount in the virtual world but it typically would not be a sudden change. The rotation should happen gradually, such as a loop from the original facing direction (0 degrees) to the final direction (180 degrees) by showing the player each orientation from 0 to 180 (and can be done in increments of a fraction of a degree such as ¹⁄₁₀ of each degree to make the rotation appear even smoother). In other words, the player sees a smooth rotation (not jerky) from the initial position to the final position as if the player were really spinning around. Note that while the player is rotating in the virtual world, the player is not rotating in the physical (real world). The player maintains his/her same orientation in the physical world as before the rotation.

Now because the rotator has rotated and the barrier rotates with the rotator, the player is now free to continue walking in the same original direction (0 degrees). However, since the player is now facing 180 degrees in the virtual world, the player would physically turn himself/herself around 180 degrees and continue walking 0 degrees in the virtual world. In the physical world, the player is now facing (and hence walking) in the opposite physical direction (away from the wall) thereby enabling the player more walking space to continue the game.

FIG. 9 shows the player in the process of turning himself/herself around. When the player rotates in one direction (e.g., clockwise) in the physical world, the player also rotates the same direction (e.g., clockwise) in the virtual world. The same is true for turning in the counterclockwise direction.

Figure 10:
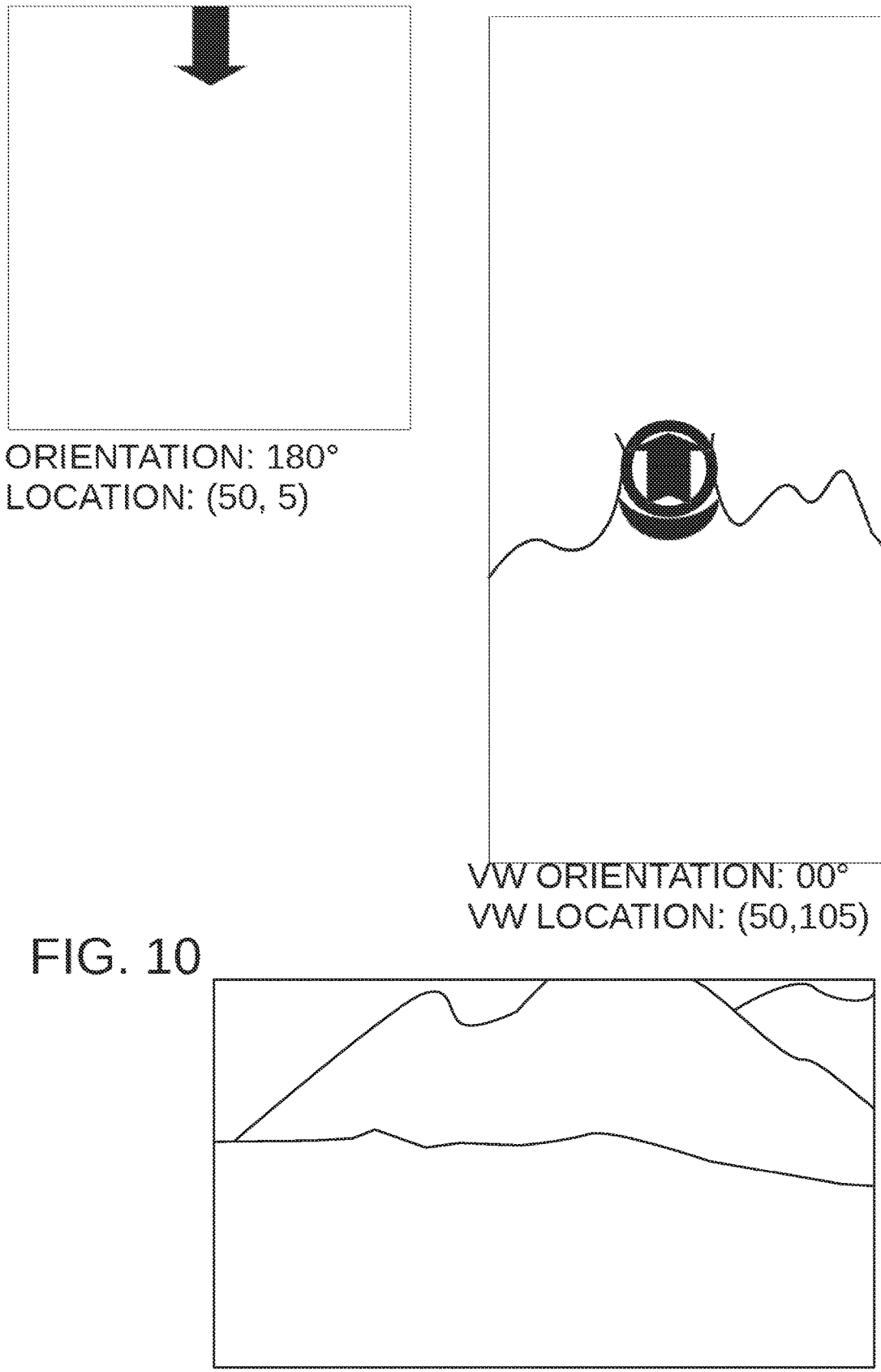
FIG. 10 is a drawing illustrating the player after he/she has completed turning himself around, according to an embodiment.

FIG. 10 shows the player after he/she has completed turning himself around.

The player is now physically (in the real world) facing the other direction (than before activating the rotator) and can walk forward inside the game (as the player now has physical space to walk). In the virtual world, the player continues on in the 0 degree direction and has now passed the obstacle.

Typically, if the player wishes to go in the other direction (walk 180 degrees in the virtual world), the player can re-enter the rotator and activate it, and the same process will happen again (the rotator will now rotate 180 degrees or other amount), thereby enabling the player to continue walking south (180 degrees) in the virtual world.

Note that while the rotate can rotate 180 degrees, this assumes the player is directly facing the wall in the physical world. In an embodiment, it may be preferable for the player to turn around (after the rotator has finished rotating) and walk in the complete opposite direction as the wall he previously faced. This is so the player can continue to maximize the room space by walking in straight lines from wall to wall and avoid walking in diagonal lines. In order to ensure the player physically turns around the proper angle (so that his back will be directly facing the wall), the virtual reality system can detect the angle that the player is facing the wall (either directly before or after the rotator did its rotation). For example, if the player's relative angle to the wall is 90 degrees (the player is facing 0 degrees and the wall is perpendicular to the player's orientation), then the rotator should rotate the player in virtual world 180 degrees so that the player would then turn around 180 degrees and continue walking. However, the player's orientation to the wall may not always be 0 degrees, for example it may be 10 degrees (in the nomenclature we are using, facing 10 degrees would be facing north and slightly to the right (e.g., 1 o'clock). In order to get the player to turn around with his/her back directly facing the wall, the player should turn around (clockwise) 170 degrees. Thus, the rotator should rotate in the virtual world 190 degrees clockwise (instead of 180 degrees) or 170 degrees counterclockwise (instead of 180 degrees) so that the rotator in the virtual world (and hence the player standing on it) is facing 190 degrees in the virtual world. Thus, the player would then turn around clockwise 170 degrees (instead of 180) to exit the rotator. The barrier on the rotator (which rotates along with the rotator) may have a narrow exit path thus forcing the player to turn around to a particular angle to exit. Note that any obstacles surrounding the rotator do not rotate thereby forcing the player to walk out of the rotator in a certain orientation.

Thus, the amount the rotator would rotate clockwise in the virtual world is 180 plus the angle the player is facing in the physical world (e.g., if the player is facing 10 degrees then the rotator will rotate clockwise 180 plus 10=190 degrees clockwise). The rotator can actually rotate 360 degrees numerous times before completing its final rotational angle but what is important is the final orientation of the rotator when it has stopped rotating. Thus, the player's new virtual orientation in the virtual world immediately after the rotation would be 180 degrees+the player's physical orientation with respect to the physical wall immediately before (or during) the rotation (this is the player was facing 10 degrees in the physical room the player's new orientation in the virtual world would be 190 degrees). Note that this adjustment of the rotation can also be similarly applied to any wall (front wall, back wall, left wall, right wall).

FIG. 11 now shows the player continuing walking in the original direction in the virtual world (0 degrees), while the player now walks 180 degrees in the physical world. The player can continue the room scale virtual reality experience with no unnatural interruptions in the game.

Figure 12:
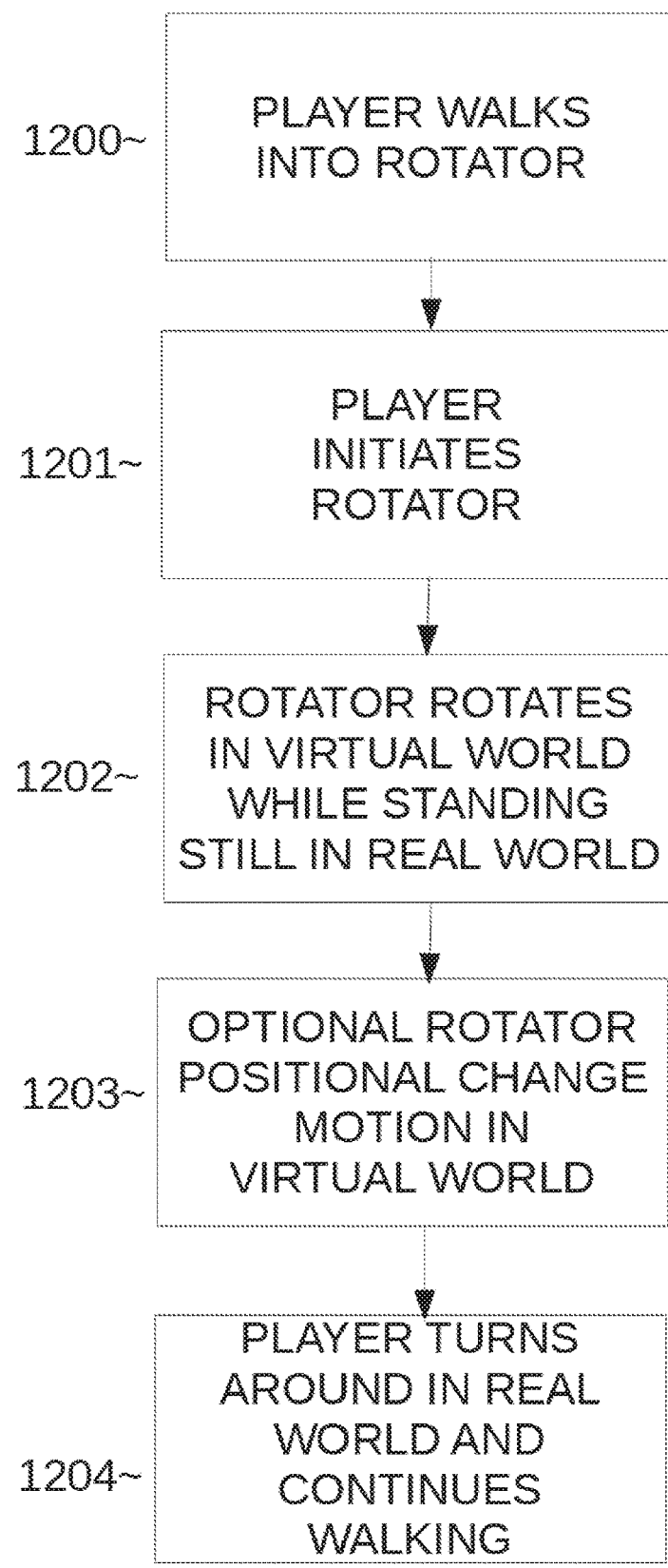
FIG. 12 is a flowchart of utilizing a rotator in order to change direction in the physical world while not changing direction in the virtual world, according to an embodiment.

FIG. 12 shows a flowchart of utilizing a rotator in order to change direction in the physical world while not changing direction in the virtual world.

In operation 1200, the player walks into a rotator in the virtual world. The player is also physically walking in the physical room as well which causes him to enter the rotator in the virtual world. Note that the player cannot proceed in the same direction due to obstacles and a barrier on the rotator so if the player wishes to continue in that direction he/she must enter the rotator.

From operation 1200, the method proceeds to operation 1201 wherein the player initiates the rotator. As stated herein, the player can see a button in the virtual world which maps to a position on the wall and physically touch the wall (which touches the virtual button in the virtual world) to initiate the rotator. Or, the player can press (or operate) a controlled which is part of the virtual reality system. Or, the player can speak a command (wherein the virtual reality system has a speech detector/recognizer) to initiate the rotator. Or, the rotator can automatically initiate once the player steps inside it in the virtual world.

From operation 1201, the method proceeds to operation 1202, wherein the rotate rotates in the virtual world while the player remains stationary in the real world. This can be compared to a person standing on a rotating disc which rotates the player while the person remains motionless. The rotator also has barriers which are part of the rotator (in the virtual world) which rotates along with the rotator.

From operation 1202, the method proceeds to operation 1203, wherein the rotator can also change its position in the virtual world. For example, the rotator can also serve as an elevator in which in addition to rotating the player can also cause the player to raise or lower in elevation. This can increase the realism of the game since elevators are commonplace and hence utilizing rotators as elevators may feel natural to players. Thus, the rotator will rotate as described herein but can also go up or go down in the virtual world, thereby putting the player on a different floor (height) of the game. The rotator can also move in position as wall, for example it can move along the x-axis, y-axis, or both and physically move the player to a new location. The movement should be gradual, not jerky, so that the player experiences the motion in the virtual world (while the player remains standing in the real world). The rotator can also teleport the player to another location (in which in contrast to the motion described above which is gradual, a teleportation can be an instantaneous positional transfer). In all of these embodiments, the rotator still operates in the same manner, that is the barrier prevents the player from walking further in a direction (which could cause the player in the physical room to hit a wall) and forces the player (after the rotation occurs) to turn himself/herself around and continue walking. Moving the rotator (to a different location in the virtual world) after the rotation is completed is optional depending on the type of game being implemented.

From operation 1203, the method proceeds to operation 1204, in which the player now physically turns himself around in order to exit the rotator. The player will be facing the barrier in the virtual world and hence must turn himself around to exit the rotator and avoid colliding with the barrier in the virtual world. When the player turns himself around, he/she can continue walking now and should have more physical floor space to continue walking and interacting with the virtual world.

Figure 13:
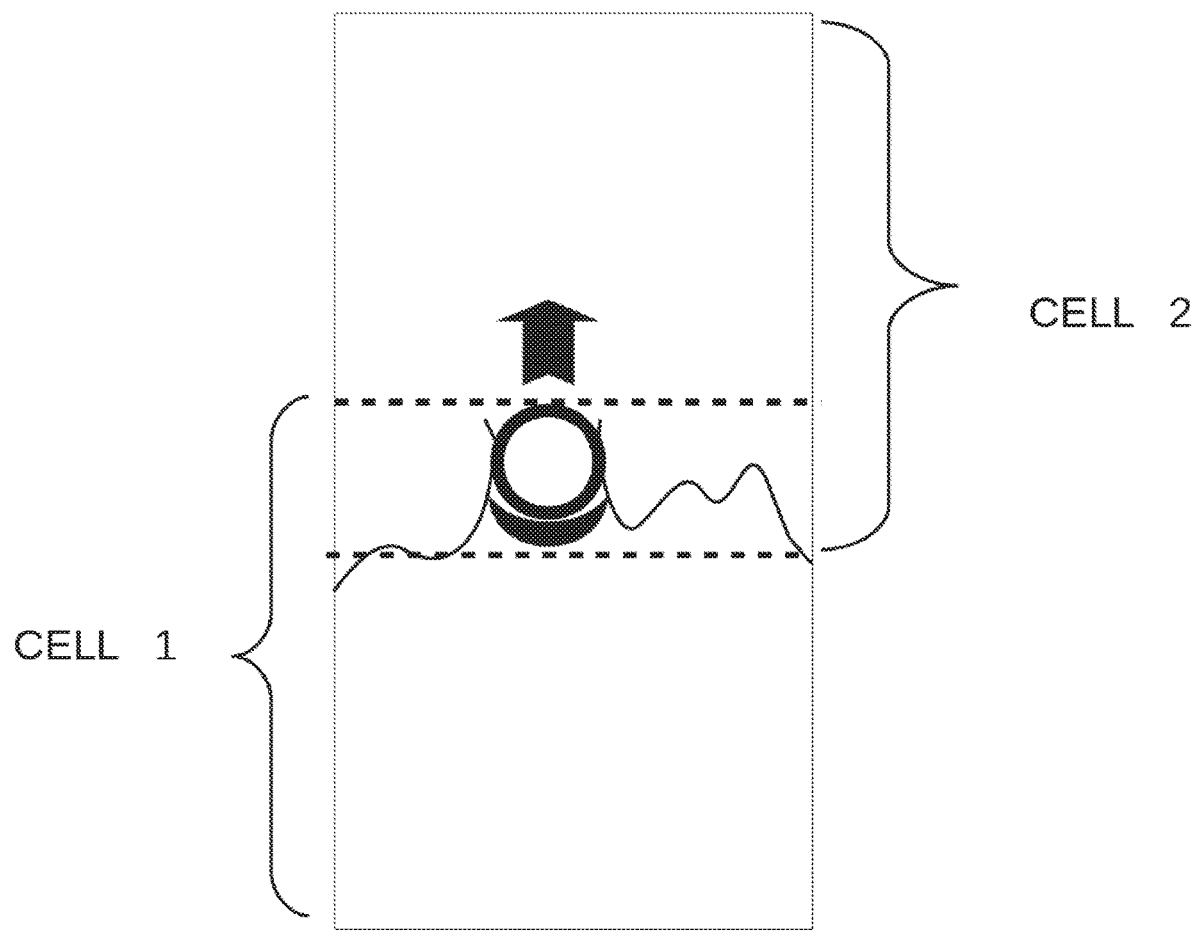
FIG. 13 is a drawing illustrating how "cells" can be joined to form a larger virtual world than the player's physical room, according to an embodiment.

FIG. 13 shows how "cells" can be joined to form a larger virtual world than the player's physical room. A cell can be considered a portion of the virtual world, and multiple cells can combine to form the entire virtual world. In one embodiment, the physical room is mapped to each individual cell, although in another embodiment this is not required and there is no correlation between the physical room and the cells.

In FIG. 13, note that the rotator does take up space in the cell and since the player can walk back into a rotator that the player already used, different cells can "share" rotators (and other common structures common to both cells, such as obstacles, objects, etc.)

Cell 1 and cell 2 share a common area which comprises the rotator. In the embodiment where walls of the room will map to the barrier on the rotator, each cell is sized so that the wall will map to the barrier on the rotator. Since the rotator is greater than a point and takes up space in the virtual world, there must be room for it in each cell where a rotator exists, and there also must be room for the rotator in the adjacent cell that the player travels to. Hence, some cells can share common areas (and all of the virtual structure in these common areas).

Note that in one embodiment, the cells do exist in the sense that the data structures being used to store the virtual world are designed and/or stored/grouped in discrete cells (which can make the organization and implementation more intuitive). In another embodiment, discrete "cells" do not really exist in any programming sense but nevertheless organization of the virtual world in "cells" as described herein serves to describe the virtual world in concrete and terms.

FIGS. 14A and 14B show a six cell virtual world and how a rotator can also move in the virtual world in addition to spinning. FIG. 14A comes first and then FIG. 14B would occur in time sequence after 14A. In FIG. 14A, the rotator in cell 6 is in the northwest corner of cell 6. After the player steps into the rotator (in the virtual world of course) and the rotator is activated, the rotator then transforms into FIG. 14B in which the rotator has rotated (along with its barrier) and the rotator has also physically moved to a new location. Note that the moving of the rotator can be performed in numerous ways. For example, it can be a gradual motion, wherein the player standing on the rotator in the virtual world would perceive motion (not jerky) as the coordinates in the virtual world gradually (smoothly) change to emulate that the rotator is moving (e.g., similar to the motion of a train). Alternatively, the motion can be a teleportation (instantaneous) wherein the player is suddenly transported (moved)

in the virtual world into a new location (transporter effects can be displayed as well to enhance the transporter effect).

Note that in FIGS. 14A and 14B (and all the other figures as well which illustrate a rotator), even though obstacles may not be illustrated (for simplicity), typically there should be obstacles in the virtual world (but not the real world also referred to as physical room) from preventing the player from passing through the rotator (as illustrated in FIG. 5) in both the rotators/barriers original position as well as its position after it has completed rotating.

Figure 15:
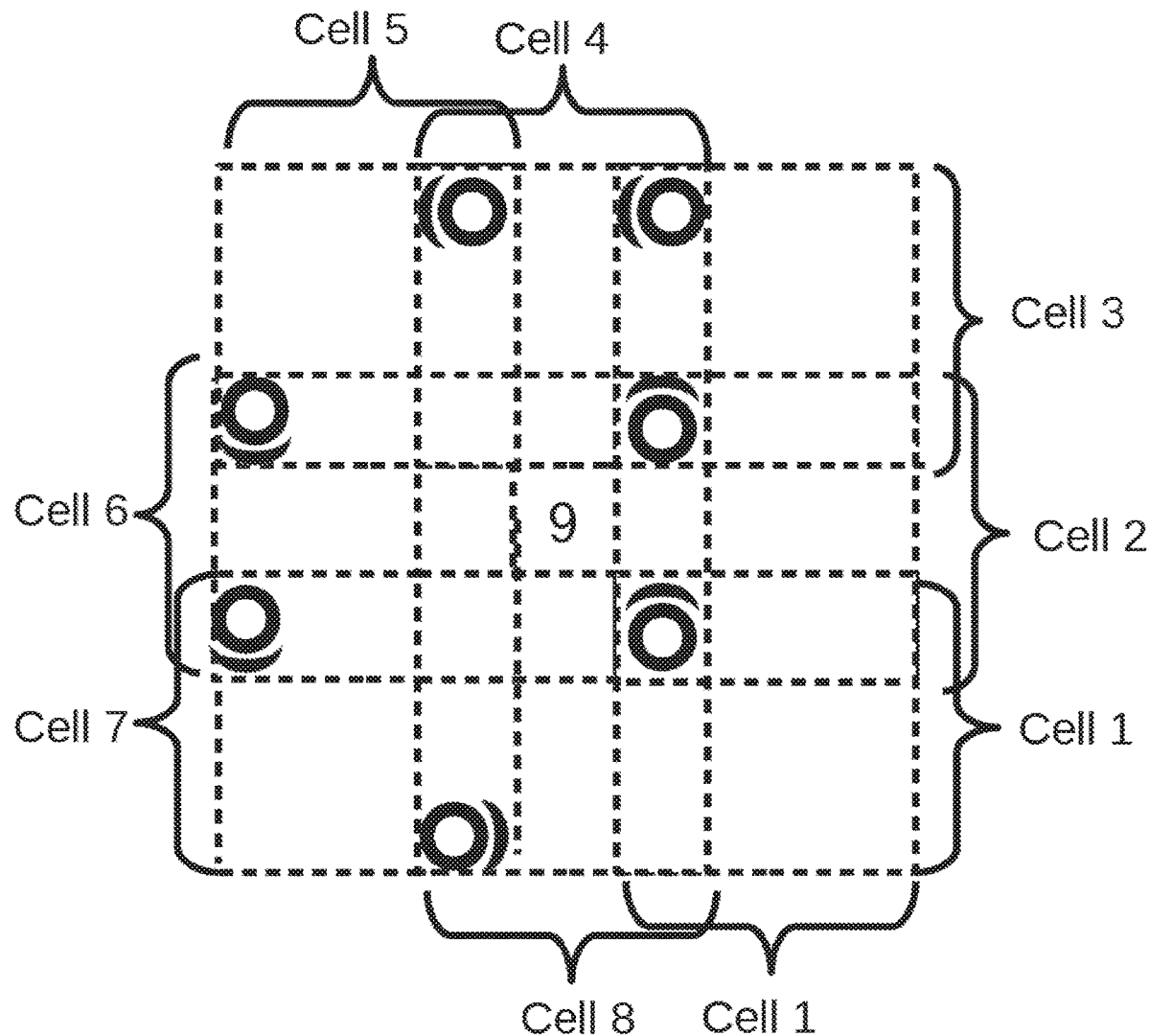
FIG. 15 is a drawing illustrating a virtual world layout with nine cells, according to an embodiment.

FIG. 15 shows a virtual world layout with nine cells. Note how the rotators are shared by adjacent cells. Ideally, the cells and the physical room are sized and arranged such that each rotator will be against a wall in the physical room so that the player can press a virtual button on the rotator (and/or the barrier) and actually touch the adjacent wall in the physical room (hence feeling the physical wall). Note that typically the barrier for each rotator should be mapped to correspond to the physical wall. The player cannot walk through the barrier and so each time the player needs to use a rotator it should be configured so the player can step inside the rotator (e.g., the rotator is in the back of the rotator from the perspective of the player walking towards the rotator in the virtual world).

Note that in another embodiment, such as a "transporter" embodiment, the rotator may not need to rotate as long as the player is teleported to a location in which the player is facing a wall in the new location. However, all other aspects as described herein apply to teleportation as well.

Note that "wall" or "walls" as used herein can also refer to the boundary defined initially by the player (or by the system) which defines the user's space which the player can play the game in which the player should not walk outside of (e.g., this is the player's confined space to play in the virtual world). Thus, while there may not be a physical wall on a boundary (although there can be), a boundary can be treated herein as the same as a physical wall in order to maintain that the player remains inside the boundary.

FIG. 16 shows a teleporter 1600 in the virtual world. In the virtual world the teleporter can take on many different appearances, such as a shape you step inside (cylinder, cube, or just a marking (e.g., "X") on the floor). However, the teleporter should have a solid barrier (or wall) in its back so the player cannot walk through the teleporter. When the player steps into the teleporter and it is activated (e.g., manually by the player pushing a button (such as a button in the virtual world which maps to actually touching the wall in front of the player in the room, or activated by pressing a button on a controller, or activated automatically once the player steps into the teleporter), the player is then teleported (moved instantly) in the virtual world to another location. The teleportation can be instantaneous, or it can include 3-D animation effects (such as a dissolve, along with appropriate sound effects) giving the effect that the player is really being "teleported" (in a science-fiction sense) to the other teleporter.

A second teleporter 1601 is shown in FIG. 16, although the second teleporter 1601 may or may not be visible to the player who is in the teleporter 1600 or its surrounding room. In the embodiment shown in FIG. 16, a solid wall 1602 in the virtual world separates the teleporter 1600 from the second teleporter 1601 so the player would see a wall when stepping into the teleporter 1600 but would not see the second teleporter 1601. The sides 1603 of the teleporter 1600 are optional, what is important is that the player is not able to continue walking north past the back of the teleporter 1600 (the back is the wall of the teleporter 1600 that is directly in front of the player in the virtual world) or get behind the teleporter using any other route (hence the wall 1602). Of course in the physical room, the back wall is present thereby preventing the player from walking past the teleporter 1600 in the virtual world.

After the player steps into the teleporter 1600 and the teleporter is activated, then the player teleports (relocates in the virtual world) as illustrated in FIG. 17. The player's location in the virtual world has changed from the teleporter 1600 to the second teleporter 1601. Note that the player in the virtual world has rotated 180 degrees and is now facing 180 degrees (while of course the player in the real world has not changed orientation and is still facing 0 degrees). Note that with teleportation, when the player teleports from a first teleporter to a second teleporter, the second teleporter can be adjacent to the first teleporter (as illustrated in FIG. 17) or it cannot be adjacent to the first teleporter (e.g., in a location far removed from the first teleporter). Typically, two teleporters can be "paired" so that when the player steps in (and activates) the first teleporter he appears in the second teleporter, and when the player steps (and activates) in the second teleporter he appears back in the first teleporter.

After the player teleported to the second teleporter 1601, the player is now facing the wall 1602 and hence has to turn around. In FIG. 18, the player sees that he is facing a wall in the virtual world and physical turns himself around so the player is now facing 180 degrees in the physical room and 0 degrees in the virtual world (when the player physically turns around in the physical room the player's orientation in the virtual world also changes to match the player's physical movements). Now the player is facing 180 degrees in the physical room and hence has more room to walk in while the player can continue to explore the virtual world.

Note that in FIG. 16, if the player's physical orientation in the physical room was 10 degrees (it may not be a perfect 0 degrees which would be desirable), then when the player teleports the player's orientation in the virtual world would be 190 degrees (instead of 180 degrees as illustrated in FIG. 17). In this way, the player would turn around 170 degrees (in both the physical room/world and the virtual world) to be able to walk through the sides of the second teleporter straight. Now the player is facing 180 degrees in the physical room, providing the player the maximum amount of space to continue walking before the player reaches the front wall. Thus, when the player teleports, the player's orientation in the virtual world (which can be set by the system to be anything) can be computed as 180+the player's physical orientation in the physical room during teleportation. Note that this adjustment of the rotation can also be utilized on any wall (front wall, back wall, left wall, right wall).

FIGS. 19 and 20 illustrate this embodiment. In FIG. 19, the player's physical orientation in the physical room against is 10 degrees. When the player steps into the teleporter in the virtual world, and comes out of the second teleporter (FIG. 20), the player's orientation in the virtual world is now 190 degrees (computed as 10 degrees+180 degrees). In this manner the player turns himself around clockwise in the physical world 170 degrees and also now turns 170 degrees in the virtual world (clockwise) 170 degrees and walks out of the sides of the teleporter. Now the player is (or should be) facing 180 degrees in the physical world and 0 degrees in the virtual world (as in FIG. 18).

Figure 21:
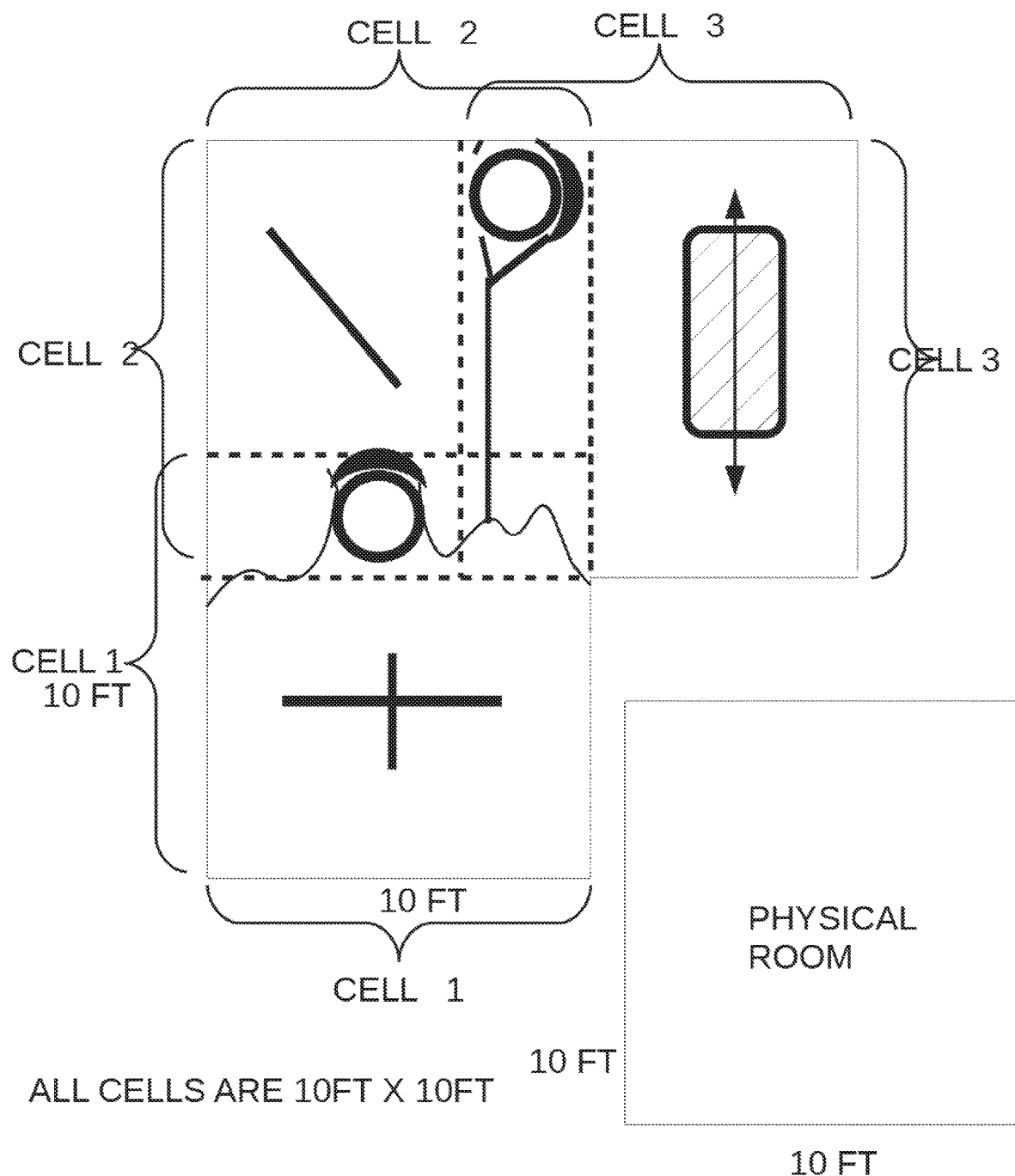
FIG. 21 is a drawing illustrating a sample virtual map showing three cells connected by two rotators, according to an embodiment.

FIG. 21 is a sample virtual map showing three cells connected by two rotators. Note that the solid lines are obstacles (e.g., walls, fire, poisonous water, open space (where the player would fall into, etc.) The hatched rectangle in cell 3 is a moving platform which automatically and continuously moves in the directions of the arrows (up and down on the page, or 0 degrees and 180 degrees). The player can step on (or jump on) the moving platform and be continuously moved along with the platform (until the player steps or jumps off the moving platform). The moving platform continues to move up (0 degrees) until it reaches the wall, then it reverses direction and moves down (180 degrees) until it reaches the opposite wall, then it reverses direction and repeats. Other scenery (e.g., pictures on the walls, furniture, characters, etc.) should typically populate each cell but is not shown in the figures for simplicity.

Note that the physical room is 10 feet by 10 feet. Each cell in the virtual world is also 10 feet by 10 feet. Note that in one embodiment, the size of the virtual world can match the size of the physical world (physical room). In another embodiment, different units are used for the virtual world (e.g., virtual world distance units) as compared to the physical world, although the virtual world distance units can be converted to real world distance units (e.g., feet) and vice versa. In this embodiment, an ideal physical room size can be specified (e.g., 10 by 10), and the cells in the virtual world will be sized to match the physical room size.

Of course, it is unlikely that players would have their physical room (which they set up for use with their virtual reality system), and of course the player's physical room will be in varying sizes. Thus, the cells in the virtual world can be adjusted to match the physical room size.

Figure 22:
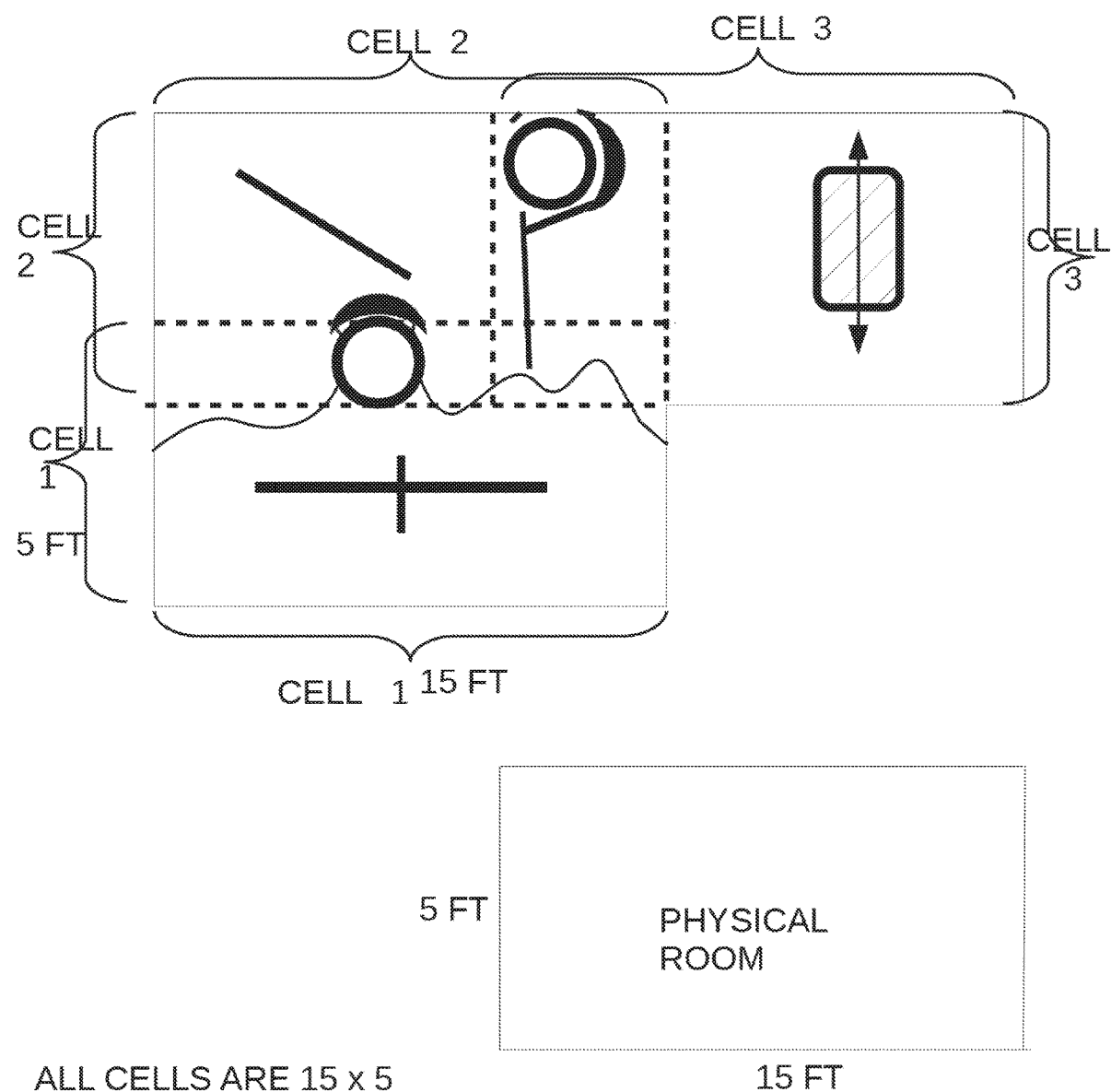
FIG. 22 is a drawing illustrating a physical room size of 15 (x axis) by 5 (y axis), according to an embodiment.

In FIG. 22, the player has a physical room size of 15 (x axis) by 5 (y axis). Since the virtual world map default is designed as 10 by 10, the cells in the virtual world can be adjusted in order to match the size of the physical room. For example, since the y axis size of the player's physical room (5 feet) is short than the default y-axis cell size of the virtual world (10 feet), then the cells in the virtual world (and all of their contents) can be shrunk by 50%. Since the x-axis size of the player's physical room (15 feet) is ⅔ larger than the default x-axis cell size of the virtual world (10 feet) then the cells in the virtual world (and all of their contents) can be enlarged by 50%. Note that "contents" (which are enlarged and/or shrunk) include things such as obstacles, walls, terrain, rivers. Things which are not shrunk are objects in the virtual world (e.g., desks, pens, chairs, tables, etc.), rotators, platforms (the moving platform in cell 3 has the same size as the original cell 3 (in FIG. 21) although it has a shorter vertical (y-axis) distance to travel now that cell 3 has a smaller y-axis length than the original cell 3 in FIG. 21 (the default). Thus, in other words, the cells in the default mapping (e.g., FIG. 21) and their contents are resized in order to match the dimensions of the physical room the player is using (the "virtual reality room"). In this manner when the player enters a rotator (a teleporter can be used in this and any embodiment wherein a rotator can be used), he typically should be facing a wall in the physical room (and thus can touch/press a "button" on the physical wall which he sees in the virtual world).

Figure 23:
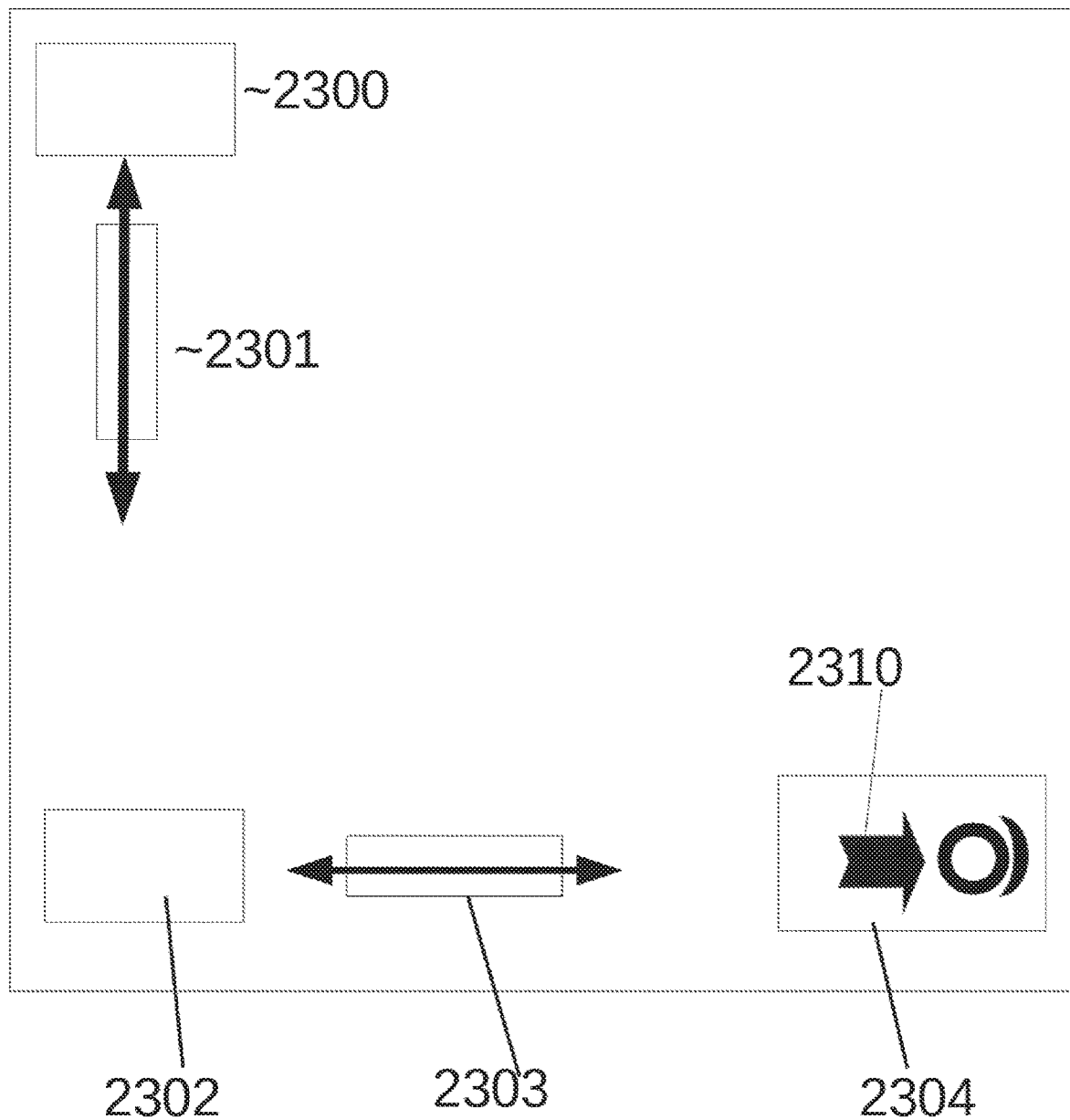
FIG. 23 is a drawing illustrating how the player 2301 (represented in the virtual world) can walk on the platforms 2300, 2301, 2302, 2303, 2304, according to an embodiment.
Figure 24:
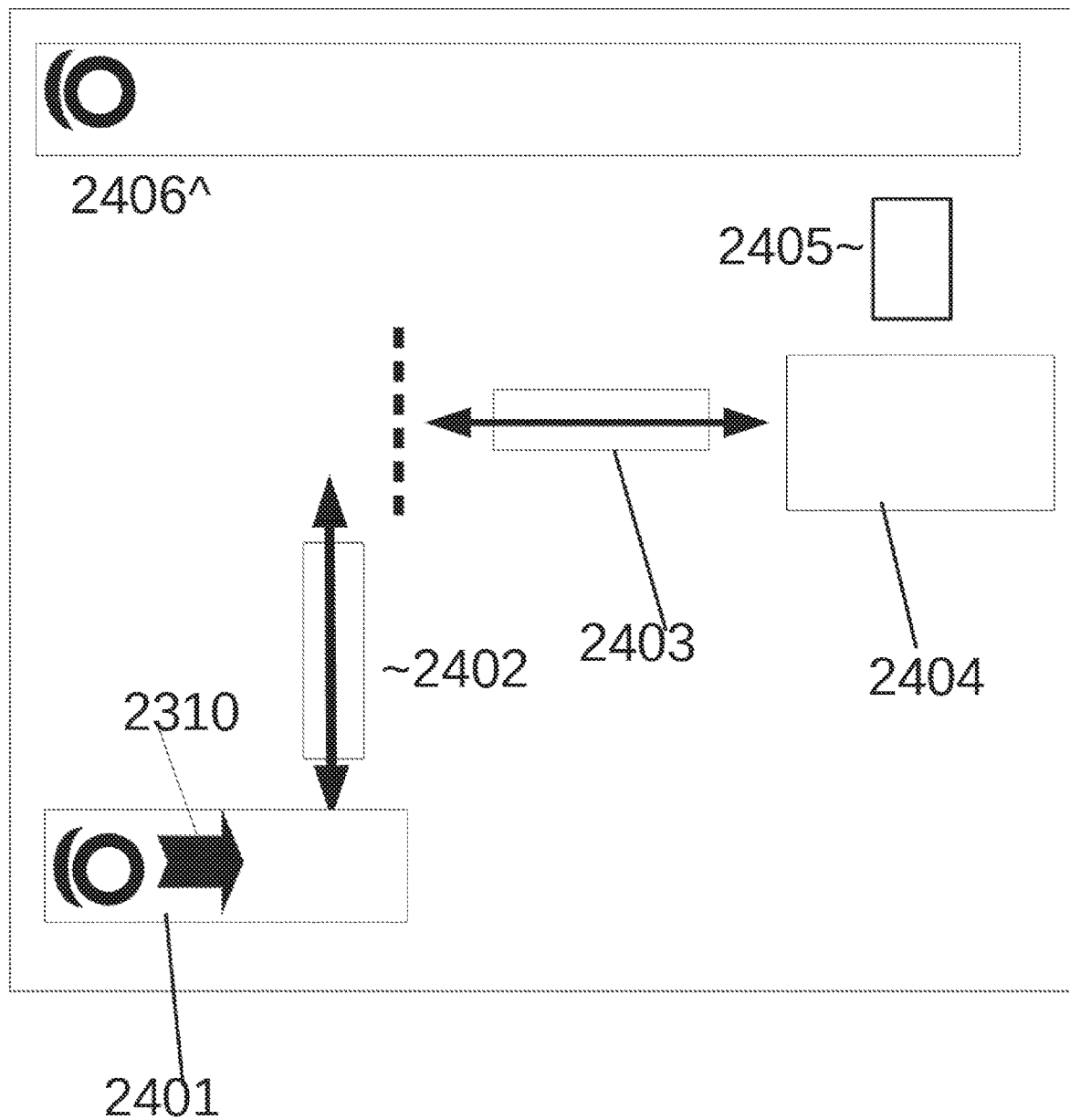
FIG. 24 is a drawing illustrating a higher area where there are two moving platforms, according to an embodiment.

In the previously discussed figures, the virtual world was illustrated such that blank space was the floor or ground in the virtual world and physical things in the virtual world were drawn in. In FIGS. 23-24, blank space does not represent the floor or ground but instead represents open space, and solid lines represent objects or platforms that the player can walk on or jump to. If the player ends up walking off a platform (whether moving or stationary), he will fall (in the virtual world, but of course not in the real world) and then the game can handle this in numerous ways. For example, if the player falls the player can "die" in the game in lose a life, or end up on a ground level (which can for example contain water the player falls into so the player does not get "killed" in the game) and can "swim" or walk towards a ladder (or rotator, elevator, etc.) wherein the player can go back up to a higher level.

The virtual world can have multiple levels, each level is on a different height in the virtual world (height can be represented by the axis z). Thus, a first person platform game can be implemented wherein the player himself walk using a controller button or controller directional pad (or can jump using a controller button) onto other platforms or structures intended for the player to walk on (or climb).

In FIG. 23, the player 2301 (represented in the virtual world) can walk on the platforms 2300, 2301, 2302, 2303, 2304. Moving platforms 2301, 2302 will continuously move back and forth in their indicated directions until they reach another platform (or other object in the virtual world) or they reach the end/edge of the level and then will reverse direction and go back in the other direction. For example, moving platform 2301 will continuously move up (until it reaches platform 2300), then down (until it reaches platform 2302), then repeat moving up (until it reaches platform 2300), down (until it reaches platform 2302), etc. This motion will typically continue throughout the game. The player will visually see in the virtual world this platform moving. The player can stand on platform 2300 and walk onto (or jump) moving platform 2301 where the player can then ride the moving platform and jump onto platform 2302, wherein the player can then jump onto moving platform 2303, and ride moving platform 2302 and then jump onto platform 2304. Platforms which are not moving (moving platforms are indicated with arrows) are stationary and do not move. On platform 2304 is a rotator which also serves as an elevator so that the player when he/she enters and activates the rotator will go to a different level (e.g., height). In this example, the player is on level 1 (height of 50 in the virtual world). The units of height in the virtual world can match the distance of the units used for the x-axis and y-axis in the virtual world and can exactly match up to the distance in the physical world or can use entirely different units (although typically the units in the virtual world will have a linear relationship to units in the real world).

When in FIG. 23 the player activates the combined rotator and elevator, the rotator will rotate the player (as described herein) and also move up in height to height 100 (which can be referred to as level 2 in the virtual world). Hence this rotator also serves as an elevator. Note that if the player falls off a platform, the player can fall to level 0 (not pictured), in which the player can climb (or use another rotator/elevator) to get back to level 1. There can also be a starting point (e.g., a "reset point") in level 1 (e.g., platform 2300 in FIG. 23) which the player would be moved to (in the virtual world) when the player "dies" (falls off a platform and falls to level 0 which can have a height (z-axis of 0).

In FIG. 24, there are two moving platforms, 2402 and 2403. Moving platform 2402 continuously moves up and down until the moving platform 2402 collides with another platform (e.g., platforms 2401 or 2406). Moving platform 2403 continuously moves left and right until it collides with platform 2402 or crosses the dashed line (or in another embodiment, there is no dashed line and moving platform 2403 would continuously move left until it collides with moving platform 2402 upon then it would move right, or moving platform would continuously move left until it reaches the end/edge of the virtual world (e.g., the leftmost border of the large square in FIG. 24) upon which moving platform 2403 would then start to move right again. The moving platforms 2402, 2403 typically repeat their motions over and over again (of course visible in the virtual world).

The virtual player 2301 would step out of the rotator and walk down platform 2401 and jump onto moving platform 2402, and then jump onto moving platform 2403, and then jump onto platform 2402, then jump onto platform 2405, and then jump onto platform 2406. The rotator on platform 2406 can then take the player up to a higher level (e.g., level 3, height of 150). Of course, the levels in the game can be designed in any fashion using any arrangement of stationary platforms, moving platforms, decorative elements, valuable objects in the game (e.g., keys, coins, etc.), moving parts, rotators (that do not serve as elevators), rotators (that also server as elevators), etc. Rotators that serve as elevators can also move the player in height (z-axis) in the virtual world to a higher or lower height/level. Such a rotator can alternate between different levels (e.g., if the rotator is on level 1 it would then (when activated) raise the player to level 2, and then when the player activates it on level 2 it would then lower the player to level 1, and perpetuate this behavior throughout the game.

In this manner, a first person platformer can be implemented using room scale virtual reality such that the player can physically walk (and even physically jump) onto platforms (stationary or moving) the player sees in the virtual world. Using rotators, a finite sized physical virtual reality room can enable the player to play in a much larger virtual world, and utilizing the rotators as elevators can also provide more "believability" to the player because elevators are commonplace in the real world. There is no limit to the number of levels a game can have ("levels" used in this context refers to a height in the virtual world).

In a further embodiment, a player can be coaxed into taking an intended position (physical location) and orientation in the physical room by using dynamically generated walkways.

The game programming intends that the player 2501 in the physical room 2500 take a position and location as shown by the desired position 2502 (the desired position includes both the physical location as well as the orientation (direction player is facing)). In order to get the player 2501 to relocate into the desired position 2502, dynamically generated walkways (or paths, structures, rivers, etc., anything that will get the player to manually walk in a direction). Moving platforms can be used when the player does not have to physically walk anywhere.

For example, in the virtual world 2510 the player in the virtual world 2511 is facing south (note that the direction the player faces in the virtual world does not have to match the direction the player faces in the real (physical world), although it is possible that these directions can match. A moving walkway 2512 moves the player in the south direction. The player physically steps (or jumps) onto the walkway 2512 and does not move further, and the moving walkway 2512 would automatically move the player to a directional change structure 2513. A directional change structure 2513 is shown as being circular (although it can be any other shape, such as square, hexagonal, etc.) The directional change structure 2513 is used to get the player to physically turn to a different orientation (as will be illustrated by the following figures).

FIG. 26 shows that the moving walkway 2512 (or moving platform) has moved southward and stops against the directional structure 2513 so that the player should physically step into the directional structure 2513. Note that the moving walkway 2512 is surrounded by open space so that the player would "fall off" the moving walkway 2512 (which is now actually stationary) if the player physically steps off, so the player has no choice but to step into the directional structure 2513 if the player wants to progress in the game.

FIG. 27 shows that player has physically stepped into the directional structure 2513 in the virtual world and hence has moved in the physical world. As stated previously, the goal is to get the player to physically be located in the desired position 2502 shown by the broken-lined arrow in the physical room drawing.

In FIG. 28, note that the opening to the walkway has now closed and a new opening 2800 in the directional change structure (also referred to as directional structure) has now opened. Note that in another embodiment, the original opening (which led to the moving walkway 2512) could have remained open, as the player cannot get very far since the moving walkway 2512 is surrounded by open space. In a further embodiment, the original opening (which led to the moving walkway 2512) can remain open but the moving walkway can automatically move away once the player steps into the directional structure. In order to progress in the game, the player is forced now to turn to the new opening 2800 in the directional structure. Note that the openings in the directional structure can be doors which open (vertically or horizontally) or any other mechanism to indicate that the player must walk through a particular opening).

In FIG. 29, the player has now physically turned himself towards the new opening in the directional structure (having no other path to move in order to progress in the game).

Figure 30:
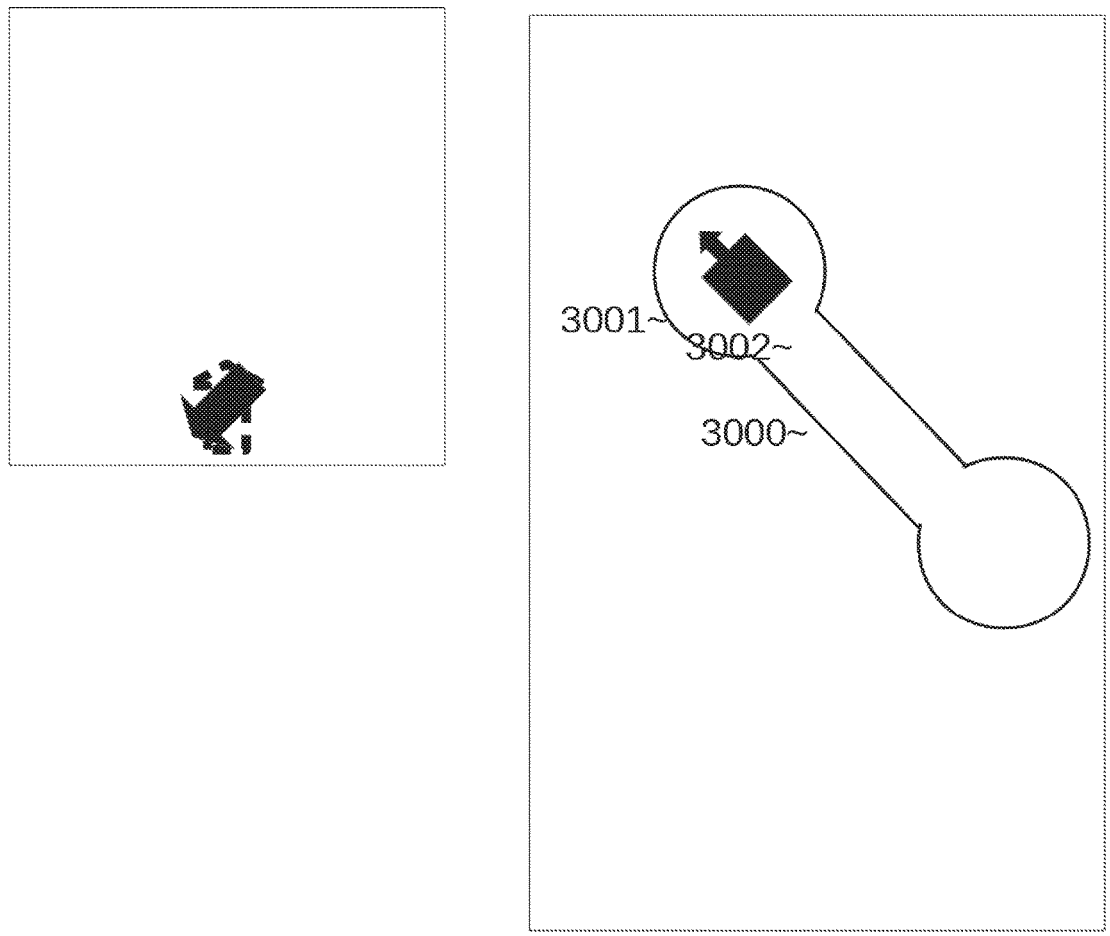
FIG. 30 is a drawing illustrating that the player has now walked down the walkway, according to an embodiment.

In FIG. 30, the player has now walked down the walkway 3000 (of course walking (and turning) in the physical world/room is also reflected by movement in the virtual world). The walkway 3000 (or hallway, passage, etc.) can be a platform with no walls which would lead to the player falling if the player stepped off, or it can be a hallway with walls (thus forcing the player to walk through the walkway 3000). The player has now stepped into a second directional change structure 3001 through a first opening 3002 in the second directional change structure.

In FIG. 31, now that the original opening to the second directional change structure 3001 has closed and a new opening 3100 in the second directional change structure 3001 has opened. Thereby forcing the player to walk through the new opening 3100 in order for the player to progress in the game. Of course, the player will have to physically turn himself in order to be able to walk through this new opening.

In FIG. 32, the player has now turned himself/herself to face the new opening 3100 in the second directional change structure. Note that the player in the physical world has now aligned himself with the desired position 2502 (both position and orientation). Now the game continues and the player (in this example) has his/her to the wall and the room in front of him/her, providing the needed space for the player to ideally continue any activities in the game.

Note that the walkway 3000 and the positions of the new openings in the two directional change structures are all computed dynamically by the game system so that by the player walking in the direction of the original (first) directional change structure, exiting (after turning) through the new (second) opening in the first directional change structure, and then entering the second directional change structure and exiting (after turning) through the new (second) opening in the second directional change structure would result in the player's physical location matching the desired location (determining by the game programming in order to proceed with the game). Thus, the positions (angles) of the new (second) opening in both directional change structures and the length of the walkway are all determined and generated dynamically. Thus, depending on where a player may be in the game, these structures that the player walks through would be different in order to ultimately have the player end up at the desired location (thus different players playing the game, or the same player playing the same level twice, could have different experiences). These dynamically generated walkways and directional change structures can be decorated with pictures, messages, etc., in order so that the player would not really realize these were not really predetermined parts of the level (game world) design.

Note that in an embodiment, the openings in the directional change structures do not have to open and/or close but both openings in each directional change structure can remain open. For example, in FIGS. 27-28, the first opening in the first directional change structure does not have to close and the second opening can always be open. Thus the player can walk in the first opening and right out the second opening without anything opening closing. Since the player cannot exit out of the first opening (e.g., the moving platform 2512 can be stationary and the player has nowhere to walk but fall off this platform, or the moving platform 2512 can move away once the player steps into the first directional change structure). In other words, since the player cannot really progress in the game other than moving forward (going out the second opening in the first directional change structure), in an embodiment both openings can always be open. This can also be true for both openings in the second directional changes structure (see FIGS. 30-31). In an embodiment, once the player exits the second direction change structure, the second opening therein can automatically close so that the player cannot then backtrack (back through the walkway 3000) and must progress forward.

Figure 33:
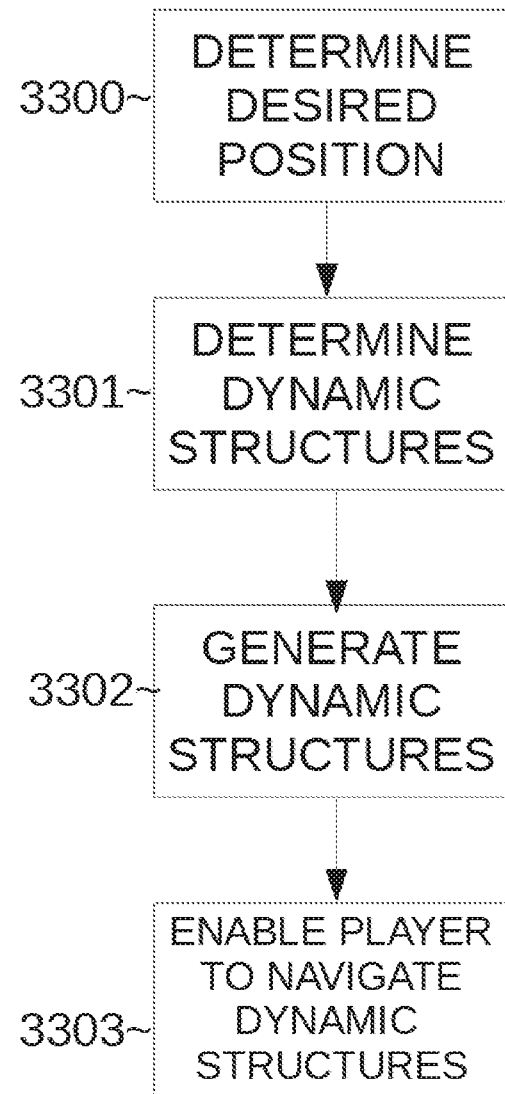
FIG. 33 is a flowchart illustrating an exemplary method of utilizing dynamically generated structures in a virtual reality game in order to coax a player to assume a particular position/orientation, according to an embodiment.

FIG. 33 is a flowchart illustrating an exemplary method of utilizing dynamically generated structures in a virtual reality game in order to coax a player to assume a particular position/orientation, according to an embodiment.

In operation 3300, the game (actually the program on the computer executing the game code) determines a desired position (this comprises both a physical position in the physical room for the player and his/her physical orientation). This can be determined by using a predetermined table of positions for a particular point in the game. For example, when the player reaches level 3 of the game (e.g., he reaches a particular point in time or completes a particular task), the player should be at a predetermined location (e.g., the northwest corner of the room looking north). A table can be utilized for each point in the game and the desired positions. The position can be relative (e.g., the middle of the south most point of the room) or absolute (e.g., coordinates such as (25 feet, 20 feet). For example, Table I illustrated a list of desired positions. Milestone refers to completing a particular task (e.g., killing a particular dragon), or reaching a particular location (e.g., elevator #2, etc.), or reaching a particular level, etc. Each milestone can have its own unique number.

TABLE I

| Milestone in game | position |
| --- | --- |
| 1 | center of room looking north (0 degrees) |
| 2 | center of room's x-axis, coordinate 10 of room's y-axes, looking east (90 degrees) |
| 3) | coordinates (15,15) looking 45 degrees. |

Or the position for each milestone can be the same. Depending on how the virtual room is shaped, the position (desired position) would ideally be compatible with that virtual room. For example, if a virtual room has lava flowing throughout it, the desired position would be in a corner of the room where there is no lava thus allowing the player to see the entire room in front of him. The position can also simply be the center of the room. The position can also be where a physical item is located in the physical room is (e.g., a stationary bicycle that the player sees in the virtual world and can actual mount physically since he is coaxed to that particular location). In short, it does not matter how the desired position is determined. The desired position can be predetermined to be the point in the physical room which gives the player the largest walking area in front of him (e.g., if the physical room is rectangular the desired position could be a midpoint of one of the shorter sides of the rectangle facing into the center of the rectangle).

From operation 3300, the method proceeds to operation 3301, which determines the dynamic structures. This can be done by utilizing basic geometry in order to determine the structures required in order to "coax" the player to assume the desired position. Since the current position of the player may vary depending on how the player has played (and how big of steps he takes, the shape of the room, etc.) the current physically position of the player at different milestones in the game can vary and thus dynamically generated structures need to be computed and placed. If we knew exactly where the player would physically be at different points in the game, then it would not be necessary to dynamically generate (e.g., customize) these structures since they could be pre-generated. But typically, knowing ahead of time exactly where the player would physically be in the room at certain parts of the game is not always possible, hence the need to dynamically generate these structures in order to coax the player to assume a particular physical position in the physical room.

For example, in FIG. 25, there are three parameters to determine for the dynamically generated structure, the angle (or location) of the new opening 2800 in the first directional change structure 2513, the length of the walkway 3000, and the angle (or location) of the new opening 3100 in the second directional change structure 3001.

Accommodating for any offsets for the player to walk into the first directional change structure 2513, the angle of the first new opening 2800 can be determined by computing (using simple geometry) the angle from the player's physical position in the virtual room (see FIG. 27) to the desired position (see FIG. 27). The same relative angle would be used in the virtual world. For example, if the angle the player in the physical world needs to turn is 45 degrees to the player's right (relative 45), then the player would also need to turn 45 degrees to the right in the virtual world (even though the player may not be facing the same angle in the virtual world as the player is facing in the physical world). Instead of using relative angles, absolute angles can be used as well (e.g., the actual angle from the player's current position to the desired position relative to a fixed plan in the physical world is determined and this same actual angle can then be translated to the virtual world by adding (or subtracting) the difference between the player's orientation in the virtual world and the player's orientation in the real world. The length of the walkway 3000 is determined (using simple geometry) by the distance between the player's currently location in the physical room (see FIG. 27, solid arrow) and the player's desired location in the physical room (see FIG. 27, broken arrow). The angle of the second new opening 3100 in the second directional change structure 3001 is the difference between the desired angle (orientation) of the player in the physical room and the player's current orientation in the physical room (see FIG. 30). The second new opening 3100 can then be placed in the second directional change structure 3001 using this same relative angle. For example, of the player needs to turn clockwise (the player's right or right) 45 degrees, then the location of the second new opening 3100 can be placed 45 degrees to the right (which can be measured from the center of the directional change structure) of the direction the player would be facing after entering the second directional change structure 3001. In other words, if the player needs to physically turn 45 degrees clockwise, the new opening 3100 in the second directional change structure 3001 would be placed 45 degrees offset from the location of the first opening 3002 in the second directional change structure 3001 (as illustrated in FIGS. 30-31).

Numerous dynamically generated structures can be generated (the two directional change structures with the walkway between them) is merely one example. The parameters for all of such dynamically generated structures would typically be determined ahead of time (before the player starts to enter the dynamically generated structure) although this is not required and parts of the dynamically generated structure can be determined on the fly (but typically should be determined before they need to be rendered for the player in the virtual world).

From operation 3301, the method proceeds to operation 3302, which generates the dynamic structures determined from operation 3301 in the virtual world. The computer program will have a map which encodes the virtual world data as data structures would are read and generated by a gaming engine (e.g., the UNREAL engine or UNITY engine) to display the virtual world in three-dimensions on the player's headset. Thus, the dynamically generated structures from operation 3301 will add entries in the level (map) data to correspond to the generated data structures. This data would typically include the shape of the structures and their material, as well as any behaviors (e.g., when the openings in the directional change structures are located and when (e.g., the trigger) they will open). A walkway can be pre-defined to simply be a rectangular platform of X thickness (e.g., 1 virtual feet) and this info is added to the map using the respective data structures. Or the walkway can be an enclosed hallway with a floor, ceiling, and two sides (halls) of which all such parts are automatically included in the map utilizing the parameters determined in operation 3301 (of course, the length of the floor, ceiling, and halls should be equal) while the height can be predetermined (e.g., 10 virtual feet). Thus, the game code (when executed) will modify the current map data to include the dynamically generated structures. The dynamically generated structures can typically be added to static structures already in the map (e.g., part of the original level design). Thus, part (typically the majority) of a level (map) would be pre-designed (pre-determined) while parts of the same level (map) can be dynamically generated. The player can walk from a pre-designed part of the map onto a dynamically generated part of the map without the player realizing he is now walking on (or merely viewing in the virtual world) a part that was recently dynamically generated.

In addition to adding the dynamic structures to the game map, the computer can also add adornments (e.g., pictures on the walls, decorations, notes, coins, pickup items, keys, messages, etc.) to the dynamic structures so they do not look generic.

Once the dynamically generated data structures are added to the virtual world map (read by the game engine to display the virtual world), the method can proceeds to operation 3303, which enables the player to navigate (enter) the dynamically generated structures. The dynamically generated structures would typically not be discernable to the player in the virtual world that they have been dynamically generated for the purpose of coaxing the player to assume a particular position in the physical room. The player would navigate (walk though) the dynamically generated structure as he/she would any other structure in the virtual world. The dynamically generated structures that have behaviors (such as the directional change structures which have doors that can open and close) have their behaviors entered into the data structure (or procedural routines generated for this purpose that are associated with the respective structures) so they behave as described herein.

Note that directional change structures can also serve as elevators as well and raise (or lower) the player in the virtual world. For example, after the player steps inside the directional change structure, the initial opening can close, and the directional change structure can then change elevation and then open the new opening in the directional change structure (to which the player walks out of). The directional change structure can optionally have windows so the player can see the change in elevation (typically done gradually as with a real elevator). In an embodiment, the initial opening does not need to close when the elevation is changed (the player can walk out and if there is no platform there will fall). In another embodiment, the new opening in the directional change structure can always be present even while the directional change structure changes altitude (the player simply walks in the initial opening, the directional change structure changes altitude (height) and the player then walks out the remaining opening (not the one the player walked in).

In a further embodiment, instead of using directional change structures, a dynamically generated walkway can be generated which coax the player to walk and orient himself/herself into the desired location. For example, see FIG. 34, in which the player 3401 in the physical room 3400 has a desired position 3402 (determined by the game program). The dynamically generated walkway 3412 is generated by the computer which lead the player 3401 in the virtual world to eventually assume the desired position 3402.

FIG. 35 is another example. The player 3501 in the physical room 3500 has a desired position 3502. In the virtual world 3512, a dynamically generated walkway 3512 is generated to lead the player into the desired position 3502. The dynamically generated walkway 3512 (as with the one in FIG. 34) has multiple directions the player has to walk through (in other words it is not a simple one direction walkway). The dynamically generated walkway can be a platform with open sides (thus the player will fall if the player steps off the dynamically generated walkway) or it can be a hall with a floor, ceiling (optional) and walls so the player cannot exit and must walk through to progress in the game.

FIG. 36 shows yet another example of a dynamically generated walkway 3612. The player 3601 in the physical room 3600 has a desired position 3602. The virtual player 3611 in the virtual world 3610 will see the dynamically generated walkway 3612 (though his headset of course) and walkthrough which results in the player assuming the desired position 3602 in the physical room (real world). Note that dynamically generated walkways are dynamically generated structures.

The dynamically generated walkways can be implemented using the method illustrated in FIG. 33. In an embodiment, the dynamically generated walkways (which are dynamic structures) can be determined (operation 3301) using the methods described above. In addition, they can be determined by pre-storing a set of walkways (such as the ones illustrated in FIGS. 34-36, and the particular walkway selected would depend on each pre-stored walkways "purpose." For example, the walkway in FIG. 35 can be used when desired position is behind the player but the orientation of the desired position should be with a tolerance (e.g., 90 degrees) of the player's current orientation. The sizes of the walkways and their angles will be determined (using simple geometry) in order to match the exact situation in the physical room (e.g., moving the player from the current position to the desired position). Thus, each of the pre-stored walkways will have a different purpose and based on the current situation (e.g., how many degrees the player has to turn and in which direction, and whether the desired position is physically generally in front of, generally behind, generally to the left of, or generally the right of, the player's current position) and the appropriate pre-stored walkway can be selected and the parameters of that pre-stored walkway (e.g., the length of each individual walkway/passage and the angle that it connects to the other walkway/passages) are determined using basic geometry. In this way, a dynamically generated walkway can be automatically generated to coax the player from any initial (currently position) to any desired position in the physical room. Thus the lengths and/or angles of the individual walkways (passages) in the dynamically generated walkway vary depending on the player's current position in the physical room in order to get the player to assume the desired position. The player would typically not know that he/she is walking through a dynamically generated walkway as the dynamically generated walkway would be integrated with the remaining map structures.

FIG. 37 illustrates a dynamically generated walkway 3714 and moving walkways 3713 3715 used to transport the player in and out of the dynamically generated walkway 3714. In the physical room 3700, the player 3701 has a desired position 3702 (again, the desired position is a physical position in the room determined by the game to optimally proceed in the room-scale virtual reality game). Note the angle between the player 3701 (using a vector of the direction the player is facing) and the wall is designated by x degrees. In the virtual world 3710 (also referred to as virtual space), the player 3711 is standing on a platform 3712. A moving platform (also referred to as moving walkway) continuously moves up and down in the directions shown by the arrows on the moving platform 3713. Alternatively, the moving platform 3713 can be stationary against the platform 3712 and as soon as the player steps on the moving platform 3713 the moving platform 3713 then starts to move south (down on the page) and stops when against the dynamically generated walkway 3714 so the player can walk off the moving platform 3713 and onto the dynamically generated walkway 3714. Note that the angle joining two of the individual walkways is X degrees which matches the X degrees determined from the real world 3700. The player would walk through the dynamically generated walkway 3714 and step onto a second moving platform 3715. The second moving platform 3715 can continuously move back and forth in the directions shown by the arrows or it can be stationary against the dynamically generated walkway 3714 and can move (in the direction away from the dynamically generated walkway) once the player steps onto the second moving platform 3715 from the dynamically generated walkway 3714.

In this manner, the player has changes his/her position in the physical room 3700 from the initial (current) position 3701 to the desired position 3702. The second moving walkway 3715 can now take the player to a different location in the virtual world while the player physically remains standing as the player would not need to walk at all. The second moving walkway 3715 would then stop at a point where the player should walk (or jump off) and continue the game. Note that typically the moving walkways have space below them so that if the player steps (or jumps) off them the player will fall in the virtual world and face consequences in the game (e.g., losing a life, restarting at a save point, etc.) The same holds true for stepping off of a platform that is above the "ground" in the virtual world.

Note an optional visual barrier 3720 can be present. The visual barrier 3720 can be an effect such as a waterfall, mist, clouds, steam, etc., and can block the view of the player through the visual barrier 3720. In other words, wherever the player is standing, the player would not be able to see past (through) the visual barrier 3720. Thus, for example when the player is standing on the platform 3712 the player will not be able to see past the visual barrier 3720. This can be helpful in order to maintain a realistic effect in the game. For example, the dynamically generated walkway 3714 is positioned behind the visual barrier 3720 and the dynamically generated walkway 3714 may take on different shapes depending on the where the player physically is located in the room 3700. Thus, in order to avoid the player noticing a change in his/her surroundings, the visual barrier 3720 can be used in order to obstruct the player's virtual view pas the visual barrier 3720 and hence would not be able to see the dynamically generated walkway 3714. In a further embodiment, instead of the visual barrier 3720 blocking the view in both directions (in front and behind the visual barrier 3720 as described above), the visual barrier 3720 can only block a player's view in one direction (for example, the player cannot be on the north side of the visual barrier 3720 and look south through the visual barrier 3720 to see the dynamically generated walkway 3714 but the player can be on the south side of the visual barrier 3720 and look north and see through the visual barrier 3720 and see the platform (as there is no need to occlude the player's view of these non-dynamically generated structures).

In this way, dynamically generated structures can be used to seamlessly place the player in the physical room 3700 in desired locations while the player feels like he/she is continuing to play the game without any disruption of the game.

In a further embodiment, real world physical items can also have virtual counterparts in the virtual world. In this way, a player can physically feel (and optionally interact) with a physical object while viewing a counterpart object in the virtual world. The counterpart object would have a consistent shape with the physical object so that the player's sense of touch would be consistent in the physical world with what the player sees in the virtual world. For example, a chair can be present in the physical world (the physical room). A virtual counterpart object (e.g., a virtual chair) which is a virtual object can be present in the virtual world that the player can touch (which the player actually touches the physical object) and see (the player of course sees' the counterpart object). Thus, this adds to the realism of the virtual reality experience as the player can physically sit in the physical chair and the player's view in the virtual world would be consistent so that the player could not really tell (if the virtual reality system were perfect) that the virtual chair is not real. The appearance of the virtual counterpart object (the virtual chair in this example) may differ from the appearance of the physical chair in the real world but the boundary of the chair should be the same in both the physical world and the virtual world. The appearance of the virtual chair may be entirely different from the real world chair, for example the real world chair can be a beat up dirty black chair but in the virtual world the virtual counterpart (e.g., the virtual chair) can be a fancy looking green chair). If the material in the virtual counterpart differs from the material of the physical chair (e.g., the physical chair is made of cloth but the virtual chair appears like leather), then the astute player by feeling the physical chair may discern it does not feel like leather as shown in the virtual chair in the virtual world.

Such virtual counterpart objects can be used for many purposes. For example, a physical car (in the physical room) can have a virtual counterpart. Thus, the player can play a racing game while sitting in a car and hence the player's senses will match what the player sees while being inside the virtual car and playing the virtual game in the virtual world. A physical stationary bike can exist in the physical room and a virtual counterpart object (a virtual bike) could exist in the virtual world. Thus, the player can play a biking game (or other type of biking simulation) where the player can climb into the physical bike (while viewing the virtual counterpart bike) and pedal the physical bike while the player sees himself/herself pedaling the virtual counterpart bike (which shows the pedals moving in tandem with the physical pedals of the physical bike moving). The player can steer the physical bike by turning the physical handlebars (which essentially serve as a controller) and this would steer the virtual bike in the virtual world (and the handlebars would move in the virtual world to match the player's physical motions). Thus, the motions of the player in the physical world (e.g., turning handlebars, pedaling on pedals, etc.) can match what the player sees in the virtual world.

Thus, the physical room can have physical objects which have a virtual counterpart. However, it may be necessary to direct (coax) the player to where the physical object is so the player can utilize the physical object. Thus, as described herein, dynamically generated objects (e.g., dynamically generated walkways) can be generated by the system in order to coax the player to walk to where the player can utilize the physical object (e.g., physically get on the physical bike). In some embodiments, it may be desirable in the virtual world that the player would not see the virtual counterpart object in the virtual world at all parts of the game/simulation (e.g., at a part of the game (or simulation) the game does not want the player to see the virtual counterpart object yet so walls can be placed in the virtual world so that the player would not see the virtual counterpart object in the virtual world). However, when the player is to then utilize the virtual counterpart object, the player would be then steered to walk towards assuming the desired position to utilize the virtual counterpart object (and hence utilize the physical object as well). Any of the methods described herein which enable a player to assume a desired position can be utilized for this purpose.

In FIG. 38, the physical room 3800 has a player 3801 and the desired position 3802 that the player is intended to assume so the player get mount the physical bike 3803. In the virtual world 3810, the player 3811, would have to walk through dynamically generated structures 3812 in which he would eventually see the virtual counterpart object 3813 (when the virtual counterpart object 3813 becomes in the players field of vision, e.g., the virtual counterpart object 3813 is not blocked by any walls from where the player is virtually looking). The player can then mount the physical bike 3803 in the physical room 3800 (real world) and the player's view in the virtual world 3810 would be consistent with what the player senses in the physical room 3800. The three-dimensional model of the virtual counterpart bike (the virtual bike 3813) would be consistent with the structure of the physical bike 3803 so the player senses (e.g., the player's sense of touch) would not identify any discrepancy between what the player feels and what the player sees. The player can sit on the physical bike 3803 and would view himself in the virtual world 3810 sitting on the bike. The player can pedal the physical bike 3803 (by actually putting the player's feet on the physical pedals on the bike and pedal) and counterpart motion of virtual pedals of the virtual bike 3813 would be in motion to match the player's actual physical motions. While the structure of the virtual bike 3813 would match the structure of the physical bike, the appearance of the virtual bike 3813 can differ.

Figure 39:
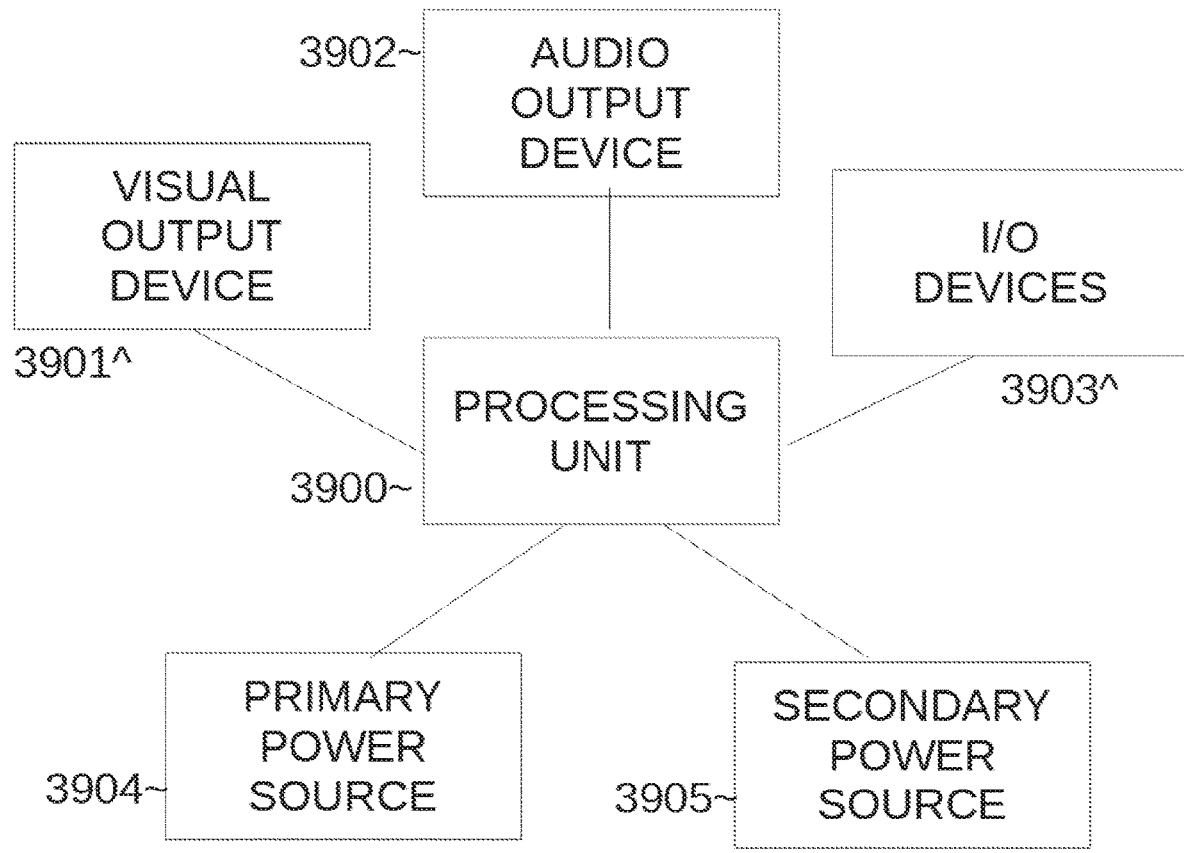
FIG. 39 is a block diagram illustrating one example of a virtual reality headset, according to an embodiment.

FIG. 39 is a block diagram illustrating one example of a virtual reality headset ("headset").

A processing unit 3900 can be a microprocessor and any associated structure. The processing unit 3900 can be connected to a visual output device 3901 (e.g., an HD or 4k LED (or OLED or other output technology) with lenses to direct each eye to its own display (either two separate displays, one for each eye, or one larger display which is portioned into two independent sections which each eye views only its respective section of the output device). The processing unit 3902 can also be connected to an audio output device 2902 such as headphones, speakers, etc. The processing unit 3902 can also be connected to input/output devices 3903 which allows the processing unit 3902 to communicate with external devices and signals. For example, this can include a video/audio input (such as an HDMI cable), or a receiver to receive a wireless HDMI signal, etc. An external computer will typically drive the video and audio outputted on the headset and any type of I/O device(s) are included that can receive these signals and display the respective video and audio to the player. In another embodiment, all audio and video signals are generated internally on the headset itself (e.g., by the processing unit 3900 or a different processing unit) and no external computer is needed.

The processing unit is also connected to a primary power source 3904, such as a battery (disposable or rechargeable). The primary power source 3904 is removable so it can be replaced with a fully charged battery. A secondary power source 3905 can be another battery (disposable or rechargeable). In an embodiment, the secondary power source 3905 can also be removable. In another embodiment, the secondary power source 3905 can be rechargeable and permanently party of the headset (in other words not removable). The secondary power source 3905 can be recharged from the power source 3904 (or other power source). Thus, the secondary power source 3905 can enable a replacement of the primary power source 3904 without losing power to the headset. The primary power source (e.g., a battery) can be removed from the headset while the user is still wearing the headset and the secondary power source 3905 would power the headset (e.g., the processing unit 3900 and any other devices) while the primary power source 3904 is being changed (and hence will not be present for a brief time). The secondary power source 3905 may be a relatively small power source (e.g., may not power the headset more than a few minutes) while the player performs the replacement of the primary power source 3904. Typically, the primary power source 3904 would power the headset for a longer period of time, e.g., at least two hours. The primary power source should be easily accessible on the headset (e.g., accessible anywhere on the outside of the headset) so that the player can easily replace the primary power source 3904 while he/she is still wearing the headset (e.g., the primary power source 3904 can simply be pulled out by the player and replaced with a freshly charged primary power source 3904). Typically, the secondary power source 3905 is internal to the headset and will not be able to be easily removed/replaced by the player (although in another embodiment the secondary power source can be replaced as easily as the primary power source). Thus, the player while wearing the headset and playing a game (or other virtual reality application) does not need to interrupt his/her game by removing his/her headset to replace the battery (primary power source 3904), as the player can replace the primary power source 3904 with a fully charged battery (which will become the primary power source 3904) and continue playing.

Figure 40:
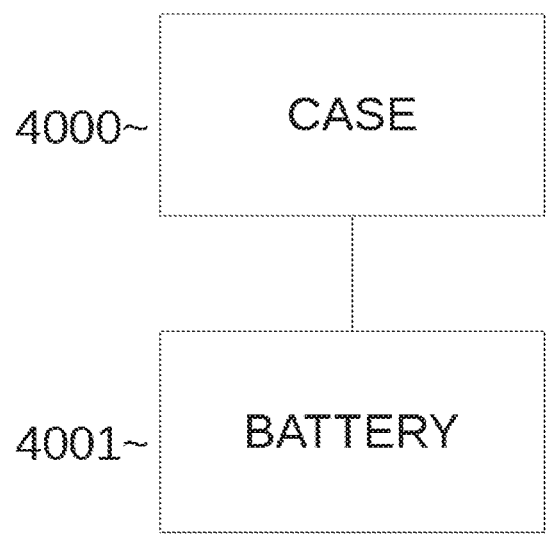
FIG. 40 is a block diagram of a physical charging device, according to an embodiment.

FIG. 40 is a block diagram of a physical charging device. The charging device will charge a rechargeable battery 4102 when one is inserted into the case 4000. This charging device (e.g., the case 4000) can be affixed to a physical wall in the physical room, or can be on the floor, table, etc. The charging device comprises the case 4000 which houses the battery 4001 which can easily be removed and inserted into the case 4000. Not pictured is a power supply which would typically be a cord plugged into an electrical outlet and is used as a power source to recharge the batter 4001. Also not shown is a transformer and any other component known in the art which is used in a battery charger. The case 4000 can optionally comprise photosensors and/or infrared LEDS, and/or any other location mechanism used by the virtual reality system to locate objects in the physical room. In this manner, when the system detects the location of the charger in the physical room, the system can create a counterpart object in the virtual world (e.g., a counterpart battery charger). Thus, while the player is playing a virtual reality game, the player can see the counterpart battery charger in the virtual world and even touch it.

Figure 41:
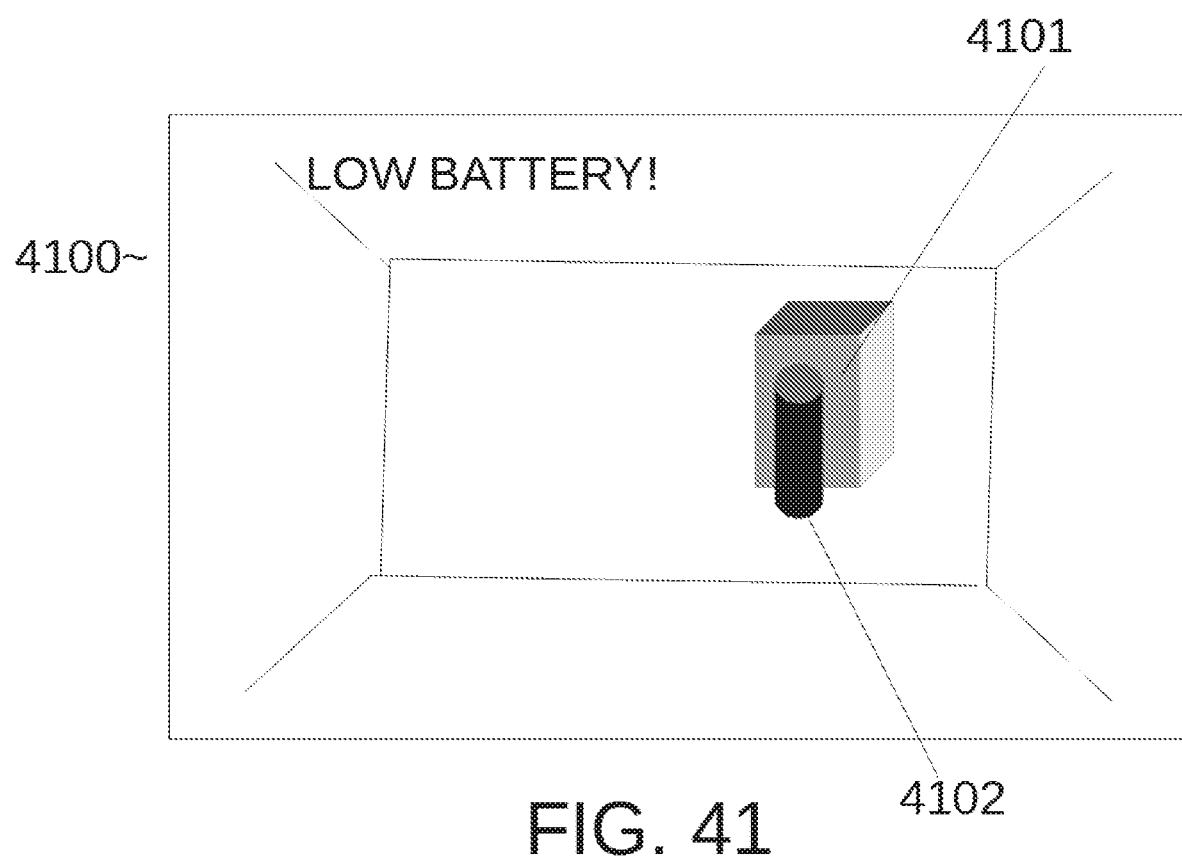
FIG. 41 is drawing illustrating a view of the player through the headset where the player views a virtual world and sees a counterpart battery charger, according to an embodiment.

FIG. 41 shows a view of the player through the headset where the player views a virtual world and sees a counterpart battery charger (the case 4101 and the battery 4102). The player while playing the game, can remove the physical battery 4001 using his/her hands and can optionally see the virtual battery (the counterpart battery 4102) be removed from the virtual case 4101. The player can replace the primary power source 3904 in the headset with the physical battery 4001 and put the primary power source 3904 that the player removed inside the case 4000 so it can now be charged. In other words, the player would (while the player continues to wear the headset and view the virtual world) swap the battery 4001 in the charger with the primary power source 3904 (while the secondary power source 3905 located on the headset maintains the power in the headset).

Thus the player has now inserted a new (typically fully charged battery) into the headset and continue playing without interrupting his/her game. This process can be fully integrated into the game, for example the game can show a counterpart case 4000 and/or battery 4001 in the virtual world (see FIG. 41). For example, the game can be a first (or third) person game which takes place on a spaceship. The player can receive a low battery indicator (see FIG. 41) and find (and see) the virtual battery 4102. The player can walk up to the virtual battery 4102 in the virtual world while the player is actually walking up to the physical battery 4001 in the physical world, and swap the battery on the headset 3904 with the battery 4001 in the charger. The "old" battery taken from the headset is now charging in the charger and the player can continue to play the game without interrupting his/her game experience. The integration of this process into the game will avoid interruption of the game as the swapping of the battery can be a natural occurrence in the game (e.g., the player is wearing a space suit which needs a new battery periodically). Of course, while the player is swapping the batteries, the player can see in the virtual world the batteries being swapped while feeling the physical battery 4001, providing a realistic experience).

Figure 42:
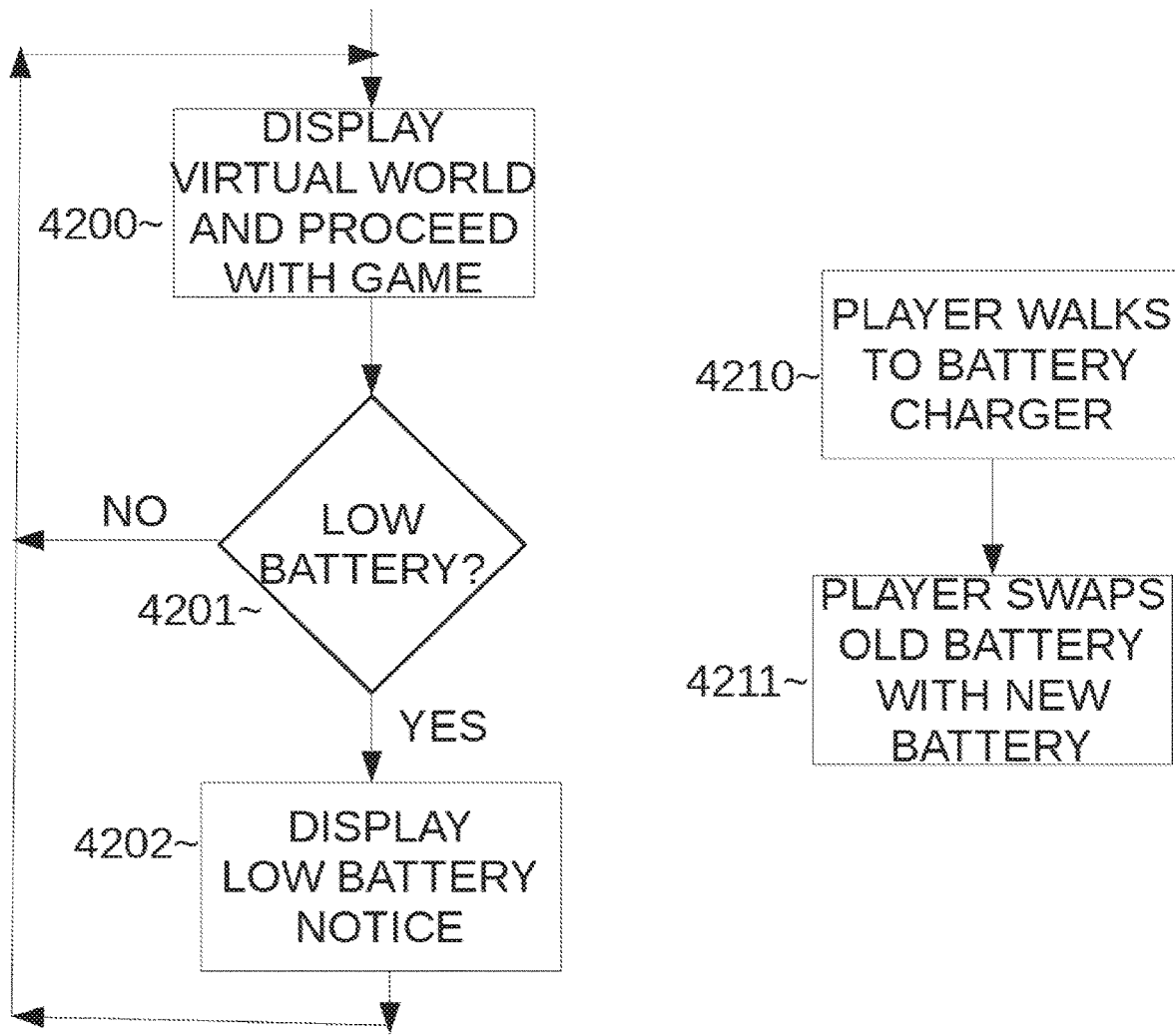
FIG. 42 is a flowchart illustrating an exemplary method of enabling a player to swap his/her headset battery out while playing a game, according to an embodiment.

A sensor on the headset can detect when the primary power source 3904 is running low (e.g., less than 10 minutes left of charge) and can transmit a signal to the computer generating the video signal which triggers a low battery alert displayed to the player in the virtual world (see FIG. 41 which says "LOW BATTERY!"). This can alert the player that he/she should find a new battery in the virtual world. The player can be coaxed to be in front of a battery/battery charger in the virtual world using any of the methods described herein to coax a player to assume particular position/location FIG. 42 is a flowchart illustrating an exemplary method of enabling a player to swap his/her headset battery out while playing a game ("game" as used herein can be synonymous with any virtual reality experience) without losing power to the headset (and hence not interrupting the game at all).

In operation 4200, the virtual world is displayed to the player via the headset. As described herein, the player can look around and see any anything in the virtual world according to the direction the player is looking (the player can typically look in any possible direction with all possible degrees of freedom). The game proceeds in accordance with the programming of the game.

From operation 4200, the method proceeds to operation 4201 which detects whether there is low battery. Low battery is when the charge on the battery is below a certain threshold (e.g., the threshold can be 15% charged, 20 minutes left of power, e.g., 2 volts measured on the battery, etc.) A voltage detector (e.g., voltmeter, etc.) can be located on the battery circuit (where the battery is connected to) to measure the charge on the battery. If there is not low battery (i.e. the battery measurement is greater (or greater than equal to) a particular threshold), then the game continues normally (no "low battery" message is displayed) and the method returns to operation 4200.

If in operation 4201, a low battery is detected, then the method proceeds to operation 4202 which displays a low battery notice superimposed in the virtual world (for example, see FIG. 41 which shows a "Low Battery" message which is displayed in the upper right of the display which is superimposed over the virtual world displayed in operation 4200.) The method proceeds to operation 4200 which continues the game. The player is on notice that he/she should change out the battery before it runs out of charge, of course if the battery runs out before it is changed with a freshly charged battery then the power to the headset will run out and the virtual reality experience will terminate (this can be avoided if the player swaps his/her current battery for a fully charged battery before the current battery runs out).

Operations 4200-4202 can be performed continuously while the game is being played. Operations 4210-4211 can be performed "inside" operation 4200 (e.g., while the game is being played).

In operation 4210, the player walks to a battery charger. This operation is initiated by the player when the player walks to a battery charger. A battery charger may automatically be displayed to the player when the low battery message is displayed (the physical battery charger is of course always present in the physical room at all times but only is displayed to the player (e.g., highlighted, displayed as a virtual object in the virtual world, etc.) when the low battery message comes on. Alternatively, the player can be directed (coaxes) to the battery charger using virtual structures (as described herein).

From operation 4210, the method proceeds to operation 4211, wherein the player swaps his/her current battery (located in the headset the player is wearing) with a freshly charged (new) battery located in the battery charger. The battery and/or battery charger can be displayed in the virtual world (as counterpart objects) so the player can physically feel the new battery and pull it out of the charger while seeing this activity in the virtual world (using counterparts which would match up to the player's real life actions). The player would also remove the player's old battery (the one with low battery) and put the old batter inside the charger while putting the new battery into the headset. Now, the player has a freshly charged battery in his/her headset to continue the game with, while the old battery is now charging in the charger. The steps of operation 4211 should typically all be performed while the player can see (in the virtual world) all of the activity in the virtual world (using counterparts) so the physical steps the player performs (switching the batteries) feels natural and is easy to do. Once the battery is changed, the player can then continue playing the game. Note that no interruption (e.g., power out) of the virtual world game has occurred (because while the primary power source 3904 is removed the secondary power source 3905 still powers the headset) and the player also did not need to remove his/her headset (the player continuously was watching the virtual world). Note that the player can swap the battery even if the current battery in the headset is not running low on charge. The battery (new batter, old battery) as referred to herein is used as the primary power source 3904 while the secondary power source 3905 cannot be swapped out. In another embodiment, both the primary power source 3904 and the secondary power source 3905 can be swapped (removed and replaced).

In a further embodiment, when the player initializes the game system (e.g., sets the limits of the physical room to the system, see FIG. 2 and the accompanying description) the player can also identify obstructions in the physical room so that the game system can avoid having the player walk into the obstructions while playing the virtual world. An obstruction can be, for example, a physical couch, chair, table, or any type of furniture or physical object in which the player should not or cannot walk through. These obstructions can be identified to the system so that the system can generate obstacles (e.g., walls, water, fire, or other things the player should not walk through) in the virtual world which coincide with the locations of the obstructions so that the player will not walk into these obstacles and hence will not physically collide with the obstructions in the physical world.

Note that if the player tries to walk through an obstacle in the game, this can be handled in numerous ways. For example, the player can be penalized (e.g., lose points, have to restart the level, etc.), the player may die (e.g., an obstacle may be fire which would virtually kill the player), or the game would display an arrow instruction the player to walk back where the player came from and the game would not progress until the player returned to the position he/she was in before he/she walked through an obstacle. In one embodiment, the player would not be allowed to walk through obstacles without some type of adverse consequence, while in another embodiment the player would be able to walk through obstacles without adverse consequence.

FIG. 43 shows a physical room 4300 and a virtual representation 4310 of the physical room. When the player initializes the game system (as described in FIG. 2 and the accompanying description), the player can identifies the boundaries of the play area. The boundaries of the play area (as described herein) can also be considered walls so rotators (and any other structure) can be placed in order to prevent the player from stepping out of the play area. In an embodiment, different cells (as described herein) can be sized and placed in accordance with the play area (e.g., so each cell is the size of the play area), not the walls of the physical room.

Obstructions in the physical room (e.g., furniture, etc.) can be in the middle of the play area. While of course the player may wish to remove all such obstructions from the play area before playing, in another embodiment removing these obstructions inside the play area is not necessary. Instead, the game system would automatically generate obstacles in the virtual world which coincide where the physical obstructions are in the physical room (real world). As such, the player would not walk into an obstruction while playing in the virtual world because there would be generated an obstacle (e.g., a pool of water, a wall, etc.) in the virtual world so that the player would not walk into the obstruction (which are physical).

In the virtual representation 4310 of the physical room, note the play area 4311 and the obstruction 4312 which are identified to the system by the player (or they can also be electronically scanned and identified by the game system using cameras or other sensing equipment). In this example, chair 4301 corresponds to identified obstruction 4312. The virtual representation 4310 can be displayed on a computer monitor so the player can see where the boundaries and the obstructions are located (and the player has the ability to adjust the size and placement of the identified obstructions). The player can also set the boundary of the play area in any arbitrary perimeter (curved lines, in a trapezoid, hexagonal, or any polygonal shape, etc.)

Figure 44:
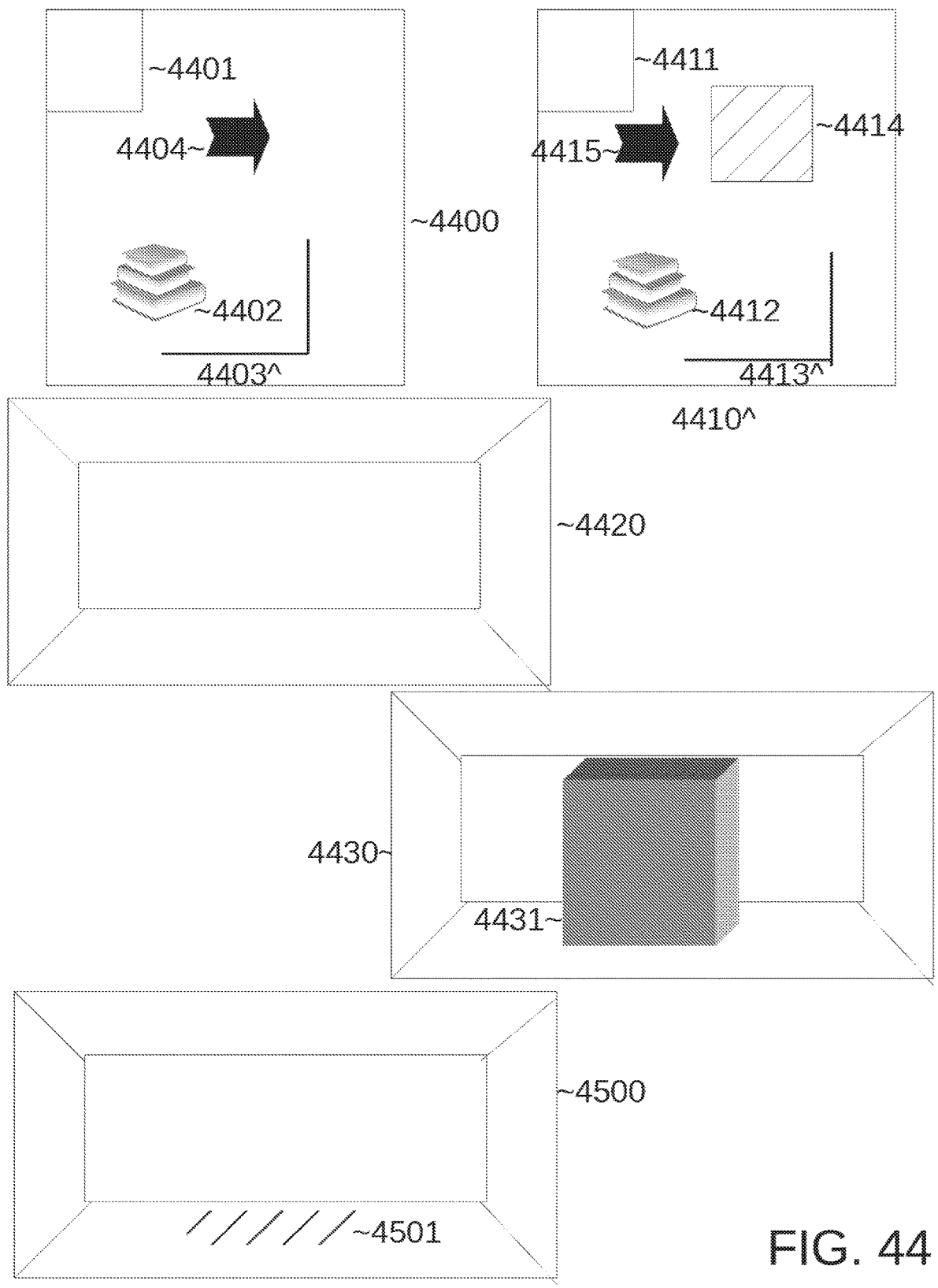
FIG. 44 shows a first virtual world without an obstruction in the corresponding physical room and a second virtual world with an obstruction in the corresponding physical room, according to an embodiment.

FIG. 44 shows a first virtual world 4400 without an obstruction in the corresponding physical room (e.g., physical room 4300 (without chair 4301) with play area 4312 (without obstruction 4312)), and a second virtual world 4410 with an obstruction in the corresponding physical room (e.g., physical room 4300 with play area 4312 with chair 4301). Note that in the first virtual world 4400, there is the player 4404, a boundary 4401, walls 4403, and an object 4402 (e.g., books or any other object). In the second virtual world there is also the player 4415, the boundary 4411, the object 4412, and the walls 4413. Of course the boundary 4401, 4411 object 4402, 4412 and walls 4403, 4413 do not exist in the physical room and are only exist in the virtual world. Note that an obstacle 4414 exists which corresponds to the chair 4301 (obstruction) in the physical room 4300. Thus, the player would see the obstacle 4414 in the virtual world and would not attempt to walk through it, thereby avoiding physically walking into the chair. Note that the appearance of the obstacle 4414 is different than the chair (it corresponds to) in the physical room. The obstacle 4414 is automatically generated by the system to correspond where the physical obstruction (chair) is in the physical room. Any other obstructions identified in the physical room would also have automatically generate obstacles generated in the virtual world.

First view 4420 is what the player might see (in one embodiment) in the first virtual world 4400 (there is no obstacle because in this example no chair or other obstruction has been identified to the system). Second view 4430 is what the player might see (in one embodiment) in the second virtual world 4410. Note the automatically generated obstacle 4431 (a set of walls forming a cube) is present and thus the player would not attempt to walk into this obstacle 4431 (virtual walls) which corresponds to obstacle 4414 (both which correspond to obstruction 4301). This prevents the player from colliding with the real world chair that corresponds to the placement of the obstacle 4431 (in other words, if the player were to walk into the obstacle 4431 the player would physically collide with the chair 4301 in the physical room). Third view 4500 is another example of what the player might see (in another embodiment) in the second virtual world 4410. In this third view 4500, an obstacle is generated 4501 which is a pool of water (but it can be any other obstacle, such as fire, a hole the player can virtually fall through, etc.) In this example, the player would not want to walk into the pool of water (obstacle 4501) and thus would avoid physically colliding with the chair 4301 which corresponds to the obstacle 4501.

In one embodiment, automatically generated obstacles which correspond to physical obstructions would appear the same to players in the virtual world as any other obstacles in the game (e.g., walls or other obstacles which have been designed as a permanent part of the virtual world). In another embodiment, automatically generated obstacles which correspond to physical obstructions would appear differently to players in the virtual world (e.g., these would be a unique color, or a unique obstacle such as fire, etc., which is only used for automatically generated obstacles which correspond to physical obstructions but not used for obstacles which have been designed as a permanent part of the virtual world. For example, a fire obstacle (which appears orange and uses a fire animation) would only be used for automatically generated obstacles which correspond to physical obstructions, and hence the player (upon seeing a fire obstacle) would know not to cross the fire because the player knows he would then collide with a physical obstacle.

Figure 45:
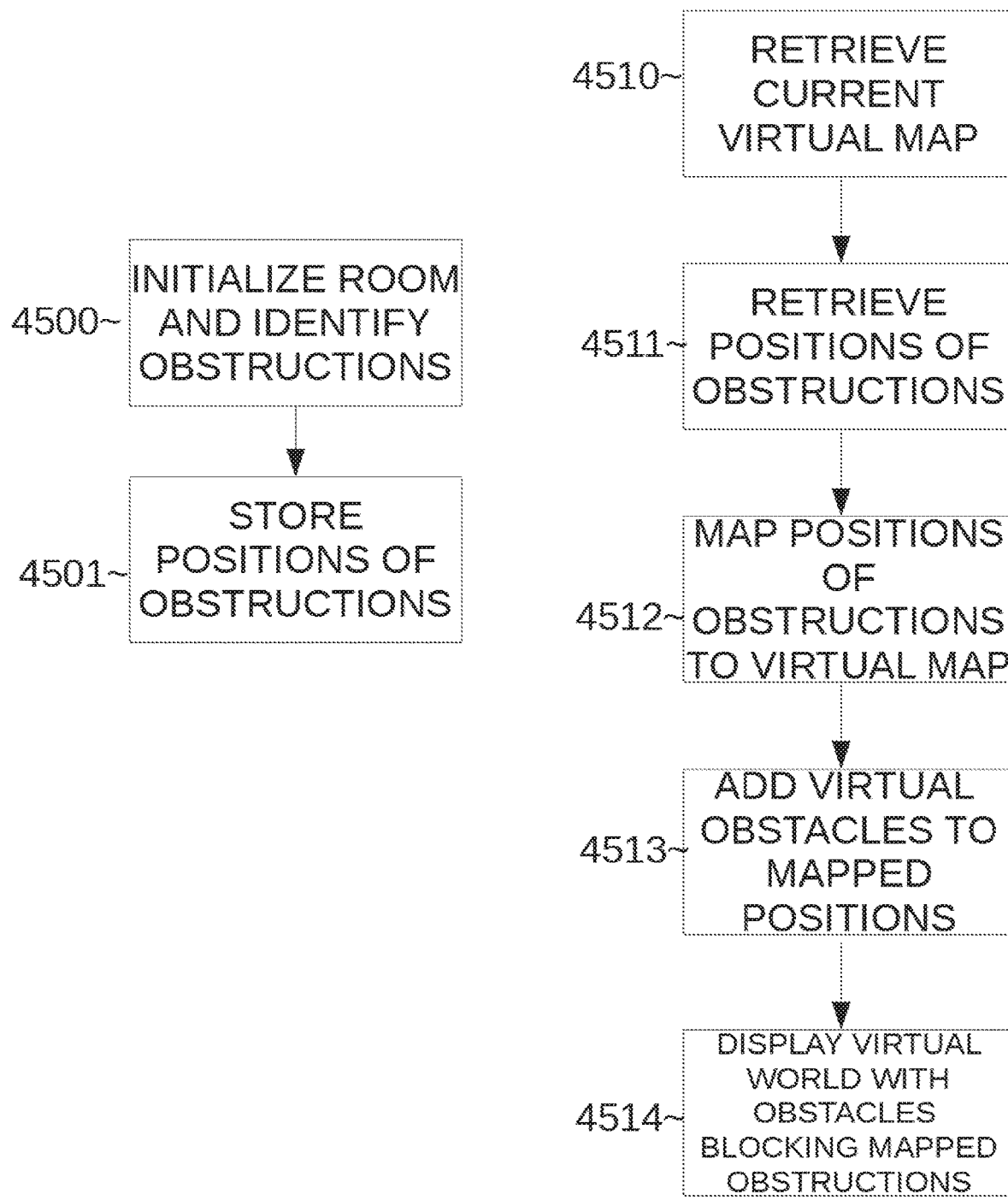
FIG. 45 is a flowchart illustrating one exemplary method of automatically generating obstacles (virtual) from obstructions (physical), according to an embodiment.

FIG. 45 is a flowchart illustrating one exemplary method of automatically generating obstacles (virtual) from obstructions (physical).

Operations 4500 to 4501 can be performed initially (such as when the system is initialized) but it is not necessary to repeat these operations (unless the makeup of the physical room has changed).

In operation 4500, the room is initialized and obstructions are identified. This means that the player would identify the boundaries of the play area (e.g., by using a controller whose location is identifiable to the game system in real time, etc.) The obstructions can also be identified to the system, for example by physically drawing a perimeter around each obstruction with the controller. In another embodiment, each obstruction can be identified using cameras and optical recognition, as known in the art.

From operation 4500, the method proceeds to operation 4501, which stores the locations of the boundaries of the play area and the positions of the obstructions on a storage medium (e.g., hard drive, flash drive, etc.) so they can be retrieved later.

Operations 4510 to 4514 can be performed when a particular game (or other virtual reality experience is initiated). Operations 4510 to 4513 can be performed only once (and the end result of operation 4513 can be stored for later use) or operations 4510 to 4513 can be performed upon each initiation of the application, or any other practical workflow.

In operation 4510, the virtual map is retrieved (from a computer readable storage). As described herein, the virtual map is a data structure which stores all of the contents of the virtual world (e.g., all of the obstacles, objects, walkways, etc.) A 3-D game engine can read the virtual map, receive the physical location of the player and the orientation the player is looking, and generate a large number of polygons (or other shape) which would correspond to what the player would see in the virtual world and output these polygons (actually a computer representation of the polygons) to a 3-D graphics card which would then generate the 3-D scene and output it to the headset. In operation 4510, either the entire virtual map is retrieved or only a subset of it which is needed for the near future (e.g., the current level the player is on).

From operation 4510, the method proceeds to operation 4511, which retrieves the positions of the obstructions identified in operation 4500 and stored in operation 4501. They are retrieved from the storage device that they were stored on in operation 4501.

From operation 4511, the method proceeds to operation 4512, which maps positions of the obstructions (retrieved in operation 4511) onto the virtual map (retrieved in operation 4510). For example, the coordinates of the obstructions may be "room scale coordinates" relating to the physical room and these may need to be converted to virtual world coordinates. This can be done using formulas, for example, Xvirtual=Xoffset+(Xphysical*Xconversionconstant), wherein Xvirtual is the x coordinate in the virtual world, Xoffset if an offset used to translate between physical and virtual coordinates, Xphysical is the X coordinate in the physical room (physical world), and Xconversionconstant is a constant used to convert between physical and virtual coordinates. The same formula can be used for the Y and Z coordinates (e.g., Yvirtual=Yoffset+(Yphysical*Yconversionconstant), and Zvirtual=Zoffset+(Zphysical*Zconversionconstant). Thus, the physical locations of the obstructions can be mapped into the virtual world (via the virtual map). Of course, any other formula can be used as well.

From operation 4512, the method proceeds to operation 4513, which adds virtual obstacles to the virtual map using the mapped coordinates determines in operation 4512. For example, the physical coordinates for a chair in the physical room is converted to virtual coordinates in operation 4512, and then in operation 4513 a virtual obstacle such as a fire pit is added to the virtual map using these virtual coordinates. Thus, in the virtual world, the player sees a fire pit where the chair would be in the physical world so if the player were to walk into the fire pit the player would actually be physically walking into the chair. Instead of a fire pit, other obstacles can be used, for example a bottomless pit in which if the player walks into it the player will fall in the virtual world and be penalized (e.g., need to restart the level over or from a reset point).

From operation 4513, the method proceeds to operation 4514, in which the virtual world with the automatically added obstacles form operation 4513 (which block real world obstructions in the virtual locations corresponding to physical locations), is displayed to the player via the headset using the virtual reality system. The player can look around utilizing all degrees of freedom and see the virtual world from any angle. Typically, hidden objects are not shown in the virtual world (e.g., if an object is behind a wall that object will not be displayed).

Figure 46:
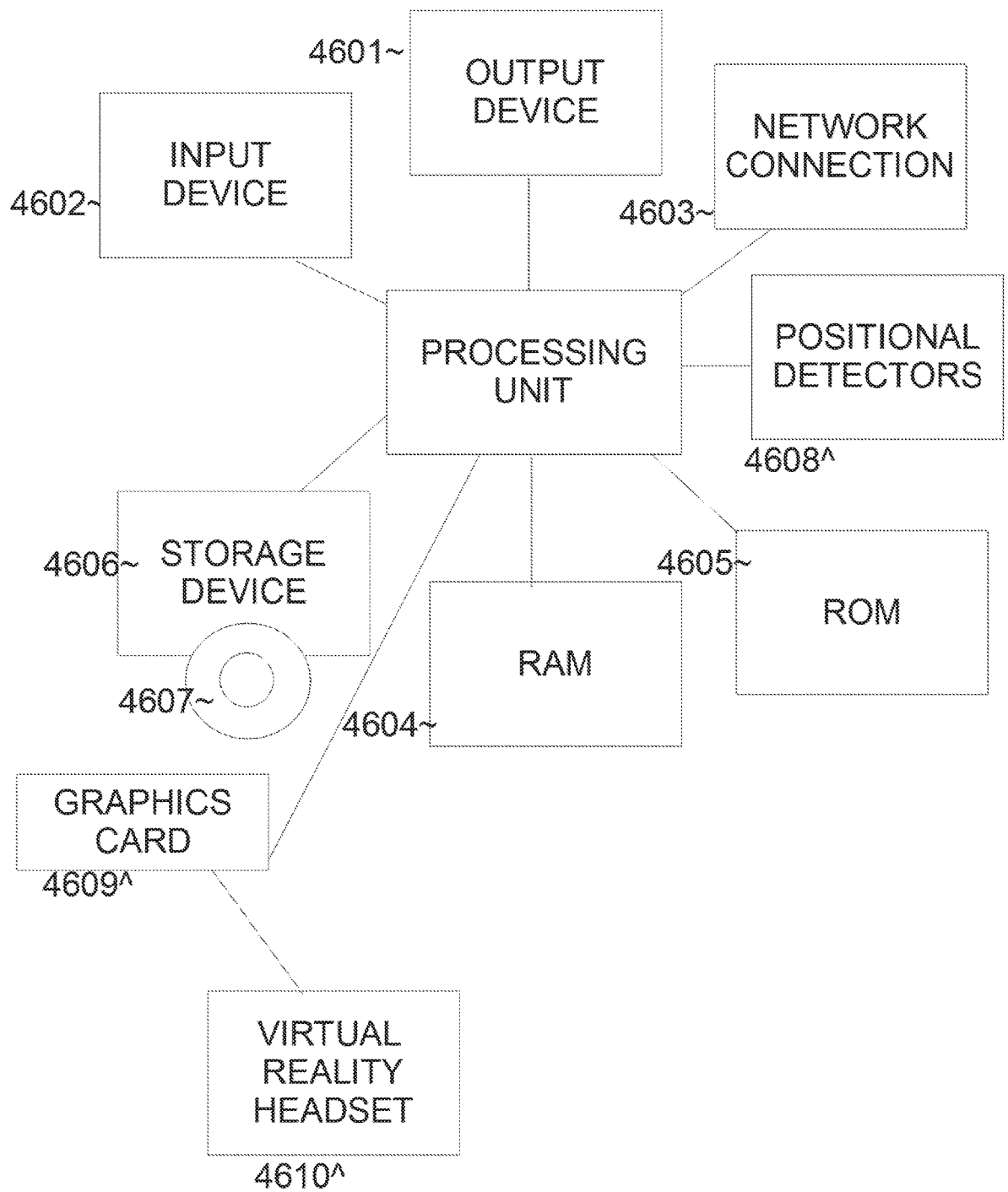
FIG. 46 is a drawing illustrating one example of hardware that can be used to implement all described features, according to an embodiment.

The system described herein can be implemented on a virtual reality system. FIG. 46 is a drawing illustrating one example of hardware that can be used to implement all described features, according to an embodiment.

The system can comprise a processing unit 4600 (such as a microprocessor and any associated components such as cache, bus, etc.) which is connected to an output device 4601 (such as an LCD monitor, touch screen, CRT, etc.) which is used to display to the player any aspect of the game (e.g., any state, operation, value, animation, etc.), and an input device 4602 (e.g., buttons, joystick, a touch screen, a keyboard, mouse, etc.) which can be used to input any decision made by the player (note that there can be more than one input device 4602). All methods/features described herein can be performed by the processing unit 4600 by loading and executing respective instructions which are stored on a computer readable storage medium (e.g., computer memory, RAM, ROM, disc, etc.). Multiple such processing units can also work in collaboration with each other (in a same or different physical location). The processing unit 4600 can also be connected to a network connection 3803, which can connect the electronic gaming device to a computer communications network such as the Internet, a LAN, WAN, etc. The processing unit 4600 is also connected to a RAM 4604 and a ROM 4605. The processing unit 4600 is also connected to a storage device 4606 which can be a disk drive, DVD-drive, CD-ROM drive, flash memory, solid state drive, etc. A non-transitory computer readable storage medium 4607 (e.g., hard disk, CD-ROM, etc.), can store a program which can control the electronic device to perform any of the methods described herein and can be read by the storage device 4606.

While one processing unit is shown, it can be appreciated that one or more such processors or processing units can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.) All values described herein can be processed, stored, displayed, transmitted, etc., using the processing unit 4600 and/or any other structure described herein. Note that while components illustrated FIG. 46 can be considered "connected" to each other, it can be appreciated that the connection may be a direct connection or an indirect connection through one or more components. For example, the processing unit may not necessarily be directly connected to the input device (e.g., a keyboard) but is instead connected to an input/output port which is then connected to the keyboard.

The processing unit 4600 can also be connected to a graphics card 4609 (also known as a video card, video adapter, etc.) such as the NVIDIA GTX 980 or the AMD Radeon R9 370 which processes video information fed from the processing unit 3800 and outputs a display signal to a virtual reality headset 4610 (e.g., using an HDMI cable or other connection which can transmit high definition video). The virtual reality headset 4610 fits over the player's head/eyes and displays the images generated by the graphics card 4609 so the player feels immersed in the virtual world. The virtual reality headset 4610 can also include headphones/earbuds (the audio signal can be transmitted from the graphics card via the same HDMI cable or a different connection). One or more output devices (e.g., LCDs) are present inside the virtual reality headset (with one or more lenses in front of the output devices) and can display a separate image for each eye thereby displaying to the player the virtual world in a 3-D effect almost as if the player were there himself/herself. Note that the feed to the virtual reality headset 4610 (audio, video, and any other signal) can also be transmitted wirelessly thus not utilizing any physical cables and allowing the player to roam free in the physical room.

The virtual reality headset 4610 can optionally comprise a gyroscope, an accelerometer and a magnetometer in order to measure the orientation of the player's head (which way he/she is looking) and/or its position (determined by detecting relative movement from a reference point). The headset 4610 can also have infrared LEDs and/or photosensors embedded on its surface which can be detected by the detector(s) 4608 in order to locate where the player is in the physical room (the location) and also the orientation of the headset. Controllers can also have infrared LEDs and/or photosensors so their position and orientation can be tracked as well (and their positions and orientation transmitted to the game system as well so this data can be utilized during game play).

At least one positional detector 4608 is connected to the processing unit 4600 and can detect locations and orientations of objects in the physical room such as the virtual reality headset 4610, controllers, and other game objects, and transmit these locations and orientations to the processing unit 4600.

In an embodiment, the at least one positional detector 4608 can really be a pair of "lighthouse stations" which can transmit invisible infrared light signals. An omnidirectional flash can be transmitted to synchronize all of the devices that are to be detected. Then a horizontal infrared laser swipe and then a vertical infrared laser swipe are transmitted which "sweep" the room. Each device that can be located can detect these swipes via their photosensor, and then these devices can be located based on the times each swipe is detected to determine each photsensor's location. Different devices (e.g., the headset, controllers, etc.) would typically have multiple photosensors so that the device's orientation can also be computed. This location technology is implemented in the HTC VIVE virtual reality system and is known in the art.

In an embodiment the at least positional detector 3808 can be an infrared LED detector which detects the presence of the LEDs (each LED can be uniquely identified by a unique blinking pattern). Based on the position of the LEDs in the physical room (detected by the positional detector 3808), the location of the objects which embed the LEDs on them can be determined (and also the orientation as well). The headset can comprise a gyroscope and/or an accelerometer and/or a magnetometer which can be used to determine movement of the headset (and hence its position and orientation can be determined from a reference point). The positional tracker can also be used in conjunction with the devices in the headset to provide a reference point and correct errors from these measuring devices. This location technology is implemented in the OCULUS RIFT virtual reality system and is known in the art. Note that any other tracking mechanisms can be used as well, including those that do not require positional detectors and instead have cameras on the virtual reality headset (that lock onto physical objects in the physical room) that along with sensors on the virtual reality headset (e.g., gyroscopes, etc.) can track the orientation and physical position of the headset without requiring sensors/detectors external to the virtual reality headset.

In a further embodiment, a physical rotating disc can be in the floor which actually rotates the player. The player would stand on top of the disc and the disc could rotate while the player stands on top of the disc.

Figure 47A:
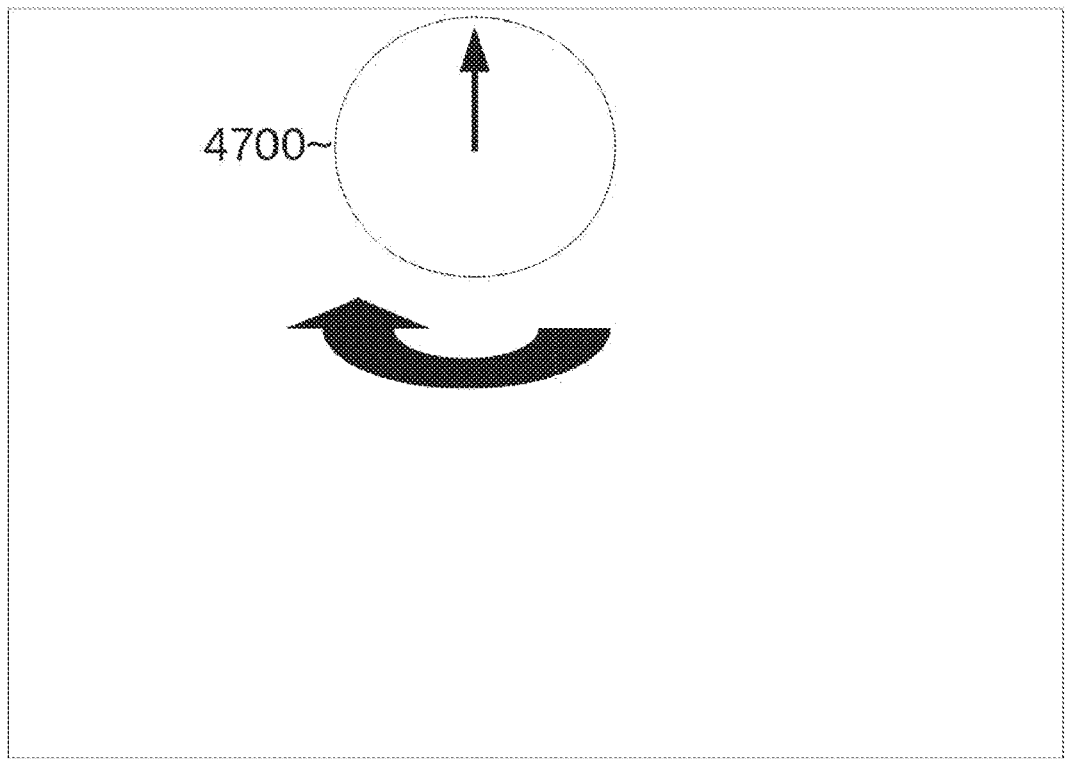
FIGS. 47A and 47B are drawings showing a physical rotating disc in a floor, according to an embodiment.

FIG. 47A is a drawing showing a physical rotating disc in a floor, according to an embodiment. The player would walk onto the physical disc 4700 in the physical room. The arrow on the physical disc 4700 can be painted on the physical disc 4700. The physical disc 4700 is against the wall. In the virtual world, the player could see a disc (or other area to step on in the virtual world). The player would step on the virtual area and the physical disc 4700 would rotate 180 degrees. While the physical disc 4700 is rotating, the player's view in the virtual world remains in the same orientation. In other words, the player would not realize in the virtual world that the player is physically rotating (although a player may possibly discern that he feels physical motion even though he/she is wearing the virtual reality goggles).

Figure 47B:
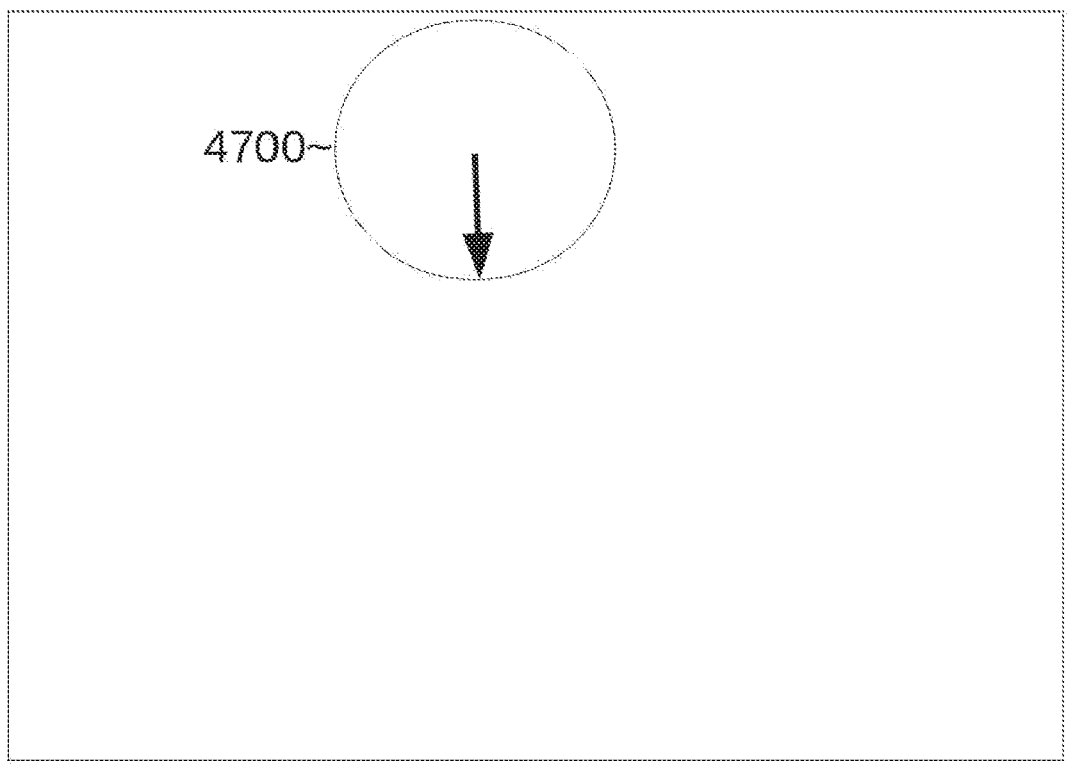

FIG. 47B is a drawing shows that the physical disc 4700 has rotated 180 degrees. The player is now physically facing the other way. However, the player's view from the virtual reality headset has not rotated (other than perhaps the player's natural head movements). Thus, the player can now walk south (down) in FIG. 47B and has plenty of walking space in front of him.

The processing unit can initiate the rotation of the physical disc 180 degrees (other rotations can be accomplished as well, for example if the player is facing the wall at 05 degrees (slightly to the right) then the physical disk would only need to rotate 85 degrees clockwise in order that the player faces opposite the wall.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
    causing a virtual reality headset worn by a physical player in a physical room to display a virtual world to the physical player, wherein the virtual reality headset covers a view of the physical room such that the physical player cannot see the physical room;
    identifying a physical location of a physical obstruction in the physical room, the physical obstruction being an item of furniture in the physical room;
    mapping the physical obstruction in the physical room to a virtual obstacle in the virtual world using a virtual map;
    continuously updating the display of the virtual world using a location and an orientation of the virtual reality headset; and
    displaying the virtual obstacle in the virtual world in a location in the virtual world corresponding to the physical location of the physical obstruction in the physical room, wherein all of what is displayed in the virtual world is computer generated which is generated using the virtual map while view of the physical obstruction by the physical player is blocked by the virtual reality headset.

2. The method as recited in claim 1, wherein the physical obstruction is identified by the physical player by drawing a perimeter around the physical obstruction using a controller.

3. The method as recited in claim 1, wherein the physical obstruction is identified using optical recognition using a camera.

4. An apparatus, comprising:
    a virtual reality headset configured to be worn by a physical player, the virtual reality handset comprising:
    an output device, the virtual reality headset configured to track an orientation of the virtual reality headset, wherein the virtual reality headset is configured to prevent the physical player from viewing anything in a physical room around the physical player;
    at least one processor internal or external to the virtual reality headset, the at least one processor configured to read and execute computer readable instructions, the computer readable instructions when executed cause the at least one processor to:
    identify a physical location of a physical obstruction in the physical room;
    map the physical obstruction in the physical room to a virtual obstacle in a virtual world using a virtual map;
    display the virtual world on the output device which is continuously updated using a location and the orientation of the virtual reality headset; and
    display on the output device the virtual obstacle in the virtual world in a location in the virtual world which corresponds to the physical location of the physical obstruction in the physical room, wherein all of what is displayed on the output device is computer generated which is generated using the virtual map.

5. The apparatus as recited in claim 4, wherein the computer readable instructions are further configured such that the physical obstruction is identified by the physical player by drawing a perimeter around the physical obstruction using a controller.

6. The apparatus as recited in claim 4, wherein the computer readable instructions are further configured such that the physical obstruction is identified using optical recognition using a camera.

7. The method as recited in claim 1, further comprising automatically identifying additional physical obstructions in the physical room and automatically mapping the additional physical obstructions to respective additional virtual obstacles.

8. The method as recited in claim 7, wherein the additional virtual obstacles are displayed to the physical player as water or fire or walls.

9. The apparatus as recited in claim 4, wherein the computer readable instructions are further configured to automatically identify additional physical obstructions in the physical room and automatically map the additional physical obstructions to respective additional virtual obstacles.

10. The apparatus as recited in claim 9, wherein the computer readable instructions are further configured such that the additional virtual obstacles are displayed to the physical player as water or fire or walls.

* * * * *